United States Patent
Miller

(10) Patent No.: US 9,928,654 B2
(45) Date of Patent: Mar. 27, 2018

(54) UTILIZING PSEUDO-RANDOM PATTERNS FOR EYE TRACKING IN AUGMENTED OR VIRTUAL REALITY SYSTEMS

(71) Applicant: Magic Leap, Inc., Dania Beach, FL (US)

(72) Inventor: Samuel A. Miller, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 14/706,999

(22) Filed: May 8, 2015

(65) Prior Publication Data

US 2015/0316982 A1 Nov. 5, 2015

Related U.S. Application Data

(63) Continuation of application No. 14/690,401, filed on Apr. 18, 2015, which is a continuation-in-part of application No. 14/331,218, filed on Jul. 14, 2014.
(Continued)

(51) Int. Cl.
*G06T 19/00* (2011.01)
*G06F 3/01* (2006.01)
(Continued)

(52) U.S. Cl.
CPC ............ *G06T 19/006* (2013.01); *A63F 13/56* (2014.09); *A63F 13/57* (2014.09); *A63F 13/577* (2014.09);
(Continued)

(58) Field of Classification Search
CPC .......... G06F 3/005; G06F 3/011–3/014; G06F 3/016–3/017; G06F 3/16; G06F 3/167;
(Continued)

(56) References Cited

U.S. PATENT DOCUMENTS

| 4,145,122 A | * | 3/1979 | Rinard | .................. A61B 3/113 351/158 |
| 4,940,972 A | | 7/1990 | Mouchot et al. | |

(Continued)

FOREIGN PATENT DOCUMENTS

| CN | 103325121 | 9/2013 |
| JP | 5457952 | 1/2012 |

OTHER PUBLICATIONS

Morano, Raymond A. et al.; "Structured Light Using Pseudorandom Codes;" Mar. 1998; IEEE Transactions on Pattern Analysis and Machine Intelligence; vol. 20, No. 3; pp. 322-327.*
(Continued)

*Primary Examiner* — Amare Mengistu
*Assistant Examiner* — Crystal A Mathews
(74) *Attorney, Agent, or Firm* — Vista IP Law Group LLP

(57) ABSTRACT

An augmented reality display system comprises a passable world model data comprises a set of map points corresponding to one or more objects of the real world. The augmented reality system also comprises a processor to communicate with one or more individual augmented reality display systems to pass a portion of the passable world model data to the one or more individual augmented reality display systems, wherein the piece of the passable world model data is passed based at least in part on respective locations corresponding to the one or more individual augmented reality display systems.

19 Claims, 41 Drawing Sheets

Related U.S. Application Data

(60) Provisional application No. 62/012,273, filed on Jun. 14, 2014, provisional application No. 61/981,701, filed on Apr. 18, 2014.

(51) Int. Cl.
| | |
|---|---|
| *A63F 13/56* | (2014.01) |
| *A63F 13/577* | (2014.01) |
| *A63F 13/57* | (2014.01) |
| *G06F 3/16* | (2006.01) |
| *G02B 27/01* | (2006.01) |
| *G06F 3/00* | (2006.01) |
| *G06K 9/00* | (2006.01) |
| *G06T 11/60* | (2006.01) |
| *G02B 27/00* | (2006.01) |
| *G06T 13/40* | (2011.01) |
| *G06T 7/60* | (2017.01) |
| *G06T 13/80* | (2011.01) |
| *G06T 15/10* | (2011.01) |
| *G06Q 30/02* | (2012.01) |
| *G06T 7/70* | (2017.01) |

(52) U.S. Cl.
CPC ..... *G02B 27/0093* (2013.01); *G02B 27/0101* (2013.01); *G02B 27/017* (2013.01); *G02B 27/0172* (2013.01); *G02B 27/0179* (2013.01); *G06F 3/005* (2013.01); *G06F 3/011* (2013.01); *G06F 3/012* (2013.01); *G06F 3/013* (2013.01); *G06F 3/014* (2013.01); *G06F 3/016* (2013.01); *G06F 3/017* (2013.01); *G06F 3/16* (2013.01); *G06K 9/00214* (2013.01); *G06K 9/00577* (2013.01); *G06K 9/00664* (2013.01); *G06K 9/00671* (2013.01); *G06Q 30/02* (2013.01); *G06T 7/60* (2013.01); *G06T 7/70* (2017.01); *G06T 11/60* (2013.01); *G06T 13/40* (2013.01); *G06T 13/80* (2013.01); *G06T 15/10* (2013.01); *G06T 19/003* (2013.01); *G02B 2027/014* (2013.01); *G02B 2027/0138* (2013.01); *G02B 2027/0178* (2013.01); *G02B 2027/0187* (2013.01); *G06F 3/167* (2013.01); *G06T 2200/04* (2013.01); *G06T 2215/16* (2013.01); *G06T 2219/024* (2013.01)

(58) Field of Classification Search
CPC ... G06T 7/60; G06T 7/70; G06T 11/60; G06T 13/40; G06T 13/80; G06T 15/10; G06T 19/003; G06T 19/006; G06T 2200/04; G06T 2219/024; G06T 2213/08; G06T 2215/16; G02B 27/0093; G02B 27/0101; G02B 27/017; G02B 27/0172; G02B 27/0179; G02B 2027/0138; G02B 2027/014; G02B 2027/0178; G02B 2027/0187; G06K 9/00214; G06K 9/00577; G06K 9/00664; G06K 9/00671; G06Q 30/02; A63F 13/56; A63F 13/57; A63F 13/577

See application file for complete search history.

(56) References Cited

U.S. PATENT DOCUMENTS

| | | | |
|---|---|---|---|
| 5,270,748 A * | 12/1993 | Katz | G02B 27/0093 351/209 |
| 5,532,784 A * | 7/1996 | Nishimura | G03B 13/02 351/210 |
| 5,774,824 A | 6/1998 | Streit et al. | |
| 5,812,186 A | 9/1998 | Telfer et al. | |
| 5,926,581 A | 6/1999 | Pritt | |
| 6,008,781 A | 12/1999 | Furness et al. | |
| 6,009,359 A | 12/1999 | El-Hakim et al. | |
| 6,064,749 A * | 5/2000 | Hirota | G06F 3/011 345/7 |
| 6,078,701 A | 6/2000 | Hsu et al. | |
| 6,184,847 B1 * | 2/2001 | Fateh | G06F 3/011 345/8 |
| 6,191,808 B1 | 2/2001 | Katayama et al. | |
| 6,244,987 B1 | 6/2001 | Ohsuga et al. | |
| 6,353,436 B1 * | 3/2002 | Reichlen | G06F 3/011 345/419 |
| 6,388,688 B1 | 5/2002 | Schileru-Key | |
| 6,400,365 B1 | 6/2002 | Setoguchi | |
| 6,771,294 B1 * | 8/2004 | Pulli | G06F 3/011 345/173 |
| 6,694,233 B1 | 12/2004 | Duff et al. | |
| 6,947,059 B2 | 9/2005 | Pierce et al. | |
| 6,951,515 B2 * | 10/2005 | Ohshima | A63F 13/10 463/31 |
| 7,350,954 B2 | 4/2008 | Snider et al. | |
| 7,401,920 B1 | 7/2008 | Kranz et al. | |
| 7,433,110 B2 | 10/2008 | Momonoi et al. | |
| 7,450,735 B1 | 11/2008 | Shah et al. | |
| 7,572,008 B2 * | 8/2009 | Elvesjo | G06K 9/00604 351/206 |
| 7,642,989 B2 | 1/2010 | Cheong et al. | |
| 7,646,394 B1 | 1/2010 | Neely, III et al. | |
| 7,693,702 B1 * | 4/2010 | Kerner | G06F 3/011 345/629 |
| 7,762,683 B2 | 7/2010 | Williams | |
| 7,784,954 B1 | 8/2010 | Coleman | |
| 7,825,996 B2 * | 11/2010 | Yamada | G02B 27/017 345/8 |
| 8,405,680 B1 * | 3/2013 | Cardoso Lopes | G06T 15/50 345/426 |
| 8,477,108 B2 * | 7/2013 | Waller | B60K 35/00 345/156 |
| 8,515,126 B1 | 8/2013 | Medasani et al. | |
| 8,584,044 B2 | 11/2013 | Wong | |
| 8,620,077 B1 | 12/2013 | Grundmann et al. | |
| 8,797,321 B1 | 8/2014 | Bertolami et al. | |
| 8,845,110 B1 | 9/2014 | Worley, III | |
| 8,888,304 B2 | 11/2014 | Beckman | |
| 8,922,645 B1 | 12/2014 | Ho et al. | |
| 8,961,312 B2 | 2/2015 | Barney et al. | |
| 8,965,107 B1 | 2/2015 | Schpok et al. | |
| 8,971,570 B1 * | 3/2015 | Raffle | G06K 9/00604 382/103 |
| 9,036,000 B1 | 5/2015 | Ogale et al. | |
| 9,036,044 B1 | 5/2015 | Bae et al. | |
| 9,055,157 B2 | 6/2015 | Miyazawa et al. | |
| 9,063,351 B1 * | 6/2015 | Ho | G02C 7/04 |
| 9,171,198 B1 * | 10/2015 | Raffle | G06K 9/00281 |
| 9,269,011 B1 | 2/2016 | Sikka et al. | |
| 9,392,160 B2 | 7/2016 | Sfaradi et al. | |
| 9,417,452 B2 | 8/2016 | Schowengerdt et al. | |
| 9,685,003 B2 | 6/2017 | Lazarow et al. | |
| 2001/0006376 A1 * | 7/2001 | Numa | G02B 27/017 345/7 |
| 2002/0012454 A1 * | 1/2002 | Liu | G06K 9/00201 382/118 |
| 2002/0044152 A1 * | 4/2002 | Abbott, III | G06T 11/00 345/629 |
| 2002/0084974 A1 | 7/2002 | Oshima et al. | |
| 2002/0089506 A1 | 7/2002 | Templeman | |
| 2002/0105482 A1 * | 8/2002 | Lemelson | G06F 3/0485 345/7 |
| 2002/0126066 A1 * | 9/2002 | Yasukawa | G02B 27/017 345/8 |
| 2002/0145660 A1 | 10/2002 | Kanade et al. | |
| 2002/0158827 A1 * | 10/2002 | Zimmerman | G06F 3/0346 345/88 |
| 2002/0158873 A1 | 10/2002 | Williamson | |
| 2003/0020707 A1 * | 1/2003 | Kangas | G06F 3/011 345/418 |
| 2003/0023347 A1 | 1/2003 | Konno et al. | |

(56) References Cited

U.S. PATENT DOCUMENTS

| | | | |
|---|---|---|---|
| 2003/0210228 A1* | 11/2003 | Ebersole | G02B 27/017 345/157 |
| 2003/0214533 A1 | 11/2003 | Cull et al. | |
| 2004/0054428 A1 | 3/2004 | Sheha et al. | |
| 2004/0066547 A1 | 4/2004 | Parker et al. | |
| 2004/0136038 A1 | 7/2004 | Holmes et al. | |
| 2004/0189675 A1 | 9/2004 | Pretlove et al. | |
| 2004/0223218 A1 | 11/2004 | Putilin et al. | |
| 2004/0233551 A1 | 11/2004 | Takahashi et al. | |
| 2005/0007552 A1* | 1/2005 | Fergason | A61B 3/113 351/210 |
| 2005/0024586 A1* | 2/2005 | Teiwes | A61B 3/113 351/209 |
| 2005/0086238 A1 | 4/2005 | Nevin | |
| 2005/0102098 A1 | 5/2005 | Montealegre | |
| 2005/0104801 A1 | 5/2005 | Sugiura | |
| 2005/0163346 A1 | 7/2005 | van den Bergen et al. | |
| 2006/0072108 A1 | 4/2006 | Onvlee et al. | |
| 2006/0077685 A1 | 4/2006 | Hsieh et al. | |
| 2006/0080408 A1 | 4/2006 | Istvan et al. | |
| 2006/0114414 A1* | 6/2006 | McGrath | A61B 3/0091 351/246 |
| 2006/0147152 A1 | 7/2006 | Lu et al. | |
| 2006/0221081 A1 | 10/2006 | Cohen et al. | |
| 2006/0238664 A1 | 10/2006 | Uehara et al. | |
| 2006/0247049 A1 | 11/2006 | Noro et al. | |
| 2006/0262140 A1 | 11/2006 | Kujawa et al. | |
| 2007/0003146 A1 | 1/2007 | Ko et al. | |
| 2007/0003915 A1 | 1/2007 | Templeman | |
| 2007/0014488 A1 | 1/2007 | Chen et al. | |
| 2007/0016898 A1 | 1/2007 | Derby et al. | |
| 2007/0021908 A1 | 1/2007 | Jaugilas et al. | |
| 2007/0027591 A1 | 2/2007 | Goldenberg et al. | |
| 2007/0035563 A1* | 2/2007 | Biocca | G06F 3/0346 345/633 |
| 2007/0055490 A1 | 3/2007 | Aoki et al. | |
| 2007/0070072 A1 | 3/2007 | Templeman | |
| 2007/0097321 A1 | 5/2007 | Whitehead et al. | |
| 2007/0109619 A1* | 5/2007 | Eberl | A61B 3/113 359/17 |
| 2007/0150097 A1 | 6/2007 | Chae et al. | |
| 2007/0153971 A1 | 7/2007 | Wang et al. | |
| 2007/0171369 A1* | 7/2007 | Grundig | A61B 3/0025 351/210 |
| 2007/0200848 A1 | 8/2007 | Hu | |
| 2007/0219645 A1 | 9/2007 | Thomas et al. | |
| 2007/0236485 A1 | 10/2007 | Trepte | |
| 2007/0296646 A1* | 12/2007 | Yamamoto | G02B 27/017 345/8 |
| 2008/0002863 A1* | 1/2008 | Northcott | A61B 3/1216 382/117 |
| 2008/0005702 A1* | 1/2008 | Skourup | G06F 3/011 715/848 |
| 2008/0026868 A1 | 1/2008 | Dunstan et al. | |
| 2008/0049012 A1 | 2/2008 | Bar-Joseph et al. | |
| 2008/0059570 A1 | 3/2008 | Bill | |
| 2008/0082264 A1 | 4/2008 | Hill et al. | |
| 2008/0143727 A1 | 6/2008 | Oh et al. | |
| 2008/0152213 A1 | 6/2008 | Medioni et al. | |
| 2008/0158244 A1 | 7/2008 | Hulet et al. | |
| 2008/0192794 A1 | 8/2008 | Hammer | |
| 2008/0211813 A1 | 9/2008 | Jamwal et al. | |
| 2008/0218331 A1 | 9/2008 | Baillot | |
| 2008/0240588 A1 | 10/2008 | Tsoupko-Sitnikov et al. | |
| 2008/0246759 A1 | 10/2008 | Summers | |
| 2008/0263460 A1 | 10/2008 | Altberg et al. | |
| 2008/0267454 A1 | 10/2008 | Kobayashi et al. | |
| 2008/0310707 A1 | 12/2008 | Kansai et al. | |
| 2008/0316301 A1 | 12/2008 | Givon | |
| 2009/0005961 A1* | 1/2009 | Grabowski | G01C 21/365 701/532 |
| 2009/0013052 A1 | 1/2009 | Robarts et al. | |
| 2009/0027337 A1 | 1/2009 | Hildreth | |
| 2009/0102763 A1 | 4/2009 | Border et al. | |
| 2009/0112906 A1 | 4/2009 | Shuster | |
| 2009/0113326 A1 | 4/2009 | Miyamoto et al. | |
| 2009/0128567 A1 | 5/2009 | Shuster et al. | |
| 2009/0141023 A1 | 6/2009 | Shuster | |
| 2009/0153976 A1* | 6/2009 | Dolgoff | G02B 27/2278 359/630 |
| 2009/0154793 A1 | 6/2009 | Shin et al. | |
| 2009/0172596 A1* | 7/2009 | Yamashita | G06F 3/0482 715/834 |
| 2009/0175498 A1 | 7/2009 | Kochi | |
| 2009/0187389 A1 | 7/2009 | Dobbins et al. | |
| 2009/0208052 A1* | 8/2009 | Kaplan | G06F 3/011 382/103 |
| 2009/0263040 A1 | 10/2009 | Rolland et al. | |
| 2009/0276802 A1 | 11/2009 | Amento et al. | |
| 2010/0036606 A1 | 2/2010 | Jones | |
| 2010/0045700 A1 | 2/2010 | Lefevre et al. | |
| 2010/0097375 A1 | 4/2010 | Tadaishi et al. | |
| 2010/0103196 A1 | 4/2010 | Kumar et al. | |
| 2010/0123737 A1 | 5/2010 | Williamson et al. | |
| 2010/0125799 A1* | 5/2010 | Roberts | G06F 3/011 715/757 |
| 2010/0146406 A1 | 6/2010 | Hamilton, II et al. | |
| 2010/0149073 A1 | 6/2010 | Chaum | |
| 2010/0158194 A1 | 6/2010 | Pack et al. | |
| 2010/0162149 A1 | 6/2010 | Sheleheda et al. | |
| 2010/0164990 A1* | 7/2010 | Van Doorn | G02B 3/0482 715/825 |
| 2010/0166260 A1 | 7/2010 | Huang et al. | |
| 2010/0185529 A1 | 7/2010 | Chesnut et al. | |
| 2010/0205563 A1* | 8/2010 | Haapsaari | G06F 3/0482 715/825 |
| 2010/0208033 A1 | 8/2010 | Edge et al. | |
| 2010/0211244 A1 | 8/2010 | Jeong et al. | |
| 2010/0253887 A1 | 10/2010 | Takemoto et al. | |
| 2010/0257252 A1 | 10/2010 | Dougherty et al. | |
| 2010/0281367 A1 | 11/2010 | Langmacher et al. | |
| 2010/0284607 A1 | 11/2010 | Van Den Hengel et al. | |
| 2010/0287500 A1 | 11/2010 | Whitlow et al. | |
| 2011/0009241 A1 | 1/2011 | Lane et al. | |
| 2011/0037766 A1 | 2/2011 | Judy et al. | |
| 2011/0074766 A1 | 3/2011 | Page et al. | |
| 2011/0115816 A1 | 3/2011 | Brackney | |
| 2011/0115703 A1* | 5/2011 | Iba | G06F 3/013 345/156 |
| 2011/0140994 A1* | 6/2011 | Noma | G02B 27/017 345/8 |
| 2011/0161875 A1* | 6/2011 | Kankainen | G06F 3/0481 715/810 |
| 2011/0170060 A1* | 7/2011 | Gordon | A61B 3/156 351/206 |
| 2011/0175810 A1 | 7/2011 | Markovic et al. | |
| 2011/0181497 A1 | 7/2011 | Raviv | |
| 2011/0181728 A1 | 7/2011 | Tieman et al. | |
| 2011/0216060 A1 | 9/2011 | Weising et al. | |
| 2011/0227487 A1 | 9/2011 | Nichol et al. | |
| 2011/0238751 A1 | 9/2011 | Belimpasakis et al. | |
| 2011/0242134 A1 | 10/2011 | Miller et al. | |
| 2011/0249002 A1 | 10/2011 | Duplessis et al. | |
| 2011/0301843 A1 | 12/2011 | Gale et al. | |
| 2011/0304699 A1 | 12/2011 | Ito et al. | |
| 2011/0310088 A1 | 12/2011 | Adabala et al. | |
| 2012/0041971 A1 | 2/2012 | Kim et al. | |
| 2012/0050493 A1* | 3/2012 | Ernst | G02B 27/017 348/47 |
| 2012/0062595 A1 | 3/2012 | Oh et al. | |
| 2012/0093320 A1 | 4/2012 | Flaks et al. | |
| 2012/0113092 A1* | 5/2012 | Bar-Zeev | G02B 27/017 345/419 |
| 2012/0113223 A1 | 5/2012 | Hilliges et al. | |
| 2012/0121161 A1 | 5/2012 | Eade et al. | |
| 2012/0127062 A1 | 5/2012 | Bar-Zeev et al. | |
| 2012/0127164 A1 | 5/2012 | Rhee et al. | |
| 2012/0127201 A1 | 5/2012 | Kim et al. | |
| 2012/0130513 A1 | 5/2012 | Hao et al. | |
| 2012/0140446 A1 | 6/2012 | Seetzen et al. | |
| 2012/0147328 A1* | 6/2012 | Yahav | A61B 3/113 351/210 |

(56) References Cited

U.S. PATENT DOCUMENTS

| | | |
|---|---|---|
| 2012/0183161 A1 | 7/2012 | Agevik et al. |
| 2012/0194548 A1 | 8/2012 | Ahn |
| 2012/0198359 A1 | 8/2012 | Lossia |
| 2012/0200667 A1 | 8/2012 | Gay et al. |
| 2012/0209514 A1 | 8/2012 | Chrysanthakopoulos |
| 2012/0212405 A1 | 8/2012 | Newhouse et al. |
| 2012/0214594 A1 | 8/2012 | Kirovski et al. |
| 2012/0218263 A1 | 8/2012 | Meier et al. |
| 2012/0224060 A1* | 9/2012 | Gurevich ............... B60R 1/00 348/148 |
| 2012/0237085 A1 | 9/2012 | Meier |
| 2012/0249416 A1 | 10/2012 | Maciocci et al. |
| 2012/0249741 A1 | 10/2012 | Maciocci et al. |
| 2012/0249797 A1 | 10/2012 | Haddick et al. |
| 2012/0263154 A1 | 10/2012 | Blanchflower et al. |
| 2012/0270653 A1 | 10/2012 | Kareemi et al. |
| 2012/0274629 A1* | 11/2012 | Baek ............... H04N 13/0271 345/419 |
| 2012/0274745 A1 | 11/2012 | Russell |
| 2012/0281024 A1 | 11/2012 | Champion |
| 2012/0290257 A1 | 11/2012 | Hodge et al. |
| 2012/0293548 A1* | 11/2012 | Perez ............... G06F 3/012 345/633 |
| 2012/0299950 A1 | 11/2012 | Ali et al. |
| 2012/0300979 A1 | 11/2012 | Pirchheim et al. |
| 2012/0306745 A1 | 12/2012 | Moore et al. |
| 2012/0306847 A1 | 12/2012 | Lim et al. |
| 2012/0306850 A1* | 12/2012 | Balan ............... G06T 19/006 345/419 |
| 2012/0320033 A1 | 12/2012 | Papaefstathiou et al. |
| 2013/0009994 A1 | 1/2013 | Hill |
| 2013/0010068 A1 | 1/2013 | Tiernan et al. |
| 2013/0044128 A1* | 2/2013 | Liu ............... G09G 5/00 345/633 |
| 2013/0054622 A1* | 2/2013 | Karmarkar ........ G06F 17/30032 707/749 |
| 2013/0070249 A1 | 3/2013 | Choi et al. |
| 2013/0082921 A1* | 4/2013 | Kang ............... H04N 13/0468 345/156 |
| 2013/0083062 A1 | 4/2013 | Geisner et al. |
| 2013/0093788 A1 | 4/2013 | Liu et al. |
| 2013/0103303 A1 | 4/2013 | Lynch |
| 2013/0103313 A1 | 4/2013 | Moore et al. |
| 2013/0107214 A1* | 5/2013 | Blixt ............... A61B 3/113 351/210 |
| 2013/0117261 A1 | 5/2013 | Sambrani |
| 2013/0117377 A1 | 5/2013 | Miller |
| 2013/0121558 A1 | 5/2013 | Jin et al. |
| 2013/0121600 A1 | 5/2013 | Lin et al. |
| 2013/0128230 A1 | 5/2013 | Macnamara |
| 2013/0130792 A1 | 5/2013 | Crocker et al. |
| 2013/0135197 A1 | 5/2013 | Kimura |
| 2013/0135304 A1 | 5/2013 | Chen et al. |
| 2013/0141434 A1 | 6/2013 | Sugden et al. |
| 2013/0154824 A1 | 6/2013 | Cai et al. |
| 2013/0154913 A1* | 6/2013 | Genc ............... G06F 3/012 345/156 |
| 2013/0162639 A1 | 6/2013 | Muench et al. |
| 2013/0166137 A1 | 6/2013 | Ahn et al. |
| 2013/0169626 A1 | 7/2013 | Balan et al. |
| 2013/0176533 A1* | 7/2013 | Raffle ............... A61B 3/113 351/209 |
| 2013/0182858 A1 | 7/2013 | You et al. |
| 2013/0194164 A1* | 8/2013 | Sugden ............... G02B 27/017 345/8 |
| 2013/0194259 A1 | 8/2013 | Bennett et al. |
| 2013/0194304 A1 | 8/2013 | Latta et al. |
| 2013/0196772 A1 | 8/2013 | Latta et al. |
| 2013/0201185 A1 | 8/2013 | Kochi |
| 2013/0208234 A1 | 8/2013 | Lewis |
| 2013/0249944 A1 | 9/2013 | Raghoebardayal |
| 2013/0257751 A1 | 10/2013 | Stafford |
| 2013/0278501 A1 | 10/2013 | Bulzacki |
| 2013/0278631 A1* | 10/2013 | Border ............... G02B 27/017 345/633 |
| 2013/0286053 A1 | 10/2013 | Fleck et al. |
| 2013/0293468 A1 | 11/2013 | Perez et al. |
| 2013/0293530 A1* | 11/2013 | Perez ............... G06T 19/006 345/418 |
| 2013/0300911 A1 | 11/2013 | Beckman |
| 2013/0303285 A1 | 11/2013 | Kochi et al. |
| 2013/0314398 A1 | 11/2013 | Coates et al. |
| 2013/0321593 A1 | 12/2013 | Kirk et al. |
| 2013/0328762 A1* | 12/2013 | McCulloch ......... G02B 27/017 345/156 |
| 2013/0335301 A1* | 12/2013 | Wong ............... G02B 27/0093 345/8 |
| 2014/0003762 A1 | 1/2014 | MacNamara |
| 2014/0004948 A1 | 1/2014 | Watkins, Jr. et al. |
| 2014/0028713 A1 | 1/2014 | Keating et al. |
| 2014/0028714 A1 | 1/2014 | Keating et al. |
| 2014/0028850 A1 | 1/2014 | Keating et al. |
| 2014/0035902 A1* | 2/2014 | An ............... G06T 7/0079 345/419 |
| 2014/0036361 A1 | 2/2014 | Woodgate et al. |
| 2014/0043329 A1 | 2/2014 | Wang et al. |
| 2014/0049983 A1 | 2/2014 | Nichol et al. |
| 2014/0055342 A1* | 2/2014 | Kamimura ............ G06F 3/013 345/156 |
| 2014/0063055 A1 | 3/2014 | Osterhout et al. |
| 2014/0063058 A1 | 3/2014 | Fialho et al. |
| 2014/0063061 A1 | 3/2014 | Reitan |
| 2014/0071041 A1 | 3/2014 | Fujimaki |
| 2014/0085451 A1* | 3/2014 | Kamimura ......... H04N 5/23219 348/78 |
| 2014/0101195 A1 | 4/2014 | Li et al. |
| 2014/0104280 A1 | 4/2014 | Ofstad et al. |
| 2014/0108020 A1 | 4/2014 | Sharma et al. |
| 2014/0111838 A1 | 4/2014 | Han et al. |
| 2014/0118631 A1 | 5/2014 | Cho |
| 2014/0118829 A1 | 5/2014 | Ma et al. |
| 2014/0119598 A1 | 5/2014 | Ramachandran et al. |
| 2014/0125668 A1 | 5/2014 | Steed et al. |
| 2014/0125698 A1 | 5/2014 | Latta et al. |
| 2014/0132595 A1 | 5/2014 | Boulanger et al. |
| 2014/0132733 A1 | 5/2014 | Mundhenk et al. |
| 2014/0168754 A1 | 6/2014 | Kim et al. |
| 2014/0176591 A1 | 6/2014 | Klein et al. |
| 2014/0184487 A1 | 7/2014 | Cai et al. |
| 2014/0191946 A1 | 7/2014 | Cho et al. |
| 2014/0198954 A1 | 7/2014 | Bulzacki |
| 2014/0204389 A1 | 7/2014 | Mukoh et al. |
| 2014/0206389 A1* | 7/2014 | Aldana ............... H04W 4/021 455/456.2 |
| 2014/0206444 A1 | 7/2014 | Lin et al. |
| 2014/0207282 A1 | 7/2014 | Angle et al. |
| 2014/0214547 A1 | 7/2014 | Signorelli et al. |
| 2014/0214629 A1 | 7/2014 | Azam et al. |
| 2014/0226900 A1 | 8/2014 | Saban et al. |
| 2014/0232641 A1 | 8/2014 | Sendai |
| 2014/0240842 A1 | 8/2014 | Nguyen et al. |
| 2014/0248950 A1 | 9/2014 | Tosas Bautista |
| 2014/0253732 A1 | 9/2014 | Brown et al. |
| 2014/0267405 A1 | 9/2014 | Mullins |
| 2014/0267406 A1 | 9/2014 | Mullins |
| 2014/0267407 A1 | 9/2014 | Mullins |
| 2014/0267408 A1 | 9/2014 | Mullins |
| 2014/0267411 A1* | 9/2014 | Fein ............... G06F 17/30241 345/633 |
| 2014/0267413 A1 | 9/2014 | Du et al. |
| 2014/0267723 A1 | 9/2014 | Davidson, Jr. et al. |
| 2014/0279860 A1 | 9/2014 | Pan et al. |
| 2014/0288714 A1 | 9/2014 | Poivet |
| 2014/0291480 A1 | 10/2014 | Bruder et al. |
| 2014/0292807 A1 | 10/2014 | Raffa et al. |
| 2014/0306891 A1 | 10/2014 | Latta et al. |
| 2014/0314322 A1 | 10/2014 | Snavely et al. |
| 2014/0320389 A1 | 10/2014 | Scavezze et al. |
| 2014/0323148 A1 | 10/2014 | Schmalstieg et al. |
| 2014/0354686 A1 | 12/2014 | Mullins |
| 2014/0362195 A1 | 12/2014 | Ng-Thow-Hing et al. |

(56) References Cited

U.S. PATENT DOCUMENTS

| | | | |
|---|---|---|---|
| 2014/0368534 | A1 | 12/2014 | Salter et al. |
| 2014/0375541 | A1* | 12/2014 | Nister .................. G06F 3/013 345/156 |
| 2014/0375683 | A1 | 12/2014 | Salter et al. |
| 2014/0375688 | A1 | 12/2014 | Redmann et al. |
| 2014/0375773 | A1 | 12/2014 | He et al. |
| 2015/0002528 | A1 | 1/2015 | Bohn et al. |
| 2015/0023602 | A1 | 1/2015 | Wnuk et al. |
| 2015/0029222 | A1 | 1/2015 | Hofmann |
| 2015/0029223 | A1 | 1/2015 | Kaino et al. |
| 2015/0040074 | A1 | 2/2015 | Hofmann et al. |
| 2015/0062323 | A1* | 3/2015 | Gustafsson ............ G06F 3/013 348/78 |
| 2015/0070145 | A1 | 3/2015 | Mar et al. |
| 2015/0070347 | A1 | 3/2015 | Hofmann et al. |
| 2015/0084951 | A1 | 3/2015 | Boivin et al. |
| 2015/0091790 | A1 | 4/2015 | Forutanpour et al. |
| 2015/0094089 | A1 | 4/2015 | Moeglein et al. |
| 2015/0097772 | A1 | 4/2015 | Starner |
| 2015/0098645 | A1 | 4/2015 | Leung |
| 2015/0103003 | A1* | 4/2015 | Kerr .................... G06F 3/013 345/158 |
| 2015/0109338 | A1 | 4/2015 | McKinnon et al. |
| 2015/0125045 | A1 | 5/2015 | Gauglitz et al. |
| 2015/0145888 | A1 | 5/2015 | Hanai |
| 2015/0145985 | A1 | 5/2015 | Gourlay et al. |
| 2015/0172626 | A1 | 6/2015 | Martini |
| 2015/0182116 | A1* | 7/2015 | Pletcher ............... A61B 5/0026 600/345 |
| 2015/0185027 | A1 | 7/2015 | Kikkeri et al. |
| 2015/0185825 | A1 | 7/2015 | Mullins |
| 2015/0187108 | A1 | 7/2015 | Mullins |
| 2015/0187137 | A1 | 7/2015 | Mullins |
| 2015/0187138 | A1 | 7/2015 | Mullins |
| 2015/0234475 | A1 | 8/2015 | Latta et al. |
| 2015/0235441 | A1 | 8/2015 | Abovitz et al. |
| 2015/0262029 | A1 | 9/2015 | Pirchheim et al. |
| 2015/0262407 | A1 | 9/2015 | Fursund et al. |
| 2015/0278576 | A1 | 10/2015 | Horesh et al. |
| 2015/0287203 | A1 | 10/2015 | Baumberg |
| 2015/0289762 | A1* | 10/2015 | Popovich ............ G02B 27/0093 351/209 |
| 2015/0302643 | A1 | 10/2015 | Miller |
| 2015/0302655 | A1 | 10/2015 | Miller et al. |
| 2015/0302656 | A1 | 10/2015 | Miller et al. |
| 2015/0302657 | A1 | 10/2015 | Miller |
| 2015/0316980 | A1* | 11/2015 | Miller .................. G06F 3/011 345/419 |
| 2015/0323795 | A1 | 11/2015 | Alton et al. |
| 2015/0348329 | A1 | 12/2015 | Carre et al. |
| 2015/0363979 | A1 | 12/2015 | Takano et al. |
| 2015/0370071 | A1 | 12/2015 | Alton et al. |
| 2015/0371448 | A1 | 12/2015 | Mullins |
| 2015/0382127 | A1 | 12/2015 | Sun et al. |
| 2016/0003636 | A1 | 1/2016 | Ng-Thow-Hing et al. |
| 2016/0041390 | A1 | 2/2016 | Poon et al. |
| 2016/0179830 | A1 | 6/2016 | Schmalstieg et al. |
| 2016/0187969 | A1 | 6/2016 | Larsen et al. |
| 2016/0209657 | A1* | 7/2016 | Popovich ............ G02B 27/017 |
| 2016/0307374 | A1 | 10/2016 | Kurz et al. |
| 2017/0010473 | A1* | 1/2017 | Ide .................... G02B 27/2214 |
| 2017/0078652 | A1 | 3/2017 | Hua et al. |
| 2017/0102545 | A1* | 4/2017 | Hua ................... G02B 27/0172 |

OTHER PUBLICATIONS

Non final Office action dated Apr. 25, 2017 for U.S. Appl. No. 14/706,888 (21 pages).
Amendment Response to Non-Final Office Action dated Jan. 31, 2017, filed on Apr. 28, 2017 for U.S. Appl. No. 14/705,985.
Amendment Response to Final Office Action dated Feb. 22, 2017, filed on May 3, 2017 for U.S. Appl. No. 14/706,995.
Non final Office action dated May 1, 2017 for U.S. Appl. No. 14/706,758 (50 pages).
Response to Non Final Office action dated Feb. 7, 2017, filed on May 8, 2017 for U.S. Appl. No. 14/705,989, 19 pages.
Non-Final Office Action dated May 4, 2017 for U.S. Appl. No. 14/706,863.
Non-Final Office Action dated May 4, 2017 for U.S. Appl. No. 14/706,809.
Response to Final Office Action dated Feb. 14, 2017, filed May 15, 2017 for U.S. Appl. No. 14/706,993.
Notice of Allowance dated May 12, 2017 for U.S. Appl. No. 14/706,994.
Response to Final Office Action dated Feb. 13, 2017 filed May 18, 2017 for U.S. Appl. No. 14/705,856.
Non-Final Office Action dated May 11, 2017 for U.S. Appl. No. 14/705,869.
Non-Final Office Action dated May 17, 2017 for U.S. Appl. No. 14/705,920.
Advisory Action dated May 9, 2017 for U.S. Appl. No. 14/707,000 3 pages.
Non-Final Office Action dated May 10, 2017 for U.S. Appl. No. 14/706,875.
Final Office Action dated May 18, 2017 for U.S. Appl. No. 14/705,985.
Response to Non-Final Office Action dated Feb. 16, 2017, filed May 18, 2017 for U.S. Appl. No. 14/705,980.
Invitation to pay additional fees and partial search report dated Jun. 25, 2015 for PCT/US2015/026559, Applicant Magic Leap, Inc., 2 pages.
International search report and written opinion dated Sep. 1, 2015 for PCT/US2015/026559, Applicant Magic Leap, Inc., 11 pages.
Non-Final Office Action dated Jul. 5, 2016 for U.S. Appl. No. 14/690,401.
Amendment Response to Non-Final Office Action dated Jul. 5, 2016, filed on Oct. 3, 2016 for U.S. Appl. No. 14/690,401.
Final office action dated Jan. 9, 2017 for U.S. Appl. No. 14/690,401.
Non-Final Office Action dated Jun. 10, 2016 for U.S. Appl. No. 14/705,856.
Amendment Response to Non-Final Office Action dated Jun. 10, 2016, filed on Dec. 9, 2016 for U.S. Appl. No. 14/705,856.
Final Office Action dated Sep. 21, 2016 for U.S. Appl. No. 14/705,869.
Non-Final Office Action dated Jun. 10, 2016 for U.S. Appl. No. 14/705,869.
Amendment Response to Non-Final Office Action dated Jun. 10, 2016, filed on Sep. 12, 2016 for U.S. Appl. No. 14/705,869.
Final Office Action dated Dec. 13, 2016 for U.S. Appl. No. 14/705,920.
Non-Final Office Action dated Jun. 16, 2016 for U.S. Appl. No. 14/705,920.
Amendment Response to Non-Final Office Action dated Jun. 16, 2016, filed on Oct. 11, 2016 for U.S. Appl. No. 14/705,920.
Non-Final Office Action dated Sep. 2, 2016 for U.S. Appl. No. 14/706,993.
Amendment Response to Non-Final Office Action dated Sep. 2, 2016, filed on Dec. 1, 2016 for U.S. Appl. No. 14/706,993.
Non-Final Office Action dated Sep. 13, 2016 for U.S. Appl. No. 14/706,994.
Non-Final Office Action dated Jun. 20, 2016 for U.S. Appl. No. 14/705,924.
Amendment Response to Non-Final Office Action dated Jun. 20, 2016, filed on Sep. 20, 2016 for U.S. Appl. No. 14/706,924.
Non-Final Office Action dated Jun. 2, 2016 for U.S. Appl. No. 14/705,981.
Final Office Action dated Oct. 12, 2016 for U.S. Appl. No. 14/705,981.
Amendment Response to Non-Final Office Action dated Jun. 2, 2016, filed on Oct. 3, 2016 for U.S. Appl. No. 14/705,981.
Non-Final Office Action dated Sep. 8, 2016 for U.S. Appl. No. 14/706,995.
Amendment Response to Non-Final Office Action dated Sep. 8, 2016, filed on Dec. 7, 2016 for U.S. Appl. No. 14/706,995.

(56) References Cited

OTHER PUBLICATIONS

Non-Final Office Action dated Jun. 2, 2016 for U.S. Appl. No. 14/705,983.
Final Office Action dated Oct. 17, 2016 for U.S. Appl. No. 14/705,983.
Amendment Response to Non-Final Office Action dated Jun. 2, 2016, filed on Oct. 3, 2016 for U.S. Appl. No. 14/705,983.
Non-Final Office Action dated Jul. 19, 2016 for U.S. Appl. No. 14/706,996.
Amendment Response to Non-Final Office Action dated Jul. 19, 2016, filed on Nov. 17, 2016 for U.S. Appl. No. 14/706,996.
Non-Final Office Action dated Jul. 12, 2016 for U.S. Appl. No. 14/705,990.
Amendment Response to Non-Final Office Action dated Jul. 12, 2016, filed on Oct. 12, 2016 for U.S. Appl. No. 14/705,990.
Non-Final Office Action dated Jul. 14, 2016 for U.S. Appl. No. 14/705,994.
Amendment Response to Non-Final Office Action dated Jul. 14, 2016, filed on Oct. 12, 2016 for U.S. Appl. No. 14/705,994.
Non-Final Office Action dated Jul. 22, 2016 for U.S. Appl. No. 14/705,997.
Amendment Response to Non-Final Office Action dated Jul. 22, 2016, filed on Oct. 24, 2016 for U.S. Appl. No. 14/705,997.
Non-Final Office Action dated Jul. 25, 2016 for U.S. Appl. No. 14/705,998.
Amendment Response to Non-Final Office Action dated Jul. 25, 2016, filed on Oct. 24, 2016 for U.S. Appl. No. 14/705,997.
Final Office Action dated Oct. 20, 2016 for U.S. Appl. No. 14/706,809.
Non-Final Office Action dated Jun. 15, 2016 for U.S. Appl. No. 14/706,809.
Amendment Response to Non-Final Office Action dated Jun. 15, 2016, filed on Oct. 5, 2016 for U.S. Appl. No. 14/706,809.
Non-Final Office Action dated Jul. 26, 2016 for U.S. Appl. No. 14/706,838.
Amendment Response to Non-Final Office Action dated Jun. 26, 2016, filed on Oct. 25, 2016 for U.S. Appl. No. 14/706,838.
Non-Final Office Action dated Jul. 1, 2016 for U.S. Appl. No. 14/706,863.
Amendment Response to Non-Final Office Action dated Jul. 1, 2016, filed on Sep. 28, 2016 for U.S. Appl. No. 14/706,863.
Non-Final Office Action dated Jul. 28, 2016 for U.S. Appl. No. 14/707,000.
Amendment Response to Non-Final Office Action dated Jul. 28, 2016, filed on Oct. 25, 2016 for U.S. Appl. No. 14/707,000.
Non-Final Office Action dated Jul. 5, 2016 for U.S. Appl. No. 14/706,875.
Amendment Response to Non-Final Office Action dated Jul. 5, 2016, filed on Oct. 3, 2016 for U.S. Appl. No. 14/706,875.
Non-Final Office Action dated Jul. 29, 2016 for U.S. Appl. No. 14/706,888.
Amendment Response to Non-Final Office Action dated Jul. 29, 2016, filed on Oct. 31, 2016 for U.S. Appl. No. 14/706,888.
Non-Final Office Action dated Sep. 12, 2016 for U.S. Appl. No. 14/707,001.
Amendment Response to Non-Final Office Action dated Sep. 12, 2016, filed on Dec. 7, 2016 for U.S. Appl. No. 14/707,001.
Final Office Action dated Dec. 16, 2016 for U.S. Appl. No. 14/706,891.
Non-Final Office Action dated Jul. 14, 2016 for U.S. Appl. No. 14/706,891.
Amendment Response to Non-Final Office Action dated Jul. 14, 2016, filed on Oct. 10, 2016 for U.S. Appl. No. 14/706,891.
Final Office Action dated Jan. 11, 2017 for U.S. Appl. No. 14/706,838.
Final Office Action dated Jan. 10, 2017 for U.S. Appl. No. 14/706,875.
Non-Final Office Action dated Jan. 12, 2017 for U.S. Appl. No. 14/706,897.
Final Office Action dated Jan. 13, 2017 for U.S. Appl. No. 14/705,994.
Final Office Action dated Jan. 12, 2017 for U.S. Appl. No. 14/706,863.
Final Office Action dated Jan. 12, 2017 for U.S. Appl. No. 14/705,990.
Final Office Action dated Jan. 18, 2017 for U.S. Appl. No. 14/705,997.
Final Office Action dated Jan. 19, 2017 for U.S. Appl. No. 14/705,998.
Non-Final Office Action dated Jan. 25, 2017 for U.S. Appl. No. 14/705,986.
Non-Final Office Action dated Jan. 31, 2017 for U.S. Appl. No. 14/705,985.
Final Office Action dated Jan. 31, 2017 for U.S. Appl. No. 14/707,000.
Amendment Response to Final Office Action dated Oct. 12, 2016, filed on Feb. 13, 2017 for U.S. Appl. No. 14/705,981.
Final Office Action dated Feb. 8, 2017 for U.S. Appl. No. 14/706,888.
Non-Final Office Action dated Feb. 7, 2017 for U.S. Appl. No. 14/705,989.
Notice of Allowance dated Feb. 3, 2017, for U.S. Appl. No. 14/706,996.
Final Office Action dated Feb. 13, 2017 for U.S. Appl. No. 14/705,856.
Non-Final Office Action dated Feb. 16, 2017 for U.S. Appl. No. 14/705,980.
Final Office Action dated Feb. 14, 2017 for U.S. Appl. No. 14/706,993.
Amendment Response to Final Office Action dated Dec. 16, 2016, filed on Feb. 16, 2017 for U.S. Appl. No. 14/706,891.
Amendment Response to Final Office Action dated Sep. 21, 2016, filed on Feb. 21, 2017 for U.S. Appl. No. 14/705,869.
Amendment Response to Final Office Action dated Oct. 17, 2016, filed on Feb. 17, 2017 for U.S. Appl. No. 14/705,983.
Final Office Action dated Feb. 22, 2017 for U.S. Appl. No. 14/706,995.
Notice of Allowance dated Mar. 1, 2017, for U.S. Appl. No. 14/706,996.
Amendment Response to Non-Final Office Action dated Sep. 13, 2016, filed on Mar. 3, 2017 for U.S. Appl. No. 14/706,994.
Amendment Response to Final Office Action dated Dec. 13, 2016, filed on Mar. 10, 2017 for U.S. Appl. No. 14/705,920.
Amendment Response to Final Office Action dated Oct. 20, 2016, filed on Mar. 17, 2017 for U.S. Appl. No. 14/706,809.
Non-Final Office Action dated Mar. 9, 2017 for U.S. Appl. No. 14/705,981.
Final Office Action dated Mar. 2, 2017 for U.S. Appl. No. 14/707,001.
Amendment Response to Final Office Action dated Jan. 31, 2017, filed on Mar. 28, 2017 for U.S. Appl. No. 14/707,000.
Amendment Response to Final Office Action dated Jan. 9, 2017, filed on Apr. 5, 2017 for U.S. Appl. No. 14/690,401.
Amendment Response to Final Office Action dated Feb. 8, 2017, filed on Apr. 5, 2017 for U.S. Appl. No. 14/706,888.
Amendment Response to Final Office Action dated Jan. 11, 2017, filed on Apr. 7, 2017 for U.S. Appl. No. 14/706,838.
Ackerman, E., "4-D Light Field Displays Are Exactly What Virtual Reality Needs," retrieved from http://spectrum.ieee.org/tech-talk/consumer-electronics/gaming/4d-light-f, dated Aug. 14, 2015 (4 pages).
Levoy, M., et al., "Light Field Rendering," Computer Science Department, Stanford University, dated Jul. 1996 (12 pages).
Non Final Office Action dated Apr. 6, 2017 for U.S. Appl. No. 14/706,891 (15 pages).
Amendment Response to Non-Final Office Action dated Jan. 12, 2017, filed on Apr. 12, 2017 for U.S. Appl. No. 14/706,897.
Amendment Response to Final Office Action dated Jan. 18, 2017, filed on Apr. 14, 2017 for U.S. Appl. No. 14/705,997.
Amendment Response to Final Office Action dated Jan. 19, 2017, filed on Apr. 14, 2017 for U.S. Appl. No. 14/705,998.

(56) References Cited

OTHER PUBLICATIONS

Amendment Response to Final Office Action dated Dec. 29, 2016, filed on Apr. 17, 2017 for U.S. Appl. No. 14/705,924.
Amendment Response to Final Office Action dated Jan. 10, 2017, filed on Apr. 10, 2017 for U.S. Appl. No. 14/706,875.
Amendment Response to Final Office Action dated Jan. 12, 2017, filed on Apr. 10, 2017 for U.S. Appl. No. 14/706,863.
Pre-Appeal Brief filed on Apr. 10, 2017 for U.S. Appl. No. 14/705,994.
Pre-Appeal Brief filed on Apr. 10, 2017 for U.S. Appl. No. 14/705,990.
Amendment Response to Non-Final Office Action dated Jan. 25, 2017, filed on Apr. 25, 2017 for U.S. Appl. No. 14/705,986.
Non-Final Office Action dated May 31, 2017 for U.S. Appl. No. 14/690,401.
Non-Final Office Action dated Jun. 5, 2017 for U.S. Appl. No. 14/705,856.
Final Office Action dated Jun. 1, 2017 for U.S. Appl. No. 14/705,986.
Response to Non-Final Office Action filed Jun. 8, 2017 for U.S. Appl. No. 14/705,981.
Response to Final Office Action (RCE) filed Jun. 9, 2017, for U.S. Appl. No. 14/707,000.
Non-Final Office Action dated Jun. 16, 2017 for U.S. Appl. No. 14/706,995.
Non-Final Office Action dated Jun. 16, 2017 for U.S. Appl. No. 14/705,998.
Non-Final Office Action dated Jun. 15, 2017 for U.S. Appl. No. 14/705,997.
Response to Non-Final Office Action filed Jul. 6, 2017 for U.S. Appl. No. 14/706,891.
Notice of Allowance dated Jul. 17, 2017 for U.S. Appl. No. 14/706,993, 8 pages.
Non-Final Office Action dated Jun. 30, 2017 for U.S. Appl. No. 14/705,983, 47 pages.
Notice of Allowance dated Jul. 6 2017 for U.S. Appl. No. 14/706,994, 8 pages.
Non Final Office Action dated Jun. 22, 2017 for U.S. Appl. No. 14/706,838, 17 pages.
Response to Final Office Action/RCE filed May 30, 2017 for U.S. Appl. No. 14/707,001, 17 pages.
Non-Final Office Action dated Jul. 6 2017 for U.S. Appl. No. 14/707,000.
Non-Final Office Action dated Jul. 20, 2017 for U.S. Appl. No. 14/705,990.
Notice of Allowance dated Jul. 20, 2017 for U.S. Appl. No. 14/706,996.
Response to Non-Final Office Action filed Jul. 25, 2017 for U.S. Appl. No. 14/706,888, 18 pages.
Non-Final Office Action dated Jul. 21, 2017 for U.S. Appl. No. 14/707,001.
Non-Final Office Action dated Jul. 21, 2017 for U.S. Appl. No. 14/705,994.
Final Office Action dated Jul. 21, 2017 for U.S. Appl. No. 14/705,989.
Final Office Action dated Jul. 26, 2017 for U.S. Appl. No. 14/705,980.
Response to Non-Final Office Action filed Jul. 28, 2017 for U.S. Appl. No. 14/706,758, 16 pages.
Response to Final Office Action filed Jul. 31, 2017 for U.S. Appl. No. 14/705,986, 23 pages.
Final Office Action dated Jul. 28, 2017 for U.S. Appl. No. 14/706,897.
Response to Non-Final Office Action filed Aug. 4, 2017 for U.S. Appl. No. 14/706,809, 20 pages.
Response to Non-Final Office Action filed Aug. 4, 2017 for U.S. Appl. No. 14/706,863, 20 pages.
Notice of Allowability dated Aug. 8, 2017 for U.S. Appl. No. 14/706,993.
Response to Non-Final Office Action filed Aug. 11, 2017 for U.S. Appl. No. 14/705,869, 21 pages.
Response to Non-Final Office Action filed Aug. 10, 2017 for U.S. Appl. No. 14/706,875, 11 pages.
Advisory Action dated Aug. 11 2017 for U.S. Appl. No. 14/705,986 5 pages.
Response to Non-Final Office Action filed Aug. 17, 2017 for U.S. Appl. No. 14/705,920.
Final Office Action dated Aug. 11, 2017 for U.S. Appl. No. 14/706,888.
Response to Final Office Action filed Aug. 18, 2017 for U.S. Appl. No. 14/705,985.
Response to Non Final Office Action filed Sep. 5, 2017 for U.S. Appl. No. 14/705,856.
Response to Non Final Office Action filed Aug. 31, 2017 for U.S. Appl. No. 14/690,401.
Final Office Action dated Aug. 29, 2017 for U.S. Appl. No. 14/705,981.
Response to Final Office Action filed Aug. 31, 2017 for U.S. Appl. No. 14/705,986.
Notice of Allowance for dated Aug. 23, 2017 for U.S. Appl. No. 14/706,891.
Response to Non Final Office Action dated Sep. 15, 2017 for U.S. Appl. No. 14/705,998.
Response to Non Final Office Action dated Sep. 15, 2017 for U.S. Appl. No. 14/706,995.
Response to Non Final Office Action dated Sep. 15, 2017 for U.S. Appl. No. 14/705,997.
Response to Final Office Action filed Sep. 21, 2017 for U.S. Appl. No. 14/705,989.
Response to Non Final Office Action filed Sep. 22, 2017 for U.S. Appl. No. 14/706,838.
Response to Final Office Action filed Sep. 28, 2017 for U.S. Appl. No. 14/706,897.
Response to Non Final Office Action filed Sep. 29, 2017 for U.S. Appl. No. 14/705,983.
Final Office Action dated Oct. 5, 2017 for U.S. Appl. No. 14/705,920.
Final Office Action dated Sep. 26, 2017 for U.S. Appl. No. 14/706,863.
Non-Final Office Action dated Sep. 28, 2017 for U.S. Appl. No. 14/705,986.
Response to Non Final Office Action filed Oct. 2, 2017 for U.S. Appl. No. 14/705,924.
Response to Non Final Office Action filed Oct. 6, 2017 for U.S. Appl. No. 14/707,000.
Notice of Allowance dated Oct. 19, 2017 for U.S. Appl. No. 14/706,897.
Final Office Action dated Oct. 13, 2017 for U.S. Appl. No. 14/706,758.
Advisory Action dated Oct. 12, 2017 for U.S. Appl. No. 14/705,989.
Response to Non Final Office Action filed Oct. 19, 2017 for U.S. Appl. No. 14/705,990.
Response to Non Final Office Action filed Oct. 23, 2017 for U.S. Appl. No. 14/705,994.
Response to Non Final Office Action filed Oct. 23, 2017 for U.S. Appl. No. 14/707,001.
Response to Final Office Action filed Oct. 26, 2017 for U.S. Appl. No. 14/705,980.
Notice of Allowance dated Oct. 27, 2017 for U.S. Appl. No. 14/706,809.
Response to Final Office Action filed Nov. 13, 2017 for U.S. Appl. No. 14/706,888.
Response to Final Office Action filed Nov. 20, 2017 for U.S. Appl. No. 14/706,863.
Response to Final Office Action filed Nov. 21, 2017 for U.S. Appl. No. 14/705,989.
Response to Final Office Action filed Nov. 29, 2017 for U.S. Appl. No. 14/705,981.
AFCP Amendment and Response to Final Office Action filed Dec. 5, 2017 for U.S. Appl. No. 14/705,920.
Non-Final Office Action dated Nov. 29, 2017 for U.S. Appl. No. 14/705,985.

(56) References Cited

OTHER PUBLICATIONS

Notice of Allowance dated Dec. 1, 2017 for U.S. Appl. No. 14/706,863.
Notice of Allowance dated Dec. 1, 2017 for U.S. Appl. No. 14/706,888.
Kwon; Sun-Jae; Virtual reality simulation apparatus and method using motion capture technology; Jan. 29, 2014; machine translation of Korean Registered Patent No. 10-1389894; 19 pages.
Final office action dated Dec. 6, 2017 for U.S. Appl. No. 14/706,995, 19 pages.
Final office action dated Dec. 6, 2017 for U.S. Appl. No. 14/706,875, 14 pages.
Final office action dated Dec. 8, 2017 for U.S. Appl. No. 14/705,983, 63 pages.
Final office action dated Dec. 14, 2017 for U.S. Appl. No. 14/705,856, 44 pages.
Final office action dated Dec. 15, 2017 for U.S. Appl. No. 14/705,997, 11 pages.
Final office action dated Dec. 18, 2017 for U.S. Appl. No. 14/690,401.
Final office action dated Dec. 20, 2017 for U.S. Appl. No. 14/707,001, 25 pages.
Final office action dated Dec. 21, 2017 for U.S. Appl. No. 14/706,838, 19 pages.
Response to Non Final Office Action filed Dec. 28, 2017 for U.S. Appl. No. 14/705,986.
Final office action dated Dec. 26, 2017 for U.S. Appl. No. 14/705,924.
Final office action dated Dec. 29, 2017 for U.S. Appl. No. 14/705,998.
Final office action dated Dec. 28, 2017 for U.S. Appl. No. 14/705,000.
Response to Final Office Action filed Jan. 11, 2018 for U.S. Appl. No. 14/706,758.
Final Office Action dated Jan. 11, 2018 for U.S. Appl. No. 14/705,990.
Final Office Action dated Jan. 17, 2018 for U.S. Appl. No. 14/705,994.
Notice of Allowance dated Jan. 31, 2018 for U.S. Appl. No. 14/705,989.
Advisory Action dated Feb. 2, 2018 for U.S. Appl. No. 14/705,920.

* cited by examiner

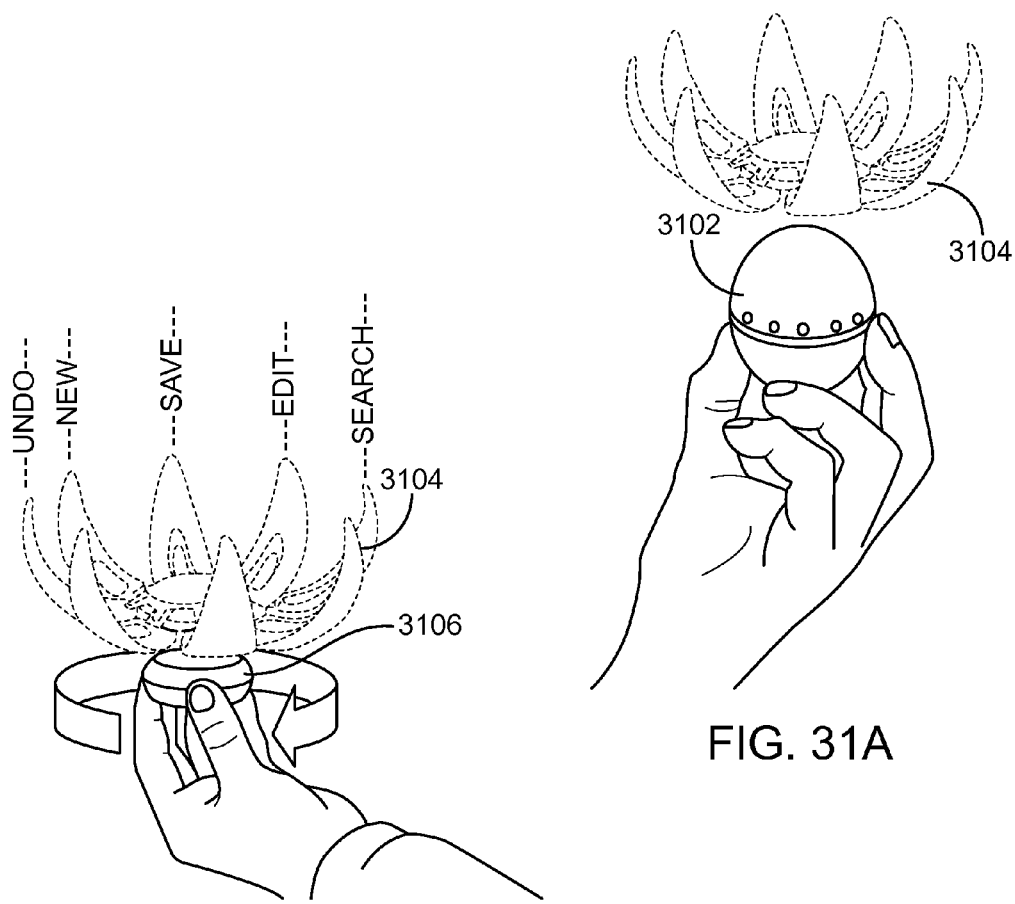
FIG. 31A
FIG. 31B
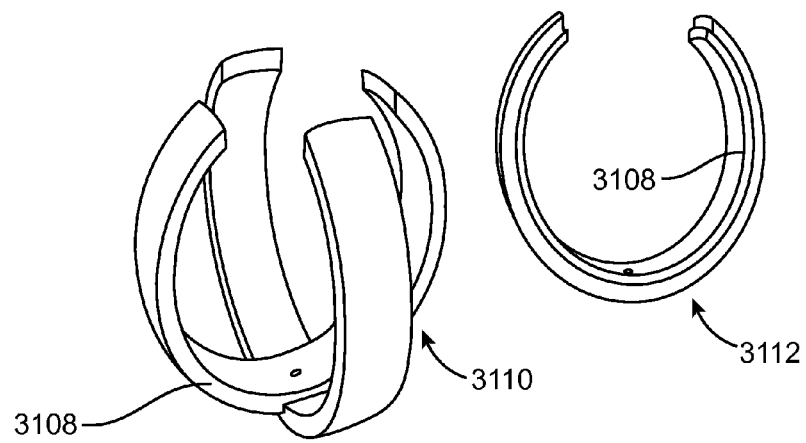
FIG. 31C

UTILIZING PSEUDO-RANDOM PATTERNS FOR EYE TRACKING IN AUGMENTED OR VIRTUAL REALITY SYSTEMS

CROSS-REFERENCE TO RELATED APPLICATIONS

This application is a continuation of pending U.S. patent application Ser. No. 14/690,401, filed Apr. 18, 2015, which claims priority from U.S. Provisional Patent App. Ser. No. 61/981,701 entitled "SYSTEMS AND METHOD FOR AUGMENTED AND VIRTUAL REALITY," filed Apr. 18, 2014 and U.S. Provisional Patent App. Ser. No. 62/012,273 entitled "METHODS AND SYSTEMS FOR CREATING VIRTUAL AND AUGMENTED REALITY," filed Jun. 14, 2014. The Ser. No. 14/690,401 application is also a continuation-in-part of U.S. patent application Ser. No. 14/331,218 entitled "PLANAR WAVEGUIDE APPARATUS WITH DIFFRACTION ELEMENT(S) AND SYSTEM EMPLOYING SAME," filed Jul. 14, 2014. The contents of the foregoing patent applications are hereby expressly incorporated by reference into the present application in their entireties.

FIELD OF THE INVENTION

The present invention generally relates to systems and methods configured to facilitate interactive virtual or augmented reality environments for one or more users.

BACKGROUND

Virtual and augmented reality environments are generated by computers using, in part, data that describes the environment. This data may describe, for example, various objects with which a user may sense and interact with. Examples of these objects include objects that are rendered and displayed for a user to see, audio that is played for a user to hear, and tactile (or haptic) feedback for a user to feel. Users may sense and interact with the virtual and augmented reality environments through a variety of visual, auditory and tactical means.

Virtual or augmented reality (AR) systems may be useful for many applications, spanning the fields of scientific visualization, medicine and military training, engineering design and prototyping, tele-manipulation and tele-presence, and personal entertainment. Augmented reality, in contrast to virtual reality, comprises one or more virtual objects in relation to real objects of the physical world. Such an experience greatly enhances the user's experience and enjoyability with the augmented reality system, and also opens the door for a variety of applications that allow the user to experience real objects and virtual objects simultaneously.

However, there are significant challenges in providing such a system. To provide a realistic augmented reality experience to users, the AR system must always know the user's physical surroundings in order to correctly correlate a location of virtual objects in relation to real objects. Further, the AR system must correctly know how to position virtual objects in relation to the user's head, body etc. This requires extensive knowledge of the user's position in relation to the world at all times. Additionally, these functions must be performed in a manner such that costs (e.g., energy costs, etc.) are kept low while speed and performance are maintained.

There, thus, is a need for improved systems to provide a realistic augmented reality experience to users.

SUMMARY

Embodiments of the present invention(s) are directed to devices, systems and methods for facilitating virtual and/or augmented reality interaction for one or more users.

Embodiments described herein provide augmented reality systems, typically with user worn components, for instance head worn headsets. Embodiments provide for various virtual user interface constructions and/or user input modalities, for example via gestures and/or interaction with totems.

In one aspect, an augmented reality system comprises a first augmented reality display system corresponding to a first location, wherein the first individual augmented reality display system captures data pertaining to the first location, a second augmented reality display system corresponding to a second location, wherein the second individual augmented reality display system captures data pertaining to the second location, and a server comprising a processor to receive the captured data from the first individual augmented reality display system and the second individual augmented reality display system, and to construct at least a portion of a map of the real world comprising the first and second locations based at least in part on the received captured data from the first and the second individual augmented reality display systems.

In one or more embodiments, the first augmented reality display system is a head-mounted augmented reality display system. In one or more embodiments, the first augmented reality display system is a room-based sensor system. In one or more embodiments, the constructed map is transmitted to at least one of the first and second augmented reality display systems.

In one or more embodiments, a virtual object is projected to at least one of the first and second augmented reality display systems based at least in part on the constructed map of the real world. In one or more embodiments, the captured data is at least an image captured at the first or second location. In one or more embodiments, the captured data corresponds to sensor data. In one or more embodiments, the processor extracts a set of map points from the data captured from the first and second augmented reality display systems, and wherein the set of map points are used to construct the map of the real world.

In one or more embodiments, a part of the map corresponding to the first augmented reality display system is transmitted to the second augmented reality display system. In one or more embodiments, the captured data comprises pose tagged images corresponding to the first location. In one or more embodiments, the captured data comprises pose information of the first and second augmented reality display systems, wherein the map is constructed based at least in part on the pose information.

In another aspect, a method of displaying augmented reality comprises capturing a first set of data at a first augmented reality display system corresponding to a first location, capturing a second set of data at a second augmented reality display system corresponding to a second location, receiving the first and second set of data from the first and second augmented reality display systems, and constructing a map of the real world comprising the first and second locations based at least in part on the data received from the first and second augmented reality display systems.

In one or more embodiments, the first augmented reality display system is a head-mounted augmented reality display system. In one or more embodiments, the first augmented reality display system is a room-based augmented reality display system. In one or more embodiments, the constructed map is transmitted to at least one of the first and second augmented reality display systems.

In one or more embodiments, a virtual object is projected to at least one of the first and second augmented reality display systems based at least in part on the constructed map of the real world. In one or more embodiments, the captured data is at least an image captured at the first or second location. In one or more embodiments, the captured data corresponds to sensor data.

In one or more embodiments, the method further comprises extracting a set of map points from the data captured from the first and second augmented reality display systems, and wherein the set of map points are used to construct the map of the real world. In one or more embodiments, a part of the map corresponding to the first augmented reality display system is transmitted to the second augmented reality display system. In one or more embodiments, the captured data comprises pose tagged images corresponding to the first location.

In one or more embodiments, the captured data comprises pose information of the first and second augmented reality display systems, wherein the map is constructed based at least in part on the pose information.

In another aspect, a space-based sensor system, comprises at least one sensor to capture information pertaining to a space, wherein a pose of the image sensor relative to the space is known, and a processor to receive the captured information, and to construct a map of the world comprising the space based at least in part on the captured information, and to transmit the map to one or more augmented reality display systems such that virtual content is displayed to one or more users of the augmented reality display systems based at least on the constructed map.

In one or more embodiments, the at least one sensor is an image-based sensor. In one or more embodiments, the at least one sensor is an audio sensor. In one or more embodiments, the at least one sensor is an environmental sensor. In one or more embodiments, the at least one sensor is a temperature-based sensor. In one or more embodiments, the at least one sensor is a humidity-based sensor. In one or more embodiments, the pose comprises a position of the at least one sensor within the room.

In one or more embodiments, the information is captured with respect to a reference frame corresponding to the space. In one or more embodiments, the pose comprises an orientation of the at least one sensor within the room. In one or more embodiments, the space-based sensor system is stationary.

In one or more embodiments, the processor performs one or more transformations to relate a reference frame of the space-based sensor to the reference frame corresponding to the space. In one or more embodiments, the transformation comprises a translation matrix. In one or more embodiments, the transformation comprises a rotation matrix.

In another aspect, an augmented reality system comprises a passable world model comprising a set of map points corresponding to one or more objects of the real world, and a processor to communicate with one or more individual augmented reality display systems to pass a piece of the passable world to the one or more individual augmented reality display systems, wherein the piece of the passable world is passed based at least in part on respective locations corresponding to the one or more individual augmented reality display systems.

In one or more embodiments, at least a portion of the passable world model resides in the one or more individual augmented reality display systems. In one or more embodiments, at least a portion of the passable world model resides in a cloud-based server. In one or more embodiments, the passable world is constantly updated based at least in part on information received from the one or more individual augmented reality display systems. In one or more embodiments, a communication between the passable world model and the individual augmented reality systems is asynchronous.

In another aspect, a method comprises detecting a location of a user of an augmented reality display system, retrieving, based on the detected location, data pertaining to the detected location of the user of the augmented reality display system, wherein the data pertaining to the detected location comprises map points corresponding to one or more real objects of the detected location, and displaying one or more virtual objects to the user of the augmented reality display system relative to the one or more real objects of the location, based at least in part on the retrieved data.

In one or more embodiments, the method further comprises determining a set of parameters corresponding to a movement of the user of the augmented reality system relative to the detected location, calculating, based on the determined movement of the user, an anticipated position of the user, and retrieving another data pertaining to the anticipated position of the user, wherein the other data pertaining to the anticipated position comprises map points corresponding to one or more real objects of the anticipated position.

In one or more embodiments, the map points corresponding to one or more real objects are used to construct a map of the real world. In one or more embodiments, the method further comprises recognizing one or more objects of the real world based on the map points. In one or more embodiments, the map points are used to create a coordinate space of the real world, and wherein the one or more virtual objects are displayed based on the created coordinate space of the real world. In one or more embodiments, the method further comprises recognizing one or more objects of the real world based on the map points, and displaying the virtual object based at least in part on a property of the recognized object. In one or more embodiments, the map points pertain to a geometry of the detected location.

In yet another aspect, an augmented reality display system comprises a passable world model data comprising a set of points pertaining to real objects of the physical world, one or more object recognizers to run on the passable world model data and to recognize at least one object of the real world based on a known geometry of a corresponding set of points, and a head-worn augmented reality display system to display virtual content to a user based at least in part on the recognized object.

In one or more embodiments, the passable world model data comprises parametric geometric data corresponding to the physical world. In one or more embodiments, the passable world model data is constructed from data received from a plurality of augmented reality display systems, wherein the plurality of augmented reality display systems capture data pertaining to a plurality of locations in the physical world.

In one or more embodiments, each object recognizer is programmed to recognize a predetermined object. In one or more embodiments, the points are 2D points captured from a plurality of augmented reality display systems. In one or more embodiments, one or more object recognizers utilizes a depth information captured from the plurality of augmented reality display systems to recognize the at least one object.

In one or more embodiments, the one or more object recognizers identifies the known geometry of an object relative to a known position of the augmented reality display system that captured an image corresponding to the map points. In one or more embodiments, the one or more object recognizers synchronizes a parametric geometry of the recognized object to the passable world model.

In one or more embodiments, the one or more object recognizers attach semantic information regarding the recognized object to the parametric geometry of the recognized object. In one or more embodiments, the semantic information may be utilized to estimate a future position of the recognized object. In one or more embodiments, the one or more object recognizers receives sparse points collected from one or more images of the physical world. In one or more embodiments, the one or more object recognizers outputs a parametric geometry of a recognized object.

In one or more embodiments, the semantic information is a taxonomical descriptor. In one or more embodiments, the augmented reality display system further comprises a first object recognizer, wherein the first object recognizer is configured to recognize a subset of a type of an object recognized by a second object recognizer, wherein the first object recognizer is run on data that has already been run through the second object recognizer.

In one or more embodiments, the augmented reality display system further comprises a ring of object recognizers that run on the passable world model data, wherein the ring of object recognizers comprises at least two object recognizers, and wherein a first object recognizer of the at least two object recognizers recognizes a first object, and wherein a second object recognizer of the at least two object recognizers a subset of the first object.

In yet another aspect, a method of displaying augmented reality comprises storing a passable world model data, wherein the passable world model data comprises a set of points pertaining to real objects of the physical world, wherein the set of points are captured by a plurality of augmented reality display systems, processing the passable world model data to recognize at least one object based at least in part on a known geometry of an object, and displaying a virtual content to a user of a particular augmented reality display system based at least in part on a parameter corresponding to the recognized object.

In one or more embodiments, the passable world model data comprises parametric geometric data corresponding to the physical world. In one or more embodiments, the plurality of augmented reality display systems capture data pertaining to a plurality of locations in the physical world. In one or more embodiments, the object recognizer is programmed to recognize a predetermined object. In one or more embodiments, the set of points comprise 2D points captured from a plurality of augmented reality display systems.

In one or more embodiments, the one or more object recognizers utilize a depth information captured from the plurality of augmented reality display systems to recognize the at least one object. In one or more embodiments, the one or more object recognizers identifies the known geometry of an object relative to a known position of the augmented reality display system that captured an image corresponding to the map points.

In one or more embodiments, the one or more object recognizers synchronizes a parametric geometry of the recognized object to the passable world model. In one or more embodiments, the one or more object recognizers attach semantic information regarding the recognized object to the parametric geometry of the recognized object.

In one or more embodiments, the semantic information may be utilized to estimate a future position of the recognized object. In one or more embodiments, the one or more object recognizers receives sparse points collected from one or more images of the physical world. In one or more embodiments, the one or more object recognizers outputs a parametric geometry of a recognized object.

In one or more embodiments, the semantic information is a taxonomical descriptor. In one or more embodiments, the method further comprises recognizing a first object through a first object recognizer, wherein the first object recognizer is configured to recognize a subset of a type of an object recognized by a second object recognizer, wherein the first object recognizer is run on data that has already been run through the second object recognizer.

In one or more embodiments, the method further comprises running the passable world model data through a ring of object recognizers, wherein the ring of object recognizers comprises at least two object recognizers, and wherein a first object recognizer of the at least two object recognizers recognizes a first object, and wherein a second object recognizer of the at least two object recognizers a subset of the first object.

In another aspect, an augmented reality system comprises one or more sensors of a head-mounted augmented reality display system to capture a set of data pertaining to a user of the head-mounted augmented reality display system, wherein a pose of the one or more sensors is known relative to the user, a processor to calculate a set of parameters regarding a movement of the user based at least in part on the captured set of data, and animating an avatar based at least in part on the calculated set of parameters regarding the movement of the user, wherein the animated avatar is displayed as a virtual object when viewed through one or more augmented reality display systems.

In one or more embodiments, the avatar mimics the movement of the user. In one or more embodiments, the processor performs a reverse kinematics analysis of the movement of the user to animate the avatar. In one or more embodiments, the one or more sensors is a an image-based sensor. In one or more embodiments, the set of data pertaining to the user is utilized to construct a map of the real world.

In one or more embodiments, the avatar is animated based on the movement of the user relative to a respective head-mounted augmented reality display system of the user. In one or more embodiments, the pose comprises a position of the one or more sensors relative to the user. In one or more embodiments, the pose comprises an orientation of the one or more sensors relative to the user. In one or more embodiments, the captured data pertains to the user's hand movements.

In one or more embodiments, the captured data pertains to an interaction of the user with one or more totems of the head-mounted augmented reality display system. In one or more embodiments, the user selects a form of the avatar. In one or more embodiments, the avatar is created based at least in part on an image of the user. In one or more embodiments, the animated avatar is displayed to another user of another head-mounted augmented reality display system.

In another aspect, a method of displaying augmented reality comprises capturing a set of data pertaining to a movement of a user of a head-mounted augmented reality display system, determining a pose of one or more sensors of the head-mounted augmented reality display system relative to the user, calculating, based at least in part on the determined pose and the captured set of data, a set of parameters pertaining to the user's movement, and animating an avatar based at least in part on the calculated set of parameters, wherein the animated avatar is displayed as a virtual object to one or more users of a plurality of augmented reality display systems.

In one or more embodiments, the method further comprises performing a reverse kinematic analysis of the movement of the user to animate the avatar. In one or more embodiments, the method further comprises adding the captured set of data to a passable world model, wherein the passable world model comprises a map of the real world. In one or more embodiments, the avatar is animated based on the movement of the user relative to a respective head-mounted augmented reality display system of the user.

In one or more embodiments, the pose comprises a position of the one or more sensors relative to the user. In one or more embodiments, the pose comprises an orientation of the one or more sensors relative to the user. In one or more embodiments, the captured data pertains to the user's hand movements.

In one or more embodiments, the captured data pertains to an interaction of the user with one or more totems of the head-mounted augmented reality display system. In one or more embodiments, the animated avatar is displayed to another user of another head-mounted augmented reality display system.

In another aspect, an augmented reality system comprises a database to store a set of fingerprint data corresponding to a plurality of locations, wherein the fingerprint data uniquely identifies a location, one or more sensors communicatively coupled to an augmented reality display system to capture data pertaining to a particular location, and a processor to compare the captured data with the set of fingerprint data to identify the particular location, and to retrieve a set of additional data based at least in part on the identified particular location.

In one or more embodiments, the captured data is processed to modify a format of the captured data to conform with that of the fingerprint data. In one or more embodiments, the fingerprint data comprises a color histogram of a location. In one or more embodiments, the fingerprint data comprises received signal strength (RSS) data. In one or more embodiments, the fingerprint data comprises a GPS data.

In one or more embodiments, the fingerprint data of a location is a combination of data pertaining to the location. In one or more embodiments, the particular location is a room within a building. In one or more embodiments, the additional data comprises geometric map data pertaining to the location. In one or more embodiments, the processor constructs a map based at least in part on the set of fingerprint data corresponding to the plurality of locations.

In one or more embodiments, each fingerprint data that identifies a location comprises a node of the constructed map. In one or more embodiments, a first node is connected to a second node if the first and second node have at least one shared augmented reality device in common. In one or more embodiments, the map is layered over a geometric map of the real world. In one or more embodiments, the captured data comprises an image of the user's surroundings, and wherein the image is processed to generate data that is of the same format as the fingerprint data.

In one or more embodiments, the one or more sensors comprises an image-based sensor. In one or more embodiments, a color histogram is generated by processing the image of the user's surroundings.

In yet another aspect, a method of displaying augmented reality comprises storing a set of fingerprint data corresponding to a plurality of locations of the real world, wherein the fingerprint data uniquely identifies a location, capturing a set of data corresponding to a user's surroundings through one or more sensors of an augmented reality display system, and identifying a location of the user based at least in part on the captured set of data and the stored set of fingerprint data.

In one or more embodiments, the method comprises processing the captured set of data to modify a format of the captured data to conform with that of the fingerprint data. In one or more embodiments, the fingerprint data comprises a color histogram of a location. In one or more embodiments, the fingerprint data comprises received signal strength (RSS) data.

In one or more embodiments, the fingerprint data comprises a GPS data.

In one or more embodiments, the fingerprint data of a location is generated by combining a set of data pertaining to the location. In one or more embodiments, the particular location is a room within a building. In one or more embodiments, the method further comprises retrieving additional data based at least in part on the identified location of the user. In one or more embodiments, the additional data comprises geometric map data corresponding to the identified location.

In one or more embodiments, the method further comprises displaying one or more virtual objects to the user of the augmented reality system based at least in part on the geometric map of the identified location. In one or more embodiments, the method further comprises constructing a map based at least in part on the set of fingerprint data corresponding to the plurality of locations. In one or more embodiments, each fingerprint data that identifies a location comprises a node of the constructed map.

In one or more embodiments, a first node is connected to a second node if the first and second node have at least one shared augmented reality device in common. In one or more embodiments, the map is layered over a geometric map of the real world. In one or more embodiments, the captured data comprises an image of the user's surroundings, and wherein the image is processed to generate data that is of the same format as the fingerprint data.

In one or more embodiments, the method further comprises generating a color histogram by processing the image of the user's surroundings. In one or more embodiments, the constructed map is used to find errors in the geometric map of the real world.

In another aspect, a method of displaying augmented reality comprises capturing a first set of 2D map points through a first augmented reality system, capturing a second set of 2D map points through a second augmented reality system, and determining a 3D position of one or more map points of the first and second set of 2D map points based at least in part on the captured first and second set of 2D map points.

In one or more embodiments, the method further comprises determining a pose of the first and second augmented reality systems. In one or more embodiments, the pose comprises a position of the augmented reality system in relation to the set of 2D map points. In one or more embodiments, the pose comprises an orientation of the augmented reality s system in relation to the set of 2D map points.

In one or more embodiments, the method further comprises determining a depth information of one or more objects through at least one of the first and second augmented reality systems. In one or more embodiments, the method further comprises determining a pose of a third augmented reality system based at least in part on the determined 3D points of the one or more map points.

In one or more embodiments, the method further comprises constructing a geometry of one or more objects based at least in part on the determined 3D points of the one or more map points. In one or more embodiments, the captured set of 2D map points are extracted from one or more images captured through the first or second augmented reality systems.

In another aspect, a method of displaying augmented reality comprises capturing a set of map points from the real world through a plurality of augmented reality systems, and constructing a geometric map of the real world based at least in part on the captured set of map points, wherein a node of a geometric map comprises a keyframe that captured at least a first set of map points, and a strength of a connection between two nodes of the geometric map corresponds to a number of shared map points between the two nodes.

In one or more embodiments, the method further comprises identifying a point of stress in the constructed geometric map. In one or more embodiments, the point of stress is identified based at least in part on information retrieved from a topological map. In one or more embodiments, the point of stress is identified based at least in part on a discrepancy in a location of a particular keyframe in relation to the geometric map. In one or more embodiments, the point of stress is identified based on a maximum residual error of the geometric map.

In one or more embodiments, the point of stress is distributed through a bundle adjust process. In one or more embodiments, the identified point of stress is radially distributed to a first wave of nodes outside the node closest to the identified point of stress. In one or more embodiments, the first wave of nodes outside of the node comprises a network or nodes that have a single degree of separation from the node closest to the identified point of stress.

In one or more embodiments, the identified point of stress is further radially distributed to second wave of nodes outside the first wave of nodes. In one or more embodiments, the nodes of the first wave of nodes are marked if the stress is radially distributed to the first wave of nodes.

In another aspect, an augmented reality system comprises a set of individual augmented reality systems to capture a set of map points from the real world, a database to receive the set of map points and to store the set of map points from the real world, and a processor communicatively coupled to the database to construct a geometric map of the real world based at least in part on the captured set of map points, wherein a node of the geometric map comprises a keyframe that captured at least a first set of map points, and a strength of a connection between two nodes of the geometric map corresponds to a number of shared map points between the two nodes.

In one or more embodiments, the processor identifies a point of stress in the constructed geometric map. In one or more embodiments, the point of stress is identified based at least in part on information retrieved from a topological map. In one or more embodiments, the point of stress is identified based at least in part on a discrepancy in a location of a particular keyframe in relation to the geometric map.

In one or more embodiments, the point of stress is identified based on a maximum residual error of the geometric map. In one or more embodiments, the point of stress is distributed through a bundle adjust process. In one or more embodiments, the identified point of stress is radially distributed to a first wave of nodes outside the node closest to the identified point of stress. In one or more embodiments, the first wave of nodes outside of the node comprises a network or nodes that have a single degree of separation from the node closest to the identified point of stress.

In one or more embodiments, the identified point of stress is further radially distributed to second wave of nodes outside the first wave of nodes. In one or more embodiments, the nodes of the first wave of nodes are marked if the stress is radially distributed to the first wave of nodes.

In one or more embodiments, the method comprises rendering a line from the determined position of the plurality of keyframes to respective map points captured from the plurality of keyframes, wherein the set of new map points are determined based on the render. In one or more embodiments, the method further comprises identifying a point of intersection between multiple rendered lines, and wherein the set of new points are based at least in part on the identified points of intersection. In one or more embodiments, the method further comprises rendering a triangular cone from the determined position of the plurality of keyframes to respective map points captured from the plurality of keyframes, wherein the captured map point lies on a bisector of the triangular cone.

In one or more embodiments, the method comprises rendering a line from the determined position of the plurality of keyframes to respective map points captured from the plurality of keyframes, wherein the set of new map points are determined based on the render. In one or more embodiments, the method further comprises further comprising identifying a point of intersection between multiple rendered lines, and wherein the set of new points are based at least in part on the identified points of intersection. In one or more embodiments, the method further comprises rendering a triangular cone from the determined position of the plurality of keyframes to respective map points captured from the plurality of keyframes, wherein the captured map point lies on a bisector of the triangular cone.

In one or more embodiments, the method further comprises selectively shading the triangular cone such that the bisector of the triangular cone is the brightest portion of the triangular cone. In one or more embodiments, the method further comprises identifying points of intersection between at least two rendered triangular cones, wherein the set of new map points are based at least in part on the identified points of intersection. In one or more embodiments, the set of new map points are determined based at least in part on the brightness of the identified points of intersection.

In one or more embodiments, the set of new map points are determined based at least in part on a pixel pitch corresponding to the identified points of intersection. In one or more embodiments, the set of new map points are determined based at least in part on a pixel pitch corresponding to the identified points of intersection. In one or more embodiments, the method further comprises placing a virtual keyframe in relation to an existing set of keyframes, wherein the set of new map points are determined based at least in part on the virtual keyframe.

In one or more embodiments, the method further comprises determining a most orthogonal direction to the existing set of keyframes, and positioning the virtual keyframe at the determined orthogonal direction. In one or more embodiments, the most orthogonal direction is determined along an x coordinate. In one or more embodiments, the most orthogonal direction is determined along a y coordinate.

In one or more embodiments, the most orthogonal direction is determined along a z coordinate. In one or more embodiments, the method further comprises rendering lines from the virtual keyframe to the set of map points, and determining the new map points based at least in part on one or more points of intersection of the rendered lines.

In one or more embodiments, the method further comprises applying a summing buffer to determine the points of intersection.

In one or more embodiments, the further comprises rendering triangular cones from the virtual keyframe to the set of map points, and determining the new map points based at least in part on one or more points of intersection.

In one or more embodiments, the method further comprises performing a bundle adjust to correct a location of a new map point of the set of new map points. In one or more embodiments, the set of new map points are added to a map of the real world. In one or more embodiments, the method further comprises delivering virtual content to one or more augmented reality display systems based at least in part on the map of the real world.

In yet another aspect, an augmented reality system comprises one or more sensors to capture a set of map points pertaining to the real world, wherein the set of map points are captured through a plurality of augmented reality systems, and a processor to determine a position of a plurality of keyframes that captured the set of map points, and to determine a set of new map points based at least in part on the captured set of map points and the determined position of the plurality of keyframes.

In one or more embodiments, the processor renders a line from the determined position of the plurality of keyframes to respective map points captured from the plurality of keyframes, wherein the set of new map points are determined based on the render. In one or more embodiments, the processor identifies a point of intersection between multiple rendered lines, and wherein the set of new points are determined based at least in part on the identified points of intersection.

In one or more embodiments, the processor renders a triangular cone from the determined position of the plurality of keyframes to respective map points captured from the plurality of keyframes, wherein the captured map point lies on a bisector of the triangular cone. In one or more embodiments, the processor selectively shades the triangular cone such that the bisector of the triangular cone is the brightest portion of the triangular cone.

In one or more embodiments, the processor identifies points of intersection between at least two rendered triangular cones, wherein the set of new map points are based at least in part on the identified points of intersection. In one or more embodiments, the set of new map points are determined based at least in part on the brightness of the identified points of intersection. In one or more embodiments, the set of new map points are determined based at least in part on a pixel pitch corresponding to the identified points of intersection.

In one or more embodiments, the set of new map points are determined based at least in part on a pixel pitch corresponding to the identified points of intersection. In one or more embodiments, the processor places a virtual keyframe in relation to an existing set of keyframes, wherein the set of new map points are determined based at least in part on the virtual keyframe. In one or more embodiments, the processor determines a most orthogonal direction to the existing set of keyframes, and positions the virtual keyframe at the determined orthogonal direction.

In one or more embodiments, the most orthogonal direction is determined along an x coordinate. In one or more embodiments, the most orthogonal direction is determined along a y coordinate. In one or more embodiments, the most orthogonal direction is determined along a z coordinate.

In one or more embodiments, the processor renders lines from the virtual keyframe to the set of map points, and determines the new map points based at least in part on one or more points of intersection of the rendered lines. In one or more embodiments, the processor applies a summing buffer to determine the points of intersection.

In one or more embodiments, the processor renders triangular cones from the virtual keyframe to the set of map points, and determines the new map points based at least in part on one or more points of intersection. In one or more embodiments, the processor performs a bundle adjust to correct a location of a new map point of the set of new map points. In one or more embodiments, the set of new map points are added to a map of the real world. In one or more embodiments, virtual content is delivered to one or more augmented reality display systems based at least in part on the map of the real world.

In another aspect, an augmented reality device comprises one or more sensors to detect at least one property pertaining to an ambient light, a processor communicatively coupled to the one or more sensors to modify one or more characteristics associated with a virtual image to be projected to the user of a head-mounted augmented reality system based at least in part on the detected property pertaining to the ambient light, and an optical sub-system to project light associated with the virtual image having the at least one modified characteristic.

In one or more embodiments, the characteristic pertains to a location of the virtual image. In one or more embodiments, the one or more sensors comprises a photodiode. In one or more embodiments, the location of the projected virtual image corresponds to a dark area of the user's field of vision. In one or more embodiments, the characteristic pertains to a color intensity of the virtual image.

In one or more embodiments, the processor selects one or more additional virtual objects to project to the user based at least in part on the at least one detected property of the ambient light. In one or more embodiments, the one or more additional virtual objects comprises a halo. In one or more embodiments, the processor selects a filter to change an intensity of the light associated with the virtual image. In one or more embodiments, the processor selectively illuminates the virtual image. In one or more embodiments, the characteristic pertains to a speed of delivery of multiple frames corresponding to the virtual image.

In one or more embodiments, the augmented reality device further comprises a spatial backlight to selectively illuminate a portion of the projected light. In one or more embodiments, the augmented reality device further comprises a variable focus element (VFE) to alter a perceived depth of the light, wherein the perceived depth of light is altered based at least in part on the at least one detected property of the ambient light.

In one or more embodiments, the VFE shapes the wavefront associated with the virtual image synchronously with the spatial backlight. In one or more embodiments, the augmented reality device further comprises a low pass filter to identify a movement of the user's head relative to the world.

In one or more embodiments, the characteristic is altered based at least in part on the identified head movement. In one or more embodiments, the virtual image is projected relative to a coordinate frame. In one or more embodiments, the coordinate frame is a hip-coordinate frame. In one or more embodiments, the coordinate frame is a world-centric coordinate frame. In one or more embodiments, the coordinate frame is a hand-centric coordinate frame. In one or more embodiments, the coordinate frame is a head-centric coordinate frame.

In another aspect, a method of displaying augmented reality comprises detecting at least one property pertaining to an ambient light, modifying, based at least in part on the detected at least one property pertaining to the ambient light, one or more characteristics associated with a virtual image to be projected to a user of a head-mounted augmented reality system, and projecting light associated with the virtual image having the one or more modified characteristics.

In one or more embodiments, the characteristic pertains to a location of the virtual image. In one or more embodiments, the one or more sensors comprises a photodiode. In one or more embodiments, the location of the projected virtual image corresponds to a dark area of the user's field of vision. In one or more embodiments, the characteristic pertains to a color intensity of the virtual image.

In one or more embodiments, the method further comprises selecting one or more additional virtual objects to project to the user based at least in part on the at least one detected property of the ambient light. In one or more embodiments, the one or more additional virtual objects comprises a halo.

In one or more embodiments, the method further comprises selecting a filter to change an intensity of the light associated with the virtual image. In one or more embodiments, the method further comprises selectively illuminating the virtual image. In one or more embodiments, the characteristic pertains to a speed of delivery of multiple frames corresponding to the virtual image. In one or more embodiments, the method further comprises altering a perceived depth of the virtual image based at least in part on the at least one detected property of the ambient light through a variable focus element (VFE).

In one or more embodiments, the VFE shapes the wavefront associated with the virtual image synchronously with the spatial backlight. In one or more embodiments, the method further comprises identifying a movement of the user's head relative to the world. In one or more embodiments, the characteristic is altered based at least in part on the identified head movement. In one or more embodiments, the virtual image is projected relative to a coordinate frame.

In one or more embodiments, the coordinate frame is a hip-coordinate frame. In one or more embodiments, the coordinate frame is a world-centric coordinate frame. In one or more embodiments, the coordinate frame is a hand-centric coordinate frame. In one or more embodiments, the coordinate frame is a head-centric coordinate frame.

In another aspect, an augmented reality device comprises an optical apparatus to project light associated with one or more virtual objects to be presented to a user, a light probe to capture at least one parameter associated with an ambient light; and a processor to select a light map based at least in part on the at least one captured parameter to modify the one or more virtual objects to be presented to the user.

In one or more embodiments, the processor selects the light map based at least in part on input received from the user. In one or more embodiments, a light associated with the modified one or more virtual objects resembles that of real objects in an ambient environment of the user. In one or more embodiments, the augmented reality device further comprises a library of light maps, wherein each light map of the library of light maps corresponds to a plurality of light parameters.

In one or more embodiments, the light probe comprises a camera of the augmented reality device. In one or more embodiments, the selection of the light map is based at least in part on a closest approximation light map that comprises one or more characteristics that are closest to the at least one captured parameter.

In one or more embodiments, the at least one captured parameter corresponds to a frequency data of the light. In one or more embodiments, the at least one captured parameter corresponds to a dynamic range of the light. In one or more embodiments, the selection of the light map is based at least in part on a comparison of the captured parameters against parameters associated with a plurality of light maps.

In one or more embodiments, the augmented reality device further comprises a neural network module, wherein the processor consults with the neural network module to select the light map. In one or more embodiments, the processor modifies the light map based at least in part on the at least one captured parameters pertaining to the ambient environment. In one or more embodiments, the processor combines data from a plurality of light maps based at least in part on the at least one captured parameters pertaining to the ambient environment.

In one or more embodiments, wherein the processor creates a new light map based at least in part on the combined data. In one or more embodiments, the light probe captures images of a 360 degree view of the ambient environment through the augmented reality device, and wherein the processor creates a light map based at least in part on the captured images of the 360 degree view of the ambient environment.

In one or more embodiments, the created light map is user-centric. In one or more embodiments, the processor applies a transformation to the created user-centric light map, wherein the transformation reduces an error corresponding to a distance between the user and a virtual object to be presented to the user.

In one or more embodiments, the processor models the user-centric light map as a sphere centered on the user, and wherein the processor models an object-centric sphere around the virtual object to be lit, and wherein the processor projects the data from the user-centric sphere onto the object-centric sphere from a point of view of the object, thereby creating a new light map.

In one or more embodiments, a color intensity of the light map is attenuated based at least in part on the distance between the user and the virtual object to be presented to the user. In one or more embodiments, the augmented reality device further comprises a depth sensor to capture a depth value of a plurality of axes of the created light map.

In one or more embodiments, the processor determines respective coordinates of the plurality of axes, and wherein a color intensity of the light map is attenuated based at least in part on the determined respective coordinators of the plurality of axes, thereby creating a new light map. In one or more embodiments, the augmented reality device further comprises a database to store a plurality of light maps, wherein the database further stores a map of the real world, and wherein the plurality to light maps are stored in a grid based at least in part on the map of the real world.

In one or more embodiments, the processor selects the light map based at least in part on a detected location of the user of the augmented reality device and the stored grid of light maps. In one or more embodiments, the processor updates a light map based at least in part on the captured parameters.

In one or more embodiments, the processor updates the light map such that the update is not perceived by the user of the augmented reality device. In one or more embodiments, the processor updates the light map based at least in part on a detected circumstance. In one or more embodiments, the detected circumstance is an eye movement of the user.

In one or more embodiments, the processor updates the light map when the virtual object is out of the user's field of view. In one or more embodiments, the processor updates the light map when the virtual object is at a periphery of the user's field of view. In one or more embodiments, the detected circumstance is a presence of a shadow over the virtual object.

In one or more embodiments, the detected circumstance is a dimming of a light of the ambient environment. In one or more embodiments, the detected circumstance is another virtual object that is likely to keep a focus of the user.

In another aspect, a method for displaying augmented reality, comprises capturing at least one parameter associated with an ambient light, selecting a light map based at least in part on the captured parameter, modifying a virtual content to be presented to a user based at least in part on the selected light map, and projecting light associated with the modified virtual content.

In one or more embodiments, the method further comprises selecting the light map based at least in part on input received from the user. In one or more embodiments, a light associated with the modified one or more virtual objects resembles that of real objects in an ambient environment of the user. In one or more embodiments, the method further comprises storing a library of light maps, wherein each light map of the library of light maps corresponds to a plurality of light parameters.

In one or more embodiments, the selection of the light map is based at least in part on a closest approximation light map that comprises one or more characteristics that are closest to the at least one captured parameter. In one or more embodiments, the at least one captured parameter corresponds to a frequency data of the light. In one or more embodiments, the at least one captured parameter corresponds to a color palette of the light. In one or more embodiments, the at least one captured parameter corresponds to a dynamic range of the light. In one or more embodiments, the selection of the light map is based at least in part on a comparison of the captured parameters against parameters associated with a plurality of light maps.

In one or more embodiments, the method further comprises consulting with a neural network to select the light map. In one or more embodiments, the method further comprises modifying the light map based at least in part on the at least one captured parameters pertaining to the ambient environment. In one or more embodiments, the method further comprises combining data from a plurality of light maps based at least in part on the at least one captured parameters pertaining to the ambient environment.

In one or more embodiments, the method further comprises creating a new light map based at least in part on the combined data. In one or more embodiments, the method further comprises capturing images of a 360 degree view of the ambient environment, and creating a light map based at least in part on the captured images of the 360 degree view of the ambient environment.

In one or more embodiments, the created light map is user-centric. In one or more embodiments, the method further comprises applying a transformation to the created user-centric light map, wherein the transformation reduces an error corresponding to a distance between the user and a virtual object to be presented to the user. In one or more embodiments, the method further comprises modeling the user-centric light map as a sphere centered on the user, modeling an object-centric sphere around the virtual object to be lit, and projecting the data from the user-centric sphere onto the object-centric sphere from a point of view of the object, thereby creating a new light map.

In one or more embodiments, the method further comprises attenuating a color intensity of the light map based at least in part on the distance between the user and the virtual object to be presented to the user. In one or more embodiments, the method further comprises determining a depth value of a plurality of axes of the created light map. In one or more embodiments, the method further comprises determining respective coordinates of the plurality of axes, and wherein a color intensity of the light map is attenuated based at least in part on the determined respective coordinators of the plurality of axes, thereby creating a new light map.

In one or more embodiments, the method further comprises storing a map of the real world, wherein the map comprises coordinates of real objects of the real world, and storing the plurality of light maps in a grid based at least in part on the map of the real world.

In one or more embodiments, the method further comprises selecting the light map based at least in part on a detected location of the user of the augmented reality device and the stored grid of light maps. In one or more embodiments, the method further comprises updating a light map based at least in part on the captured parameters. In one or more embodiments, the update is performed such that it is not perceived by the user of the augmented reality device.

In one or more embodiments, the update is performed based at least in part on a detected circumstance. In one or more embodiments, the detected circumstance is an eye movement of the user. In one or more embodiments, the method further comprises updating the light map when the virtual object is out of the user's field of view. In one or more embodiments, the method further comprises updating the light map when the virtual object is at a periphery of the user's field of view. In one or more embodiments, the detected circumstance is a presence of a shadow over the virtual object.

In one or more embodiments, the detected circumstance is a dimming of a light of the ambient environment. In one or more embodiments, the detected circumstance is another virtual object that is likely to keep a focus of the user.

In yet another aspect, an augmented reality display system comprises an optical apparatus to project light associated with one or more virtual objects to a user, wherein the one or more virtual object is a virtual user interface, a user interface component to receive user input in response to an interaction of the user with at least a component of the virtual user interface, and a processor to receive the user input, to determine an action to be performed based at least in part on the received user input.

In one or more embodiments, the user interface component comprises a tracking module to track at least one characteristic of the user. In one or more embodiments, the at least one characteristic pertains to the user's eyes. In one or more embodiments, the at least one characteristic pertains to the user's hands.

In one or more embodiments, the at least one characteristic pertains to a totem of the user. In one or more embodiments, the at least one characteristic pertains to a head pose of the user. In one or more embodiments, the at least one characteristic pertains to a natural feature pose of the user. In one or more embodiments, the virtual user interface is rendered relative to a predetermined reference frame. In one or more embodiments, the predetermined reference frame is head-centered. In one or more embodiments, the predetermined reference frame is body-centered.

In one or more embodiments, the predetermined reference frame is world-centered. In one or more embodiments, the predetermined reference frame is hand-centered. In one or more embodiments, the projection of the virtual user interface is based at least in part on an environmental data. In one or more embodiments, the system further comprises a database to store a map of the real world, wherein the map comprises coordinates of real objects of the real world, and wherein the projection of the virtual user interface is based at least in part on the stored map.

In one or more embodiments, the user interface component comprises one or more sensors. In one or more embodiments, the one or more sensors is a camera. In one or more embodiments, the one or more sensors is a haptic sensor. In one or more embodiments, the one or more sensors is a motion-based sensor. In one or more embodiments, the one or more sensors is a voice-based sensor. In one or more embodiments, the user interface component comprises a gesture detector.

In another aspect, a method of displaying augmented reality comprises projecting light associated with a virtual object to a user's eyes, wherein the virtual object comprises a virtual user interface, determining a user input from the user based at least in part on an interaction of the user with at least one component of the virtual user interface, and determining an action to be performed based at least in part on the received user input.

In one or more embodiments, the action to be performed comprises projecting light associated with another virtual object. In one or more embodiments, the method further comprises tracking at least one characteristic of the user, wherein the user input is determined based at least in part on a predetermined pattern associated with the tracked characteristic. In one or more embodiments, the at least one characteristic pertains to the user's eyes.

In one or more embodiments, the at least one characteristic pertains to the user's hands. In one or more embodiments, the at least one characteristic pertains to a totem of the user. In one or more embodiments, the at least one characteristic pertains to a head pose of the user. In one or more embodiments, the at least one characteristic pertains to a natural feature pose of the user.

In one or more embodiments, the virtual user interface is rendered relative to a predetermined reference frame. In one or more embodiments, the predetermined reference frame is head-centered. In one or more embodiments, the predetermined reference frame is body-centered. In one or more embodiments, the predetermined reference frame is world-centered. In one or more embodiments, the predetermined reference frame is hand-centered.

In one or more embodiments, the projection of the virtual user interface is based at least in part on an environmental data. In one or more embodiments, the method further comprises storing a map of the real world, wherein the map comprises coordinates of real objects of the real world, and wherein the projection of the virtual user interface is based at least in part on the stored map.

In another aspect, an eye tracking device to be used in a head-worn augmented reality device comprises a plurality of light sources to emit light, wherein the plurality of light sources are positioned in a manner such that a user's eye is illuminated, one or more sensors to detect one or more characteristics pertaining to an interaction of the light from the plurality of light sources and the user's eyes, and a processor to determine a movement of the user's eyes based at least in part on the detected one or more characteristics.

In one or more embodiments, the characteristic pertains to light reflected back from the eye. In one or more embodiments, the characteristic pertains to one or more reflections of objects from a structure of the user's eyes. In one or more embodiments, the plurality of light sources are configured to vary at least one parameter of the emitted light. In one or more embodiments, the at least one parameter is varied pseudo-randomly.

In one or more embodiments, the at least one parameter corresponds to a length of emission of the light source. In one or more embodiments, the plurality of light sources are configured to emit light in a predetermined pattern. In one or more embodiments, the one or more sensors is a photodiode. In one or more embodiments, the processor determines a movement based at least in part on a known distance of the eye from the at least one sensors and the plurality of light sources.

In another aspect, a method for tracking eye movements in an augmented reality display system comprises emitting one or more rays of light towards a user's eyes, detecting one or more characteristics pertaining to an interaction between the emitted light and the user's eyes, and determining, based at least in part on the one or more characteristics, a movement of the user's eyes.

In one or more embodiments, the characteristic pertains to light reflected back from the eye. In one or more embodiments, the characteristic pertains to one or more reflections of objects from a structure of the user's eyes. In one or more embodiments, the method further comprises varying at least one parameter of the emitted light. In one or more embodiments, the at least one parameter is varied pseudo-randomly.

In one or more embodiments, the at least one parameter corresponds to a length of emission of the light source. In one or more embodiments, the light is emitted in a predetermined pattern. In one or more embodiments, the method further comprises correlating the detected characteristics with a set of known characteristics to determine eye movement. In one or more embodiments, the eye movement is determined based at least in part on a known distance of the eye from one or more sensors detecting a characteristic of the interaction between the emitted light and the user's eyes and a plurality of light sources emitting the light to the user's eyes.

In yet another aspect, a method of displaying augmented reality comprises identifying an object as a totem, determining at least one characteristic pertaining to an interaction of a user of an augmented reality display system with the totem, and determining a user input based at least in part on the at least one characteristic pertaining to the interaction of the user with the totem.

In one or more embodiments, the method further comprises storing a correlation map, wherein the correlation map comprises a set of predetermined characteristics of the interaction with the totem and a corresponding set of user input commands, wherein the user input is determined based at least in part on the stored correlation map. In one or more embodiments, the at least one characteristic pertains to a movement of the totem. In one or more embodiments, the at least one characteristic pertains to a direction of movement of the totem.

In one or more embodiments, the at least one characteristic pertains to a placement of the totem relative to the world. In one or more embodiments, a predetermined reference frame is consulted to determine the interaction of the user with the totem. In one or more embodiments, the predetermined reference frame comprises a head-centric reference frame. In one or more embodiments, the predetermined reference frame comprises a hand-centric reference frame. In one or more embodiments, the predetermined reference frame is a body-centric-reference frame. In one or more embodiments, the at least one characteristic pertains to a movement of the user relative to the totem.

In one or more embodiments, the method further comprises designating the real object as the totem. In one or more embodiments, the method further comprises selecting a known pattern of interaction with the totem; and mapping the selected known pattern of interaction to a user input command. In one or more embodiments, the mapping is based at least in part on user input. In one or more embodiments, the method further comprises rendering a virtual user interface in relation to the identified totem. In one or more embodiments, the predetermined reference frame comprises a world-centric reference frame.

In yet another aspect, an augmented reality display system comprises one or more sensors to identify a totem and to capture data pertaining to an interaction of a user of the augmented reality display system with the totem, and a processor to determine a user input based at least in part on the captured data pertaining to the interaction of the user with the totem.

In one or more embodiments, the system further comprises a database to store a correlation map, wherein the correlation map comprises a set of predetermined characteristics of the interaction with the totem and a corresponding set of user input commands, wherein the user input is determined based at least in part on the stored correlation map. In one or more embodiments, the at least one characteristic pertains to a movement of the totem.

In one or more embodiments, the at least one characteristic pertains to a direction of movement of the totem. In one or more embodiments, the at least one characteristic pertains to a placement of the totem relative to the world. In one or more embodiments, the processor consults a predetermined reference frame is consulted to determine the interaction of the user with the totem. In one or more embodiments, the predetermined reference frame comprises a head-centric reference frame.

In one or more embodiments, the predetermined reference frame comprises a hand-centric reference frame. In one or more embodiments, the predetermined reference frame is a body-centric reference frame. In one or more embodiments, the predetermined reference frame is a world-centric reference frame. In one or more embodiments, the captured data pertains to a movement of the user relative to the totem.

In one or more embodiments, the real object is pre-designated as the totem. In one or more embodiments, the method further comprises an optical apparatus to render a virtual user interface in relation to the identified totem. In one or more embodiments, the captured data pertains to a number of interactions of the user with the totem. In one or more embodiments, the totem is a real object. In one or more embodiments, the totem is a virtual object.

In one or more embodiments, the one or more sensors comprises image-based sensors. In one or more embodiments, the one or more sensors comprises a haptic sensor. In one or more embodiments, the one or more sensors comprises depth sensors. In one or more embodiments, the captured data pertains to a type of interaction with the totem. In one or more embodiments, the captured data pertains to a duration of interaction with the totem.

In another aspect, an augmented reality display system comprises an optical apparatus to project light associated with one or more virtual objects to a user of a head-mounted augmented reality display system, wherein a perceived location of the one or more virtual objects is known, and wherein the one or more virtual objects is associated with a predetermined sound data, and a processor having at least a sound module to dynamically alter one or more parameters of the predetermined sound data based at least in part on the perceived location of the one or more virtual objects in relation to the user, thereby producing a sound wavefront.

In one or more embodiments, the processor determines a head pose of the user of the head-mounted augmented reality system, and wherein the one or more parameters of the predetermined sound data is dynamically altered based at least in part on the determined head pose of the user. In one or more embodiments, the system further comprises a sound design tool to dynamically alter the one or more parameters of the predetermined sound data. In one or more embodiments, the system further comprises a spatial and proximity sound render to dynamically alter the one or more parameters of the predetermined sound data. In one or more embodiments, the processor computes a head transfer function, and wherein the one or more parameters of the predetermined sound data are dynamically altered based at least in part on the computed head transfer function.

In one or more embodiments, the system further comprises an additional audio object corresponding to another predetermined sound data, and wherein the processor dynamically alters one or more parameters of the other predetermined sound data based at least in part on a perceived location of the additional audio object. In one or more embodiments, the additional audio object triggers head movement of the user.

In yet another aspect, a method of displaying augmented reality comprises determining a head pose of a user of a head-mounted augmented reality display system, determining a perceived location of an audio object in relation to the determined head pose of the user, wherein the audio object corresponds to a predetermined sound data, and dynamically altering one or more parameters of the predetermined sound data based at least in part on the determined perceived location of the audio object in relation to the determined head pose of the user.

In one or more embodiments, the audio object is associated with a virtual object. In one or more embodiments, the audio object is proximate to the virtual object. In one or more embodiments, the audio object is at a distance from the virtual object. In one or more embodiments, the one or more parameters pertains to a direction from which the sound emanates.

In one or more embodiments, the one or more parameters pertains to an intensity of the sound. In one or more embodiments, the predetermined sound data is equalized. In one or more embodiments, the one or more parameters pertains to a quality of the sound. In one or more embodiments, the method further comprises selecting another sound data to accompany the predetermined sound data based at least in part on the determined perceived location of the audio object in relation to the determined head pose of the user. In one or more embodiments, the method further comprises using the audio object to trigger a head movement of the user.

In yet another aspect, a method for displaying augmented reality comprises displaying a virtual object to a user of an augmented reality display system, associating a navigation object to the virtual object, wherein a navigation object of the collection of navigation objects is configured to be responsive to one or more predetermined conditions, and modifying at least one parameter of the virtual object in response to the one or more predetermined conditions.

In one or more embodiments, the method further comprises maintaining a collection of navigation objects, wherein a plurality of navigation objects of the collection of navigation objects are associated with the virtual object. In one or more embodiments, the one or more predetermined conditions comprises a presence of a structure. In one or more embodiments, the one or more predetermined conditions comprises a detection of a light source or a source of light. In one or more embodiments, the one or more predetermined conditions comprises a detection of a sound or a source of sound.

In one or more embodiments, the one or more predetermined conditions comprises a source of food or water. In one or more embodiments, the one or more predetermined conditions comprises a detected emotion. In one or more embodiments, the at least one parameter pertains to a movement of the virtual object. In one or more embodiments, the at least one parameter pertains to an animation of the virtual object.

In one or more embodiments, the method further comprises defining a sensitivity level of the navigation object to the one or more predetermined conditions. In one or more embodiments, the sensitivity is defined based at least in part on user input. In one or more embodiments, the method further comprises setting a boundary for the defined sensitivity level. In one or more embodiments, the defined sensitivity is based at least in part on a function of a location in space.

In one or more embodiments, the function comprises a gradient. In one or more embodiments, the function comprises a linear function. In one or more embodiments, the function comprises a step function. In one or more embodiments, the function comprises an exponential function. In one or more embodiments, the method further comprises defining a level of response of the navigation object to the one or more predetermined conditions.

In one or more embodiments, the level of response affects the modification of at least one parameter of the virtual object. In one or more embodiments, the at least one parameter comprises a speed of movement of the virtual object. In one or more embodiments, the at least one parameter comprises a direction of movement of the virtual object.

In one or more embodiments, the collection of navigation objects is re-used by other users of the augmented reality system. In one or more embodiments, the association of the virtual object to the navigation object comprises defining a coordinate frame of the navigation object in relation to a coordinate frame of the virtual object. In one or more embodiments, the method further comprises scaling the navigation object in size. In one or more embodiments, the method further comprises arranging a plurality of navigation objects as a ring around the virtual object. In one or more embodiments, the method further comprises combining an output of the plurality of navigation objects to generate a combined output.

In one or more embodiments, the one or more predetermined conditions pertains to time. In one or more embodiments, the navigation object corresponds to an emotion vector. In one or more embodiments, the method further comprises assigning an emotional state to the navigation object.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 31A-31C illustrate other totems that may be used to communicate with the augmented reality system.

DETAILED DESCRIPTION

Various embodiments of the invention are directed to methods, systems, and articles of manufacture for implementing multi-scenario physically-aware design of an electronic circuit design in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual and augmented reality systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Overview of Augmented Reality System

Figure 1:
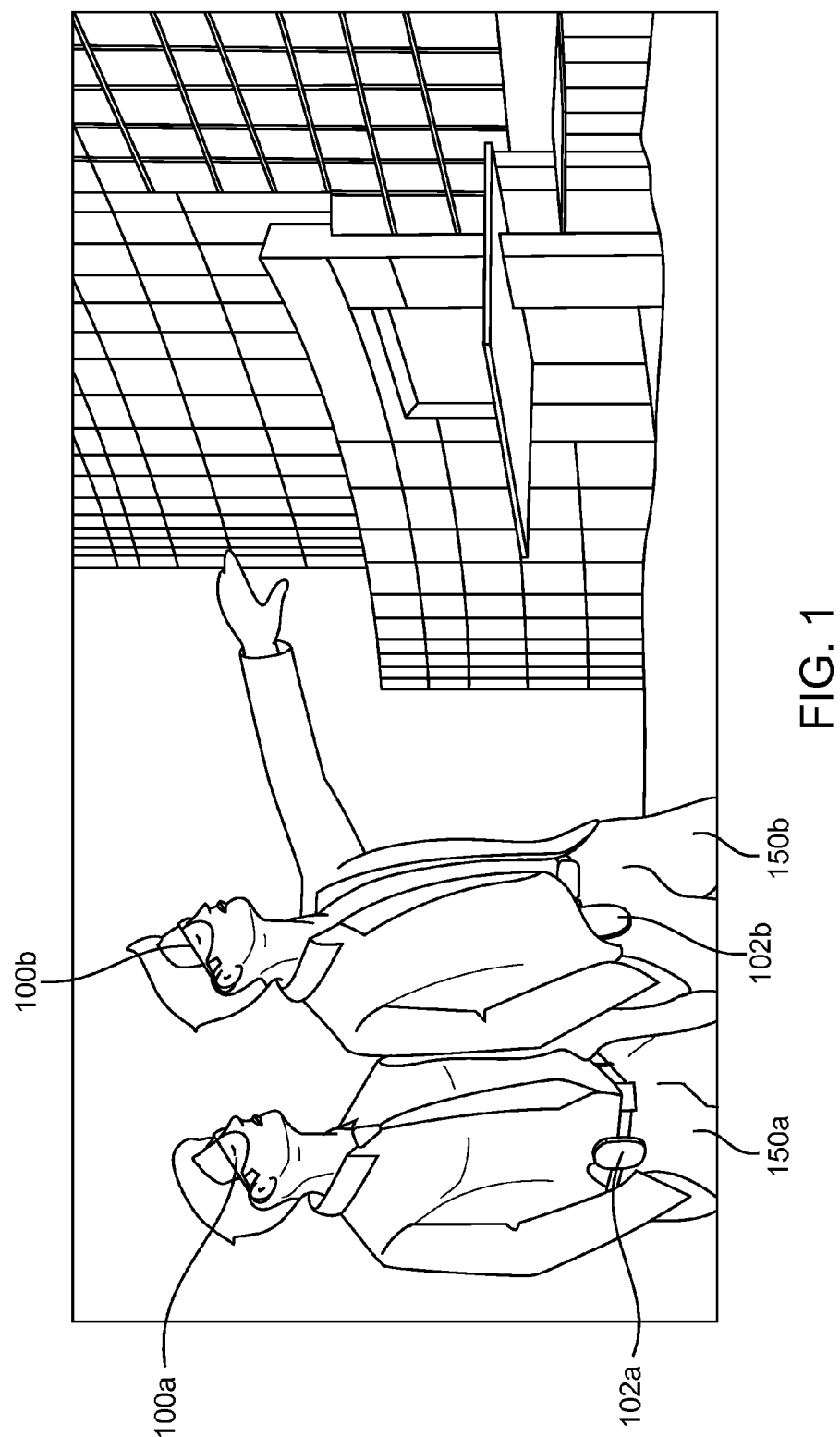
FIG. 1 illustrates two users wearing individual augmented reality systems and interacting in the real world.

As illustrated in FIGS. 1-4, an augmented reality system may include a light field generation subsystem operable to render virtual content (e.g., virtual objects, virtual tools, and other virtual constructs, for instance applications, features, characters, text, digits, and other symbols) in a field of view of a user. The augmented reality system may optionally also include an audio subsystem. As illustrated in FIG. 1, the light field generation subsystem (e.g., comprising both an optical sub-system 100 and a processing sub-system 102) may include multiple instances of personal augmented reality systems, for example a respective personal augmented reality system for each user.

FIG. 1 shows two users (150a and 150b) wearing personal augmented reality systems (100a, 102a and 100b, 102b) and interacting with both real objects and virtual objects. These instances of personal augmented reality system (e.g., head-mounted augmented reality display systems, helmet-based augmented reality display systems, etc.) are sometimes referred to herein as individual augmented reality systems, devices or components. As shown in FIG. 1, the users' personal augmented reality system may comprise both an optical sub-system (100a, 100b) that allows the user to view virtual content, and also a processing sub-system (102a, 102b) that may comprise other essential components (e.g., processing components, power components, memory, etc.). More details on other components of the augmented reality system will be provided further below.

It should be appreciated that the present application discusses various embodiments of augmented reality (AR) systems and virtual reality systems (VR) and/or a combination or AR and VR systems. Although the present application discusses various embodiments in the context of AR systems for illustrative purposes, it should be appreciated that any or all of the following may be applied to VR systems or a combination of AR and VR systems, and no part of the disclosure should be read as limiting.

Figure 2:
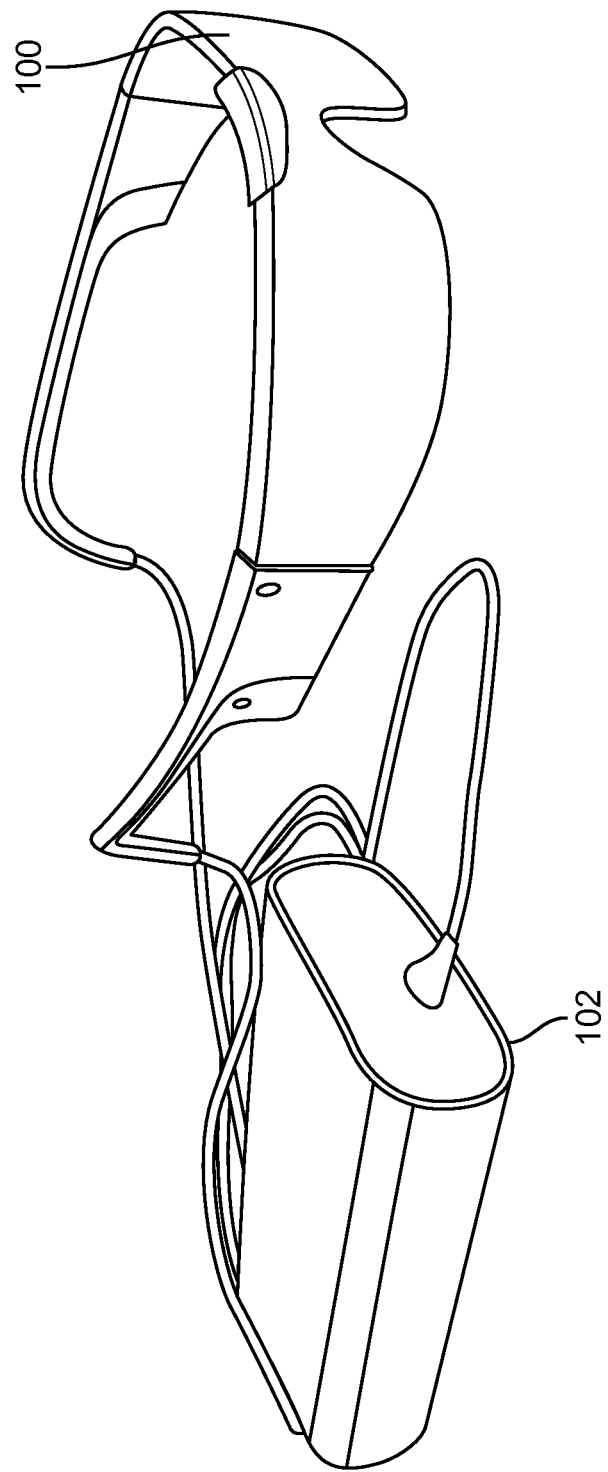
FIG. 2 illustrates an example embodiment of an individual augmented reality device that may be head-worn by a user.
Figure 3:
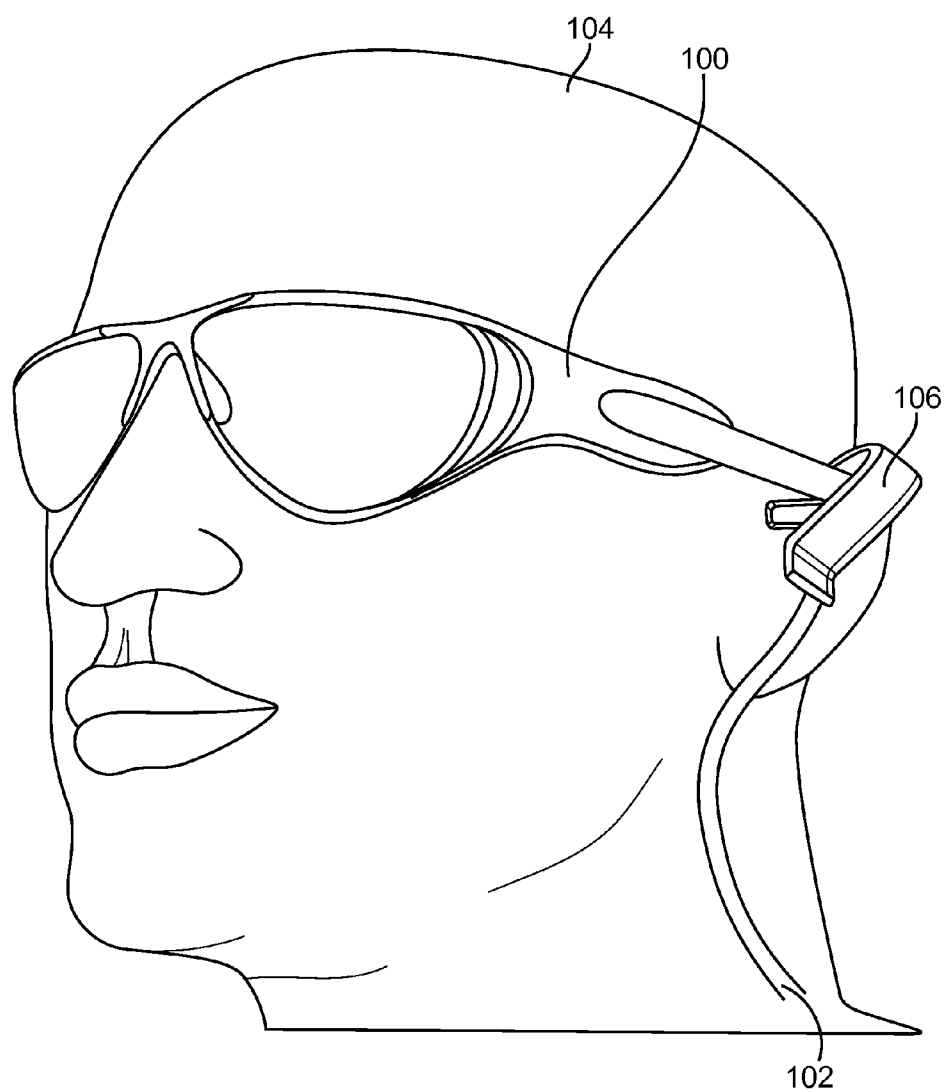
FIG. 3 illustrates another example embodiment of an individual augmented reality device that may be head worn by the user

FIGS. 2 and 3 illustrate example embodiments of form factors of AR systems according to one or more embodiments. As shown in both FIGS. 2 and 3, embodiments of the AR system may comprise optical components 100 that deliver virtual content to the user's eyes as well as processing sub components 102 that perform a multitude of processing tasks to present the relevant virtual content to the AR user 104.

Visual-Light Field Generation Subsystem

Figure 4:
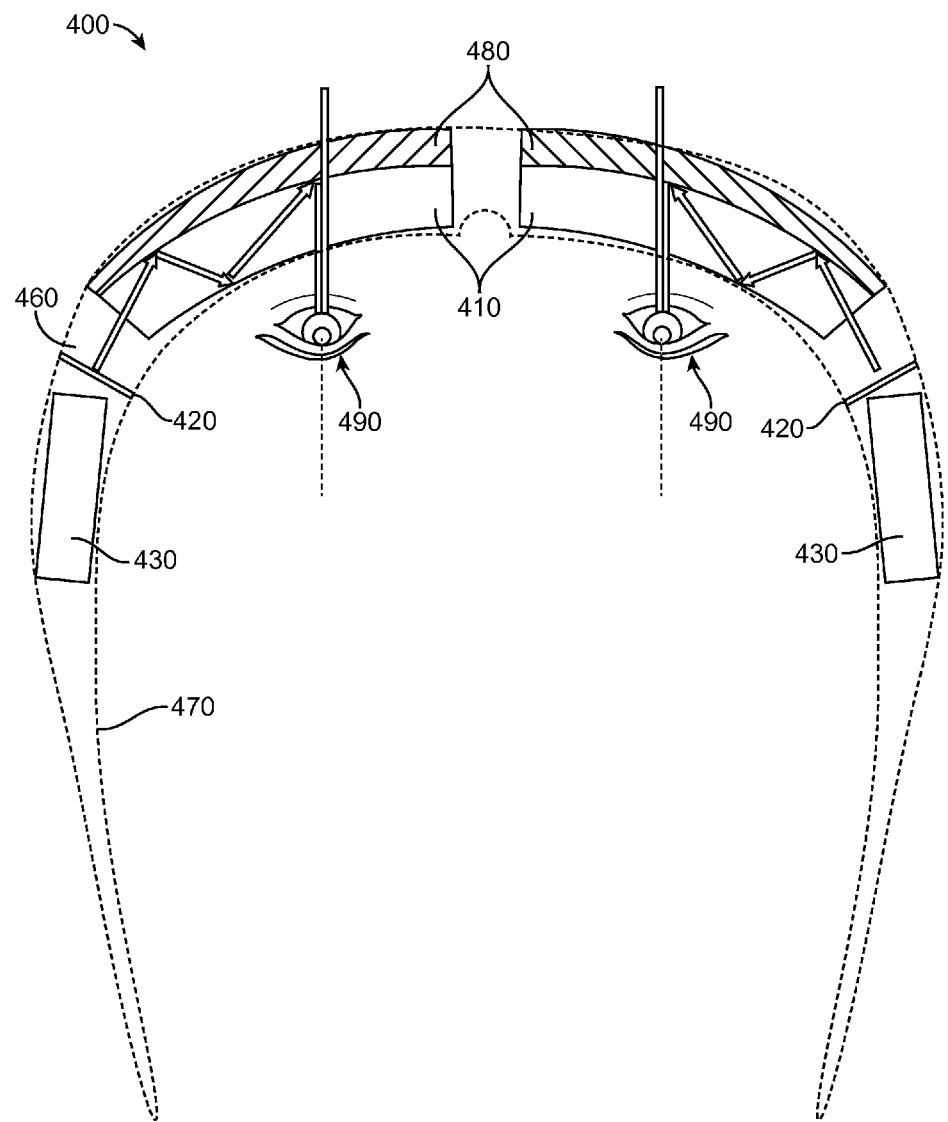
FIG. 4 illustrates a top view of components of a simplified individual augmented reality device.
Figure 5:
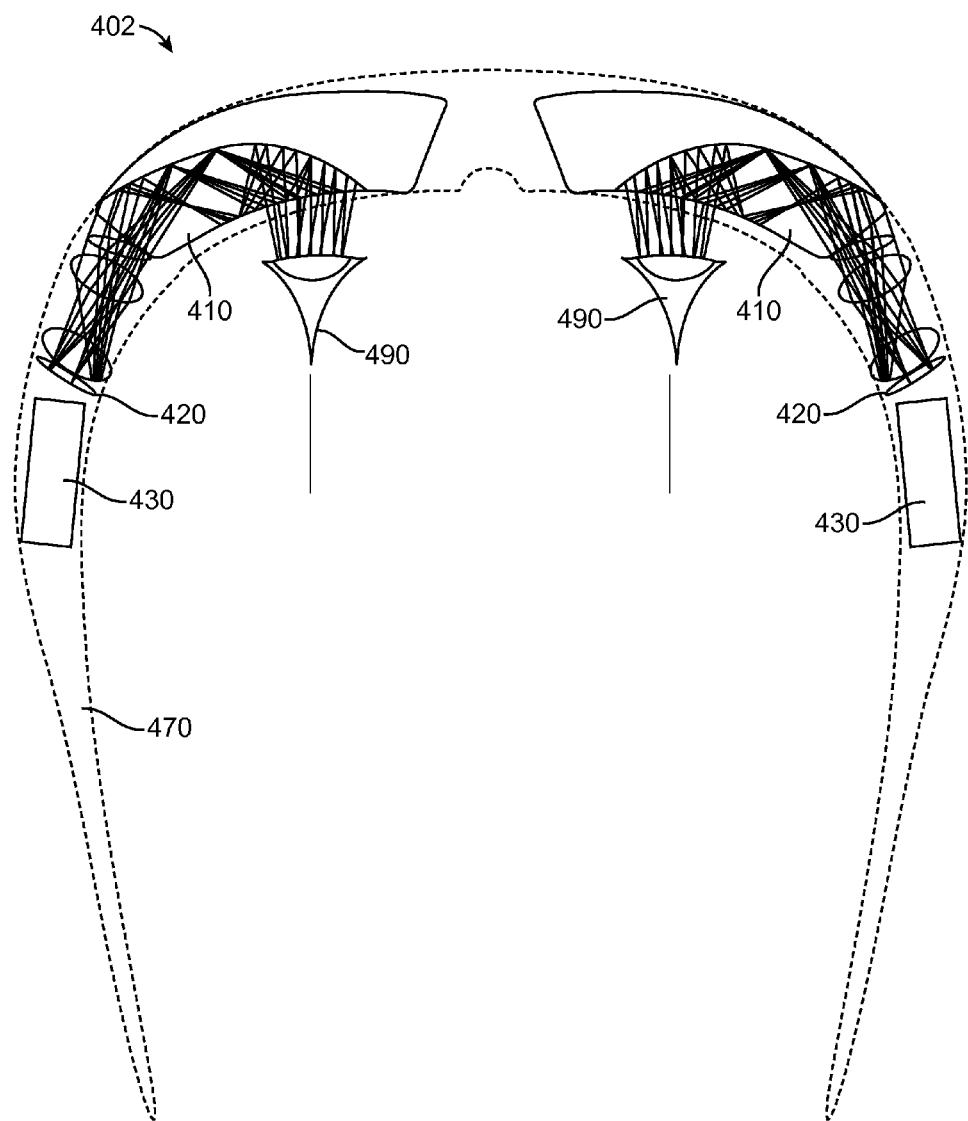
FIG. 5 illustrates an example embodiment of the optics of the individual augmented reality system.

As illustrated in FIGS. 4 and 5, the light field generation subsystem (e.g. 400 and 402 respectively) is preferably operable to produce a light field. For example, an optical apparatus 460 or subsystem may generate or project light to simulate a four dimensional (4D) light field that would be produced by light reflecting from a real three-dimensional object or scene. For instance, an optical apparatus such as a wave guide reflector array projector (WRAP) apparatus 410 or multiple depth plane three dimensional (3D) display system may generate or project multiple virtual depth planes at respective radial focal distances to simulate a 4D light field.

The optical apparatus 460 in the form of a WRAP apparatus 410 or multiple depth plane 3D display system may, for instance, project images into each eye of a user, either directly or indirectly. When the number and radial placement of the virtual depth planes is comparable to the depth resolution of the human vision system as a function of radial distance, a discrete set of projected depth planes mimics the psycho-physical effect that is produced by a real, continuous, three dimensional object or scene. In one or more embodiments, the system 400 may comprise a frame 470 that may be customized for each AR user. Additional components of the system 400 may include electronics 430 (as will be discussed in further detail below) to connect various electrical and electronic subparts of the AR system to each other.

The system 400 may further comprise a microdisplay 420 that projects light associated with one or more virtual images into the waveguide prism 410. As shown in FIG. 4, the light produced from the microdisplay 420 travels within the waveguide 410, and some of light reaches the user's eyes 490. In one or more embodiments, the system 400 may further comprise one or more compensation lenses 480 to alter the light associated with the virtual images. FIG. 5 illustrates the same components as FIG. 4, but illustrates how light from the microdisplays 420 travels through the waveguides 10 to reach the user's eyes 490.

It should be appreciated that the optical apparatus 460 may include a number of linear wave guides, each with a respective series of deconstructed curved spherical reflectors or mirrors embedded, located or formed within each of the linear wave guides. The series of deconstructed curved spherical reflectors or mirrors are designed to refocus infinity-focused light at specific radial distances. A convex spherical mirror can be used to produce an output spherical wave to represent a virtual point source which appears to be located at a defined distance behind the convex spherical mirror.

By concatenating in a linear or rectangular wave guide a series of micro-reflectors whose shapes (e.g., radii of curvature about two axes) and orientation together, it is possible to project a 3D image that corresponds to a spherical wave front produced by a virtual point source at a particular x, y, z coordinate. Each of the 2D wave guides or layers provides an independent optical path relative to the other wave guides, and shapes the wave front and focuses incoming light to project a virtual depth plane that corresponds to a respective radial distance.

With a sufficient number of 2D wave guides, a user viewing the projected virtual depth planes experiences a 3D effect. Such a device is described in U.S. patent application Ser. No. 13/915,530 filed Jun. 11, 2013, which is herein incorporated by reference in its entirety. Other embodiments may comprise other combinations of optical systems, and it should be appreciated that the embodiment(s) described in relation to FIGS. 4 and 5 are for illustrative purposes only.

As illustrated in FIG. 3, the audio subsystem 106 may take a variety of forms. For instance, the audio subsystem 106 may take the form of a simple two speaker 2 channel stereo system, or a more complex multiple speaker system (5.1, 7.1, 12.1 channels). In some implementations, the audio subsystem 106 may be operable to produce a three-dimensional sound field.

The AR system 100 may include one or more distinct components. For example, the AR system 100 may include a head worn or mounted component, such as the one shown in the illustrated embodiment of FIGS. 3-5. The head worn or mounted component typically includes the visual system (e.g., such as the ones shown in FIGS. 4 and 5). The head worn component may also include audio transducers (e.g., speakers, microphones).

As illustrated in FIG. 2, the audio transducers may integrate with the visual, for example each audio transducers supported from a common frame with the visual components. Alternatively, the audio transducers may be distinct from the frame that carries the visual components. For example, the audio transducers may be part of a belt pack, such as the ones shown in FIGS. 1 (102a, 102b) and 2 (102).

As illustrated in FIGS. 1, 2 and 5, the augmented reality system 100 may include a distinct computation component (e.g., the processing sub-system 102 as shown in FIGS. 1 and 2), separate from the head worn component (e.g., the optical sub-system 100 as shown in FIGS. 1 and 2). The processing sub-system or computation component 102 may, for example, take the form of the belt pack, which can be convenience coupled to a belt or belt line of pants during use. Alternatively, the computation component 102 may, for example, take the form of a personal digital assistant or smartphone type device.

The computation component 102 may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The computation component 102 may include one or more nontransitory computer- or processor-readable media, for example volatile and/or nonvolatile memory, for instance read only memory (ROM), random access memory (RAM), static RAM, dynamic RAM, Flash memory, EEPROM, etc.

The computation component 102 may be communicatively coupled to the head worn component. For example, computation component 102 may be communicatively tethered to the head worn component via one or more wires or optical fibers via a cable with appropriate connectors. The computation component 102 and the head worn component 100 may communicate according to any of a variety of tethered protocols, for example UBS®, USB2®, USB3®, Ethernet®, Thunderbolt®, Lightning® protocols.

Alternatively or additionally, the computation component 102 may be wirelessly communicatively coupled to the head worn component. For example, the computation component 102 and the head worn component 100 may each include a transmitter, receiver or transceiver (collectively radio) and associated antenna to establish wireless communications there between. The radio and antenna(s) may take a variety of forms. For example, the radio may be capable of short range communications, and may employ a communications protocol such as BLUETOOTH®, WI-FI®, or some IEEE 802.11 compliant protocol (e.g., IEEE 802.11n, IEEE 802.11a/c).

Figure 6:
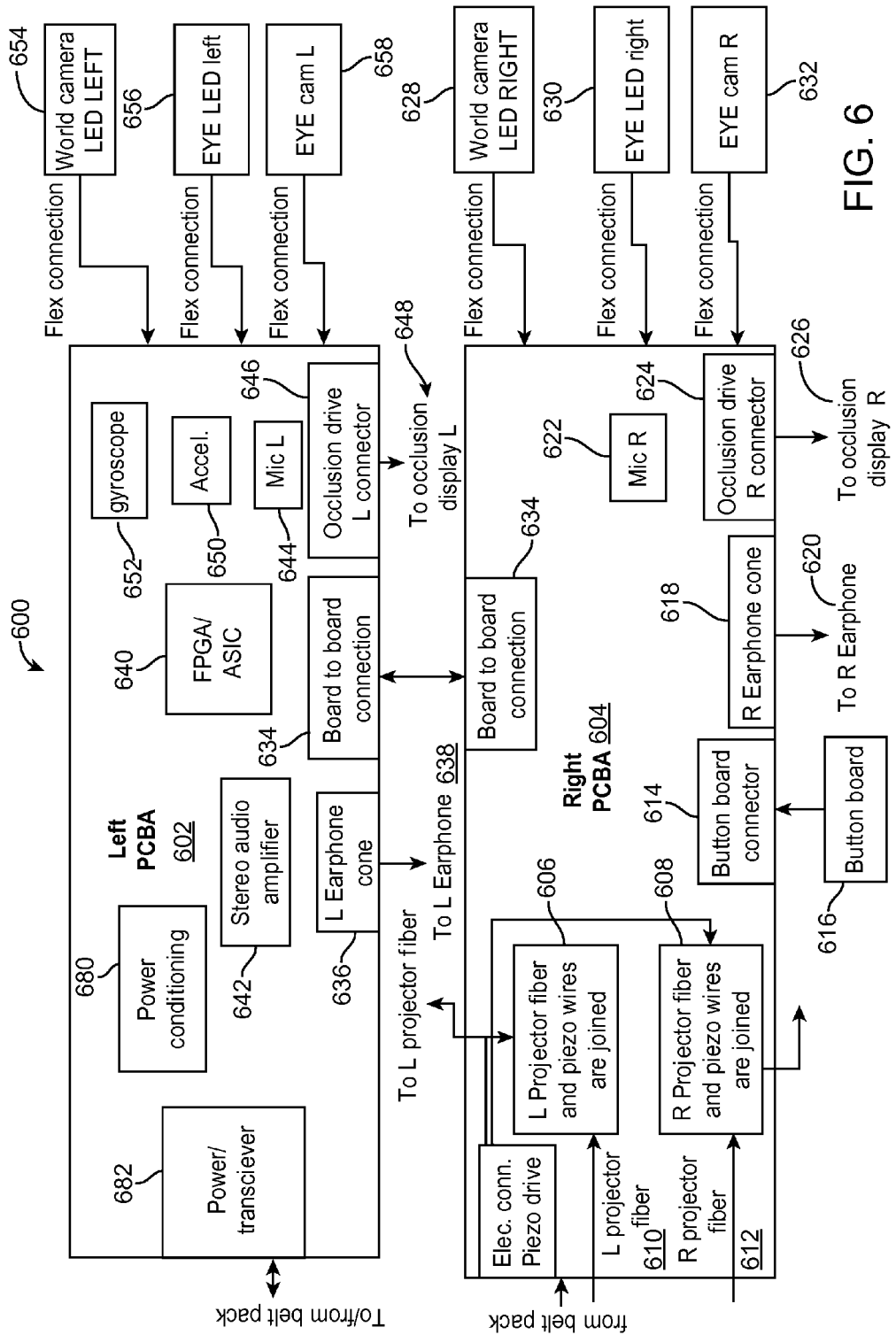
FIG. 6 illustrates a system architecture of the individual augmented reality system, according to one embodiment.

As illustrated in FIGS. 4 and 6, the body or head worn components may include electronics and microdisplays, operable to deliver augmented reality content to the user, for example augmented reality visual and/or audio content. The electronics (e.g., part of 420 in FIGS. 4 and 5) may include various circuits including electrical or electronic components. The various circuits are communicatively coupled to a number of transducers that either deliver augmented reality content, and/or which sense, measure or collect information about the ambient physical environment and/or about a user.

FIG. 6 shows an example architecture 1000 for the electronics for an augmented reality device, according to one illustrated embodiment.

The AR device may include one or more printed circuit board components, for instance left (602) and right (604) printed circuit board assemblies (PCBA). As illustrated, the left PCBA 602 includes most of the active electronics, while the right PCBA 604 supports principally supports the display or projector elements.

The right PCBA 604 may include a number of projector driver structures which provide image information and control signals to image generation components. For example, the right PCBA 604 may carry a first or left projector driver structure 606 and a second or right projector driver structure 608. The first or left projector driver structure 606 joins a first or left projector fiber 610 and a set of signal lines (e.g., piezo driver wires). The second or right projector driver structure 608 joins a second or right projector fiber 612 and a set of signal lines (e.g., piezo driver wires). The first or left projector driver structure 606 is communicatively coupled to a first or left image projector, while the second or right projector drive structure 608 is communicatively coupled to the second or right image projector.

In operation, the image projectors render virtual content to the left and right eyes (e.g., retina) of the user via respective optical components, for instance waveguides and/or compensation lenses (e.g., as shown in FIGS. 4 and 5).

The image projectors may, for example, include left and right projector assemblies. The projector assemblies may use a variety of different image forming or production technologies, for example, fiber scan projectors, liquid crystal displays (LCD), LCOS displays, digital light processing (DLP) displays. Where a fiber scan projector is employed, images may be delivered along an optical fiber, to be projected therefrom via a tip of the optical fiber. The tip may be oriented to feed into the waveguide (FIGS. 4 and 5). An end of the optical fiber with the tip from which images project may be supported to flex or oscillate. A number of piezoelectric actuators may control an oscillation (e.g., frequency, amplitude) of the tip. The projector driver structures provide images to respective optical fiber and control signals to control the piezoelectric actuators, to project images to the user's eyes.

Continuing with the right PCBA 604, a button board connector 614 may provide communicative and physical coupling to a button board 616 which carries various user accessible buttons, keys, switches or other input devices. The right PCBA 604 may include a right earphone or speaker connector 618, to communicatively couple audio signals to a right earphone 620 or speaker of the head worn component. The right PCBA 604 may also include a right microphone connector 622 to communicatively couple audio signals from a microphone of the head worn component. The right PCBA 604 may further include a right occlusion driver connector 624 to communicatively couple occlusion information to a right occlusion display 626 of the head worn component. The right PCBA 604 may also include a board-to-board connector to provide communications with the left PCBA 602 via a board-to-board connector 634 thereof.

The right PCBA 604 may be communicatively coupled to one or more right outward facing or world view cameras 628 which are body or head worn, and optionally a right cameras visual indicator (e.g., LED) which illuminates to indicate to others when images are being captured. The right PCBA 604 may be communicatively coupled to one or more right eye cameras 632, carried by the head worn component, positioned and orientated to capture images of the right eye to allow tracking, detection, or monitoring of orientation and/or movement of the right eye. The right PCBA 604 may optionally be communicatively coupled to one or more right eye illuminating sources 630 (e.g., LEDs), which as explained herein, illuminates the right eye with a pattern (e.g., temporal, spatial) of illumination to facilitate tracking, detection or monitoring of orientation and/or movement of the right eye.

The left PCBA 602 may include a control subsystem, which may include one or more controllers (e.g., microcontroller, microprocessor, digital signal processor, graphical processing unit, central processing unit, application specific integrated circuit (ASIC), field programmable gate array (FPGA) 640, and/or programmable logic unit (PLU)). The control system may include one or more non-transitory computer- or processor readable medium that stores executable logic or instructions and/or data or information. The non-transitory computer- or processor readable medium may take a variety of forms, for example volatile and nonvolatile forms, for instance read only memory (ROM), random access memory (RAM, DRAM, SD-RAM), flash memory, etc. The non-transitory computer or processor readable medium may be formed as one or more registers, for example of a microprocessor, FPGA or ASIC.

The left PCBA 602 may include a left earphone or speaker connector 636, to communicatively couple audio signals to a left earphone or speaker 638 of the head worn component.

The left PCBA 602 may include an audio signal amplifier (e.g., stereo amplifier) 642, which is communicative coupled to the drive earphones or speakers The left PCBA 602 may also include a left microphone connector 644 to communicatively couple audio signals from a microphone of the head worn component. The left PCBA 602 may further include a left occlusion driver connector 646 to communicatively couple occlusion information to a left occlusion display 648 of the head worn component.

The left PCBA 602 may also include one or more sensors or transducers which detect, measure, capture or otherwise sense information about an ambient environment and/or about the user. For example, an acceleration transducer 650 (e.g., three axis accelerometer) may detect acceleration in three axis, thereby detecting movement. A gyroscopic sensor 652 may detect orientation and/or magnetic or compass heading or orientation. Other sensors or transducers may be similarly employed.

The left PCBA 602 may be communicatively coupled to one or more left outward facing or world view cameras 654 which are body or head worn, and optionally a left cameras visual indicator (e.g., LED) 656 which illuminates to indicate to others when images are being captured. The left PCBA may be communicatively coupled to one or more left eye cameras 658, carried by the head worn component, positioned and orientated to capture images of the left eye to allow tracking, detection, or monitoring of orientation and/or movement of the left eye. The left PCBA 602 may optionally be communicatively coupled to one or more left eye illuminating sources (e.g., LEDs) 656, which as explained herein, illuminates the left eye with a pattern (e.g., temporal, spatial) of illumination to facilitate tracking, detection or monitoring of orientation and/or movement of the left eye.

The PCBAs 602 and 604 are communicatively coupled with the distinct computation component (e.g., belt pack) via one or more ports, connectors and/or paths. For example, the left PCBA 602 may include one or more communications ports or connectors to provide communications (e.g., bi-directional communications) with the belt pack. The one or more communications ports or connectors may also provide power from the belt pack to the left PCBA 602. The left PCBA 602 may include power conditioning circuitry 680 (e.g., DC/DC power converter, input filter), electrically coupled to the communications port or connector and operable to condition (e.g., step up voltage, step down voltage, smooth current, reduce transients).

The communications port or connector may, for example, take the form of a data and power connector or transceiver 682 (e.g., Thunderbolt® port, USB® port). The right PCBA 604 may include a port or connector to receive power from the belt pack. The image generation elements may receive power from a portable power source (e.g., chemical battery cells, primary or secondary battery cells, ultra-capacitor cells, fuel cells), which may, for example be located in the belt pack.

As illustrated, the left PCBA 602 includes most of the active electronics, while the right PCBA 604 supports principally supports the display or projectors, and the associated piezo drive signals. Electrical and/or fiber optic connections are employed across a front, rear or top of the body or head worn component of the AR system.

Both PCBAs 602 and 604 are communicatively (e.g., electrically, optically) coupled to the belt pack. The left PCBA 602 includes the power subsystem and a high speed communications subsystem. The right PCBA 604 handles the fiber display piezo drive signals. In the illustrated embodiment, only the right PCBA 604 needs to be optically connected to the belt pack. In other embodiments, both the right PCBA and the left PCBA may be connected to the belt pack.

While illustrated as employing two PCBAs 602 and 604, the electronics of the body or head worn component may employ other architectures. For example, some implementations may use a fewer or greater number of PCBAs. Also for example, various components or subsystems may be arranged differently than illustrated in FIG. 6. For example, in some alternative embodiments some of the components illustrated in FIG. 6 as residing on one PCBA may be located on the other PCBA, without loss of generality.

As illustrated in FIG. 1, each user may use his/her own respective AR system (generally referred to as individual AR systems in the discussion below). In some implementations, the individual augmented reality systems may communicate with one another. For example, two or more proximately located AR systems may communicate with one another. As described further herein, communications may occur after performance of a handshaking protocol, in one or more embodiments. The AR systems may communicate wirelessly via one or more radios. As discussed above, such radios may be capable of short range direct communications, or may be capable of longer range direct communications (e.g., without a repeater, extender, etc.). Additionally or alternatively, indirect longer range communications may be achieved via one or more intermediary devices (e.g., wireless access points, repeaters, extenders).

The head worn component 100 of the AR system may have one or more "outward" facing cameras (e.g., 628, 654). In one or more embodiments, the head worn component may have one or more "inward" facing cameras. As used herein, "outward facing" means that the camera captures images of the ambient environment rather than the user who is wearing the head worn component. Notably, the "outward" facing camera could have a field of view that encompass areas to the front, the left, the right or even behind the user. This contrasts with an inward facing camera which captures images of the individual who is wearing the head worn component, for instance a camera that faces the user's face to capture facial expression or eye movements of the user.

User Worn Input Sensors

In many implementations, the personal (or individual) AR system(s) worn by the user(s) may include one or more sensors, transducers, or other components. The sensors, transducers, or other components may be categorized into two general categories, i) those that detect aspects of the user who wears the sensor(s) (e.g., denominated herein as inward facing sensors), and ii) those that detect conditions in the ambient environment in which the user is located (e.g., denominated herein as outward facing sensors). These sensors may take a large variety of forms. For example, the sensor(s) may include one or more image sensors, for instance digital still or moving image cameras. Also for example, the sensor(s) may include one or more audio sensors or microphones. Other sensors may detect position, movement, temperature, heart rate, perspiration, etc.

As noted above, in one or more embodiments, sensors may be inward facing. For example, image sensors worn by a user may be positioned and/or oriented to detect eye movement of the user, facial expressions of the user, or limb (arms, legs, hands) of the user. For example, audio sensors or microphones worn by a user may be positioned and/or oriented to detect utterances made by the user. Such audio sensors or microphones may be directional and may be located proximate a mouth of the user during use.

As noted above, sensors may be outward facing. For example, image sensors worn by a user may be positioned and/or oriented to visually detect the ambient environment in which the user is located and/or objects with which the user is interacting. In one or more embodiments, image-based sensors may refer to cameras (e.g., field-of-view cameras, IR cameras, eye tracking cameras, etc.) Also for example, audio sensors or microphones worn by a user may be positioned and/or oriented to detect sounds in the ambient environment, whether from natural sources like other people, or generated from inanimate objects such as audio speakers. The outward facing sensors may detect other characteristics of the ambient environment. For example, outward facing sensors may include a temperature sensor or thermocouple that detects a temperature in the ambient environment.

Outward facing sensors may detect humidity, air quality, and/or air flow in the ambient environment. Outward facing sensors may include light detector (e.g., photodiodes) to detect an ambient light condition in the ambient environment. In one or more embodiments, light probes may also be used as part of the individual AR systems. Outward facing sensors may include one or more sensors that detect a presence and/or absence of an object, including other people, in the ambient environment and/or movement in the ambient environment.

Physical Space/Room Based Sensor System

Figure 7:
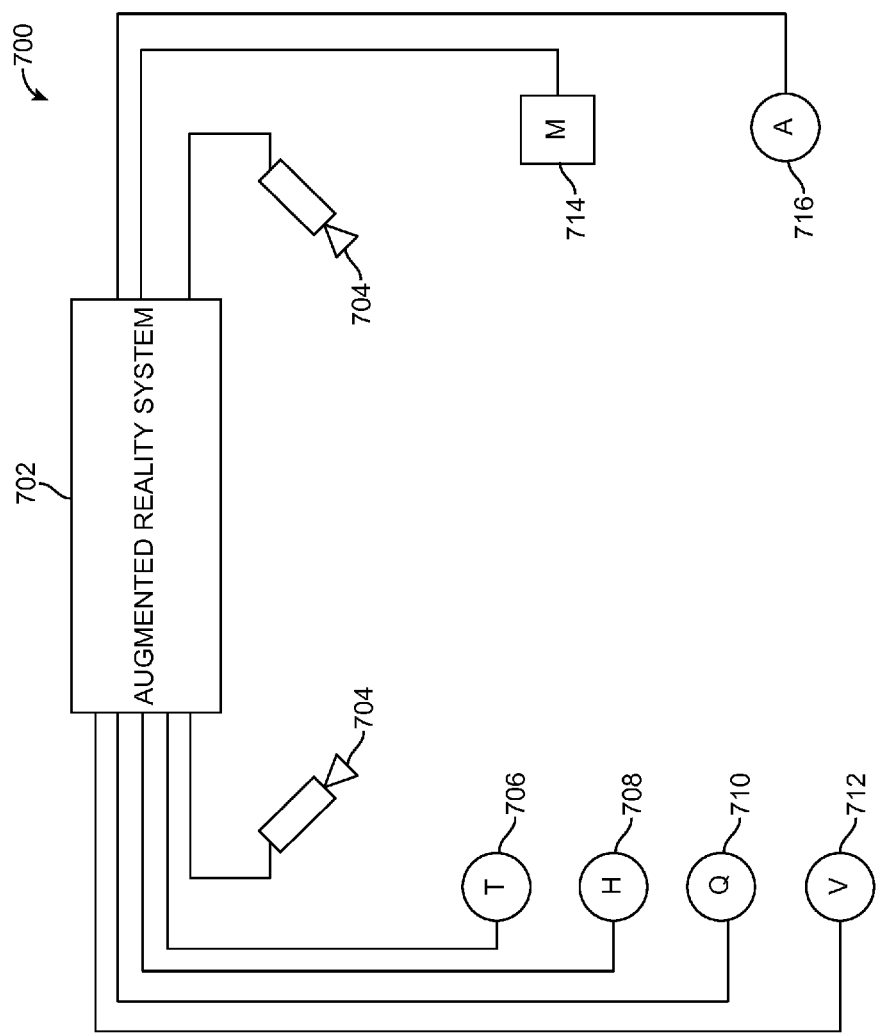
FIG. 7 illustrates a room based sensor system, according to one embodiment.

As illustrated in the system architecture 700 of FIG. 7, in some implementations the augmented reality system may include physical space or room based sensor systems. As illustrated in FIG. 7, the augmented reality system 702 not only draws from users' individual AR systems (e.g., head-mounted augmented reality display system, etc.) as shown in FIGS. 1-5, but also may use room-based sensor systems 704 to collect information about rooms and physical spaces. The space or room based sensor systems 704 detect and/or collect information from a physical environment, for example a space such as a room (e.g., an office, living room, media room, kitchen or other physical space). The space or room based sensor system(s) 704 typically includes one or more image sensors 706, for instance one or more cameras (e.g., digital still cameras, digital moving image or video cameras). The image sensor(s) may be in addition to image sensors which form part of the personal augmented reality system(s) worn by the user(s), in one or more embodiments. The space or room based sensor systems may also include one or more audio sensors or transducers 708, for example omni-directional or directional microphones. The audio sensors or transducers may detect sound from animate objects (e.g., one or more users or other people in the ambient environment. The audio sensors or transducers may detect sound from inanimate objects, for example footsteps, televisions, stereo systems, radios, or other appliances.

The space or room based sensor systems may also include other environmental sensors 710, temperature 712, humidity 714, air quality 716, air flow or velocity, ambient light sensing, presence absence, movement, etc., in the ambient environment. All these inputs feed back to the augmented reality system 702, as shown in FIG. 7. It should be appreciated that only some of the room-based sensors are shown in FIG. 7, and some embodiments may comprise fewer or greater sensor sub-systems, and the embodiment of FIG. 7 should not be seen as limiting.

The space or room based sensor system(s) 704 may detect and/or collect information in with respect to a space or room based coordinate system. For example, visual or optical information and/or audio information may be referenced with respect to a location or source of such information within a reference frame that is different from a reference frame of the user. For example, the location of the source of such information may be identified within a reference frame of the space or room based sensor system or component thereof. The reference frame of the space or room based sensor system or component may be relatively fixed, and may be identical to a reference frame of the physical space itself. Alternatively, one or more transformations (e.g., translation and/or rotation matrices) may mathematically relate the reference frame of the space or room based sensor system or component with the reference frame of the physical space.

Cloud Servers

Figure 8:
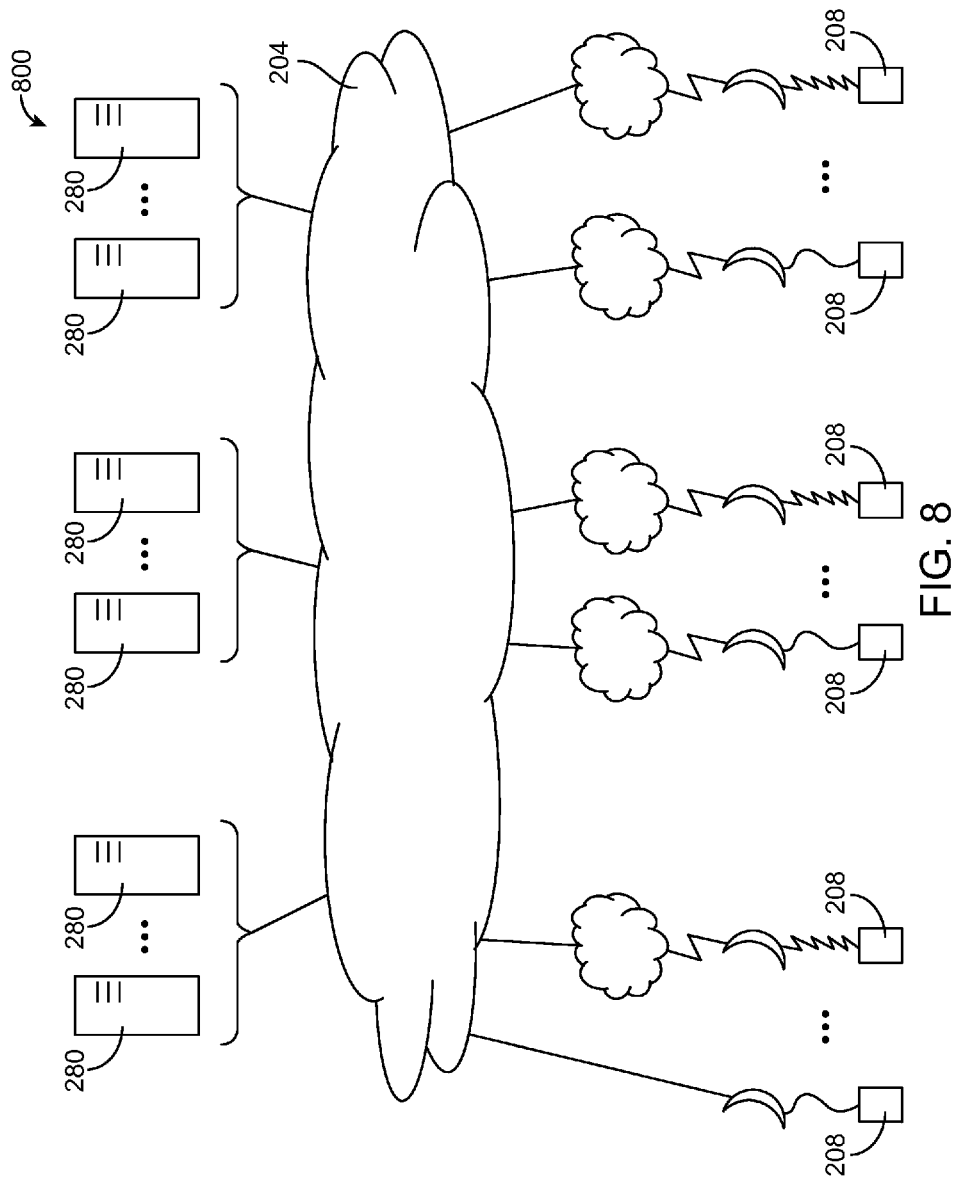
FIG. 8 illustrates a communication architecture of the augmented reality system and the interaction of the augmented reality systems of many users with the cloud.

FIG. 8 illustrates a communications architecture which employs one or more hub, central, or distributed, server computer systems and one or more individual augmented reality systems communicatively coupled by one or more wired or wireless networks, according to one illustrated embodiment. In one or more embodiments, a cloud server may refer to a server that is accessed by the one or more individual AR systems through a network (e.g., wired network, wireless network, Bluetooth, cellular network, etc.) In the illustrated embodiment, the individual AR systems communicate with the cloud servers or server computer systems 280 through a network 204. In one or more embodiments, a cloud server may refer to a hosted server or processing system that is hosting at a different location, and is accessed by multiple users on demand through the Internet or some type of network. In one or more embodiments, a cloud server may be a set of multiple connected servers that comprise a cloud.

The server computer systems 280 may, for example, be clustered. For instance, clusters of server computer systems may be located at various geographically dispersed locations. Such may facilitate communications, shortening transit paths and/or provide for redundancy.

Specific instances of personal augmented reality systems 208 may be communicatively coupled to the server computer system(s) 280 through a cloud network 204. The server computer system(s) 280 may maintain information about a specific user's own physical and/or virtual worlds. The server computer system(s) 280 may allow a given user to share information about the specific user's own physical and/or virtual worlds with other users. Additionally or alternatively, the server computer system(s) 280 may allow other users to share information about their own physical and/or virtual worlds with the given or specific user. As described herein, server computer system(s) 280 may allow mapping and/or characterizations of large portions of the physical worlds. Information may be collected via the personal augmented reality system of one or more users. The models of the physical world may be developed over time, and by collection via a large number of users. This may allow a given user to enter a new portion or location of the physical world, yet benefit by information collected by others who either previously or are currently in the particular location. Models of virtual worlds may be created over time via user by a respective user.

The individual AR system(s) 208 may be communicatively coupled to the server computer system(s). For example, the personal augmented reality system(s) 208 may be wirelessly communicatively coupled to the server computer system(s) 280 via one or more radios. The radios may take the form of short range radios, as discussed above, or relatively long range radios, for example cellular chip sets and antennas. The individual AR system(s) 208 will typically be communicatively coupled to the server computer system(s) 280 indirectly, via some intermediary communications network or component. For instance, the individual AR system(s) 208 will typically be communicatively coupled to the server computer system(s) 280 via one or more telecommunications provider systems, for example one or more cellular communications provider networks.

Other Components

In many implementations, the AR system may include additional components.

In one or more embodiments, the AR devices may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents.

In some implementations, haptic devices or components may be worn by the user. An example of a haptic device in the form of a user wearable glove is described herein. In some implementations, haptic devices or components may be held the user. An example of a haptic device in the form of a user wearable glove (e.g., FIG. 34A) is described herein. Other examples of haptic devices in the form of various haptic totems are described further below. The augmented reality system may additionally or alternatively employ other types of haptic devices or user input components.

The AR system may, for example, include one or more physical objects which are manipulable by the user to allow input or interaction with the AR system. These physical objects are referred to herein as totems, and will be described in further detail below. Some totems may take the form of inanimate objects, for example a piece of metal or plastic, a wall, a surface of table. Alternatively, some totems may take the form of animate objects, for example a hand of the user.

As described herein, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, and as discussed in more detail further herein, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad. Many of these components are described in detail further below.

Passable World

The passable world model allows a user to effectively pass over a piece of the user's world (e.g., ambient surroundings, interactions, etc.) to another user. Each user's respective individual AR system captures information as the user passes through or inhabits an environment, which the AR system processes to produce a passable world model.

The individual AR system may communicate or pass the passable world model to a common or shared collection of data at the cloud. The individual AR system may communicate or pass the passable world model to other users of the AR system, either directly or via the cloud. The passable world model provides the ability to efficiently communicate or pass information that essentially encompasses at least a field of view of a user. Of course, it should be appreciated that other inputs (e.g., sensory inputs, image inputs, eye-tracking inputs etc.) may additionally be transmitted to augment the passable world model at the cloud.

Figure 9:
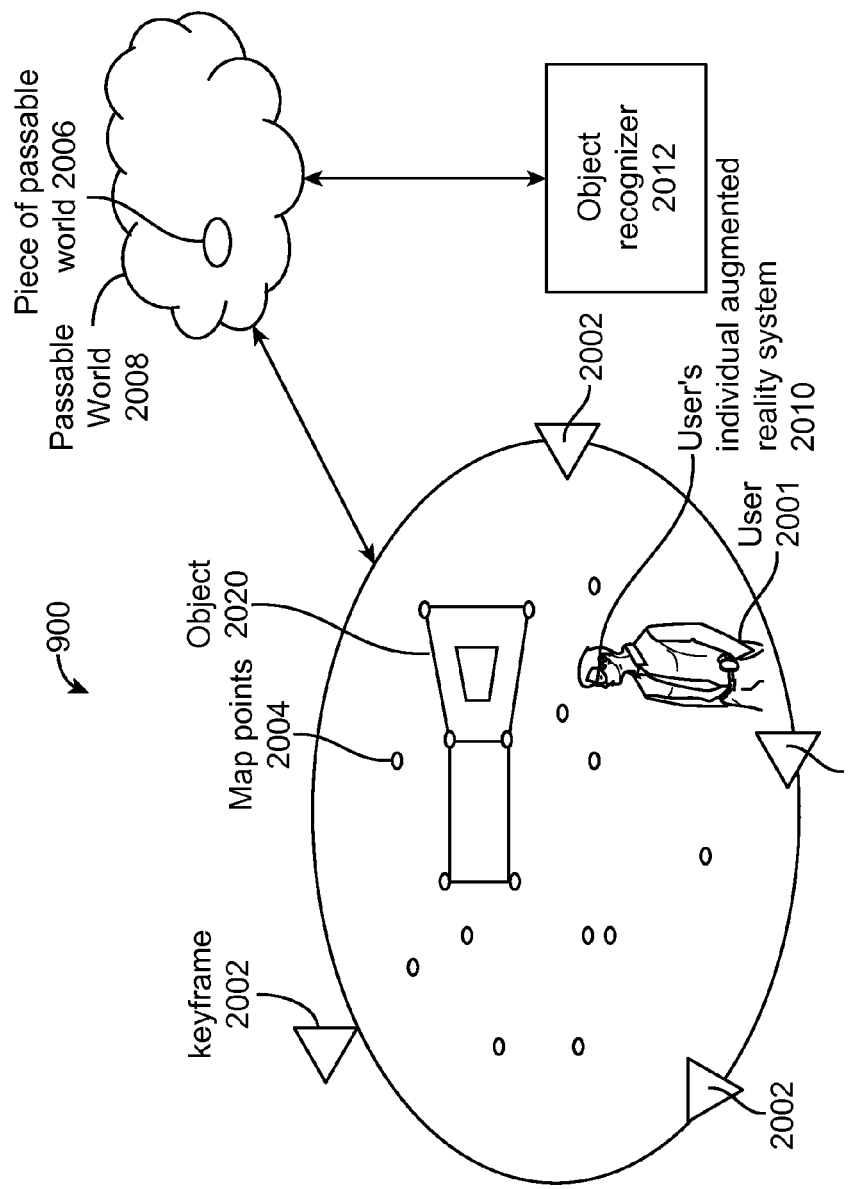
FIG. 9 illustrates a simplified view of the passable world model, according to one embodiment.

FIG. 9 illustrates the components of a passable world model 900 according to one illustrated embodiment. As a user 2001 walks through an environment, the user's individual AR system 2010 captures information (e.g., images, location information, position and orientation information, etc.) and saves the information through posed tagged images. In the illustrated embodiment, an image may be taken of the object 2020 (which resembles a table) and map points 2004 may be collected based on the captured image. This forms the core of the passable world model, as shown by multiple keyframes (e.g., cameras) 2002 that have captured information about the environment.

As shown in FIG. 9, there may be multiple keyframes 2002 that capture information about a space at any given point in time. For example, a keyframe may be another user's AR system capturing information from a particular point of view. Another keyframe may be a room-based camera/sensor system that is capturing images and points 2004 through a stationary point of view. By triangulating images and points from multiple points of view, the position and orientation of real objects in a 3D space may be determined.

In one or more embodiments, the passable world model 2008 is a combination of raster imagery, point and descriptors clouds, and polygonal/geometric definitions (referred to herein as parametric geometry). All this information is uploaded to and retrieved from the cloud, a section of which corresponds to a particular space that the user may have walked into. As shown in FIG. 9, the passable world model also contains many object recognizers 2012 that work on the cloud or on the user's individual system 2010 to recognize objects in the environment based on points and pose-tagged images captured through the various keyframes of multiple users. Essentially by continually capturing information about the physical world through multiple keyframes 2002, the passable world is always growing, and may be consulted (continuously or as needed) in order to determine how to render virtual content in relation to existing physical objects of the real world. By collecting information from the user's environment, a piece of the passable world 2006 is constructed/augmented, and may be "passed" along to one or more AR users simultaneously or in the future.

Asynchronous communications is established between the user's respective individual AR system and the cloud based computers (e.g., server computers). In other words, the user's individual AR system is constantly updating information about the user's surroundings to the cloud, and also receiving information from the cloud about the passable world. Thus, rather than each AR user having to capture images and recognize objects based on the captured images, having an asynchronous system allows the system to be more efficient. Information that already exists about that part of the world is automatically communicated to the individual AR system while new information is updated to the cloud. It should be appreciated that the passable world model lives both on the cloud or other form of networking computing or peer to peer system, and also may live on the user's individual AR system.

In one or more embodiments, the AR system may employ different levels of resolutions for the local components (e.g., computational component 102 such as the belt pack) and remote components (e.g., cloud based computers 280). This is because the remote components (e.g., resources that reside on the cloud servers) are typically more computationally powerful than local components. The cloud based computers may pick data collected by the many different individual AR systems, and/or one or more space or room based sensor systems, and utilize this information to add on to the passable world model. The cloud based computers may aggregate only the best (e.g., most useful) information into a persistent world model. In other words, redundant information and/or less-than-optimal quality information may be timely disposed so as not to deteriorate the quality and/or performance of the system.

Figure 10:
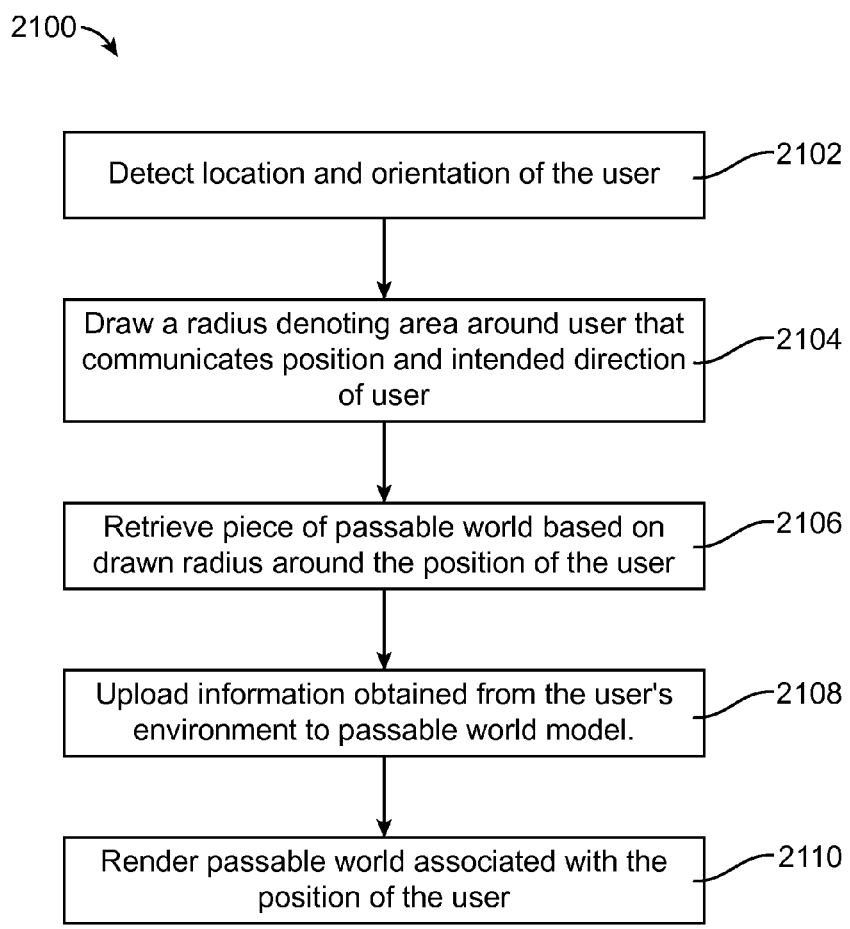
FIG. 10 illustrates an example method of rendering using the passable world model, according to one embodiment.

FIG. 10 illustrates an example method 2100 of interacting with the passable world model. At 2102, the user's individual AR system may detect a location and orientation of the user within the world. In one or more embodiments, the location may be derived by a topological map of the system, as will be described in further detail below. In other embodiments, the location may be derived by GPS or any other localization tool. It should be appreciated that the passable world may be constantly accessed by the individual AR system.

In another embodiment (not shown), the user may request access to another user's space, prompting the system to access that section of the passable world, and associated parametric information corresponding to the other user. Thus, there may be many triggers for the passable world. At the simplest level, however, it should be appreciated that the passable world is constantly being updated and accessed by multiple user systems, thereby constantly adding and receiving information from the cloud.

Following the above example, based on the known location of the user, at 2104, the system may draw a radius denoting a physical area around the user that communicates both the position and intended direction of the user. Next, at 2106, the system may retrieve a piece of the passable world based on the anticipated position of the user. In one or more embodiments, the piece of the passable world may contain information from the geometric map of the space acquired through previous keyframes and captured images and data stored in the cloud. At 2108, the AR system uploads information from the user's environment into the passable world model. At 2110, based on the uploaded information, the AR system renders the passable world associated with the position of the user to the user's individual AR system.

This information enables virtual content to meaningfully interact with the user's real surroundings in a coherent manner. For example, a virtual "monster" may be rendered to be originating from a particular building of the real world. Or, in another example, a user may leave a virtual object in relation to physical coordinates of the real world such that a friend (also wearing the AR system) finds the virtual object in the same physical coordinates. In order to enable such capabilities (and many more), it is important for the AR system to constantly access the passable world to retrieve and upload information. It should be appreciated that the passable world contains persistent digital representations of real spaces that is crucially utilized in rendering virtual and/or digital content in relation to real coordinates of a physical space. It should be appreciated that the AR system may maintain coordinates of the real world and/or virtual world. In some embodiments, a third party may maintain the map (e.g., coordinates) of the real world, and the AR system may consult the map to determine one or more parameters in order to render virtual content in relation to real objects of the world.

It should be appreciated that the passable world model does not itself render content that is displayed to the user. Rather it is a high level concept of dynamically retrieving and updating a persistent digital representation of the real world in the cloud. In one or more embodiments, the derived geometric information is loaded onto a game engine, which then renders content associated with the passable world. Thus, regardless of whether the user is in a particular space or not, that particular space has a digital representation in the cloud that can be accessed by any user. This piece of the passable world may contain information about the physical geometry of the space and imagery of the space, information about various avatars that are occupying the space, information about virtual objects and other miscellaneous information.

As described in detail further herein, one or more object recognizers may examine or "crawl" the passable world models, tagging points that belong to parametric geometry. Parametric geometry, points and descriptors may be packaged into passable world models, to allow low latency passing or communicating of information corresponding to a portion of a physical world or environment. In one or more embodiments, the AR system can implement a two tier structure, in which the passable world model allow fast pose processing in a first tier, but then inside that framework is a second tier (e.g., FAST features). In one or more embodiments, the second tier structure can increase resolution by performing a frame-to-frame based three-dimensional (3D) feature mapping.

Figure 11:
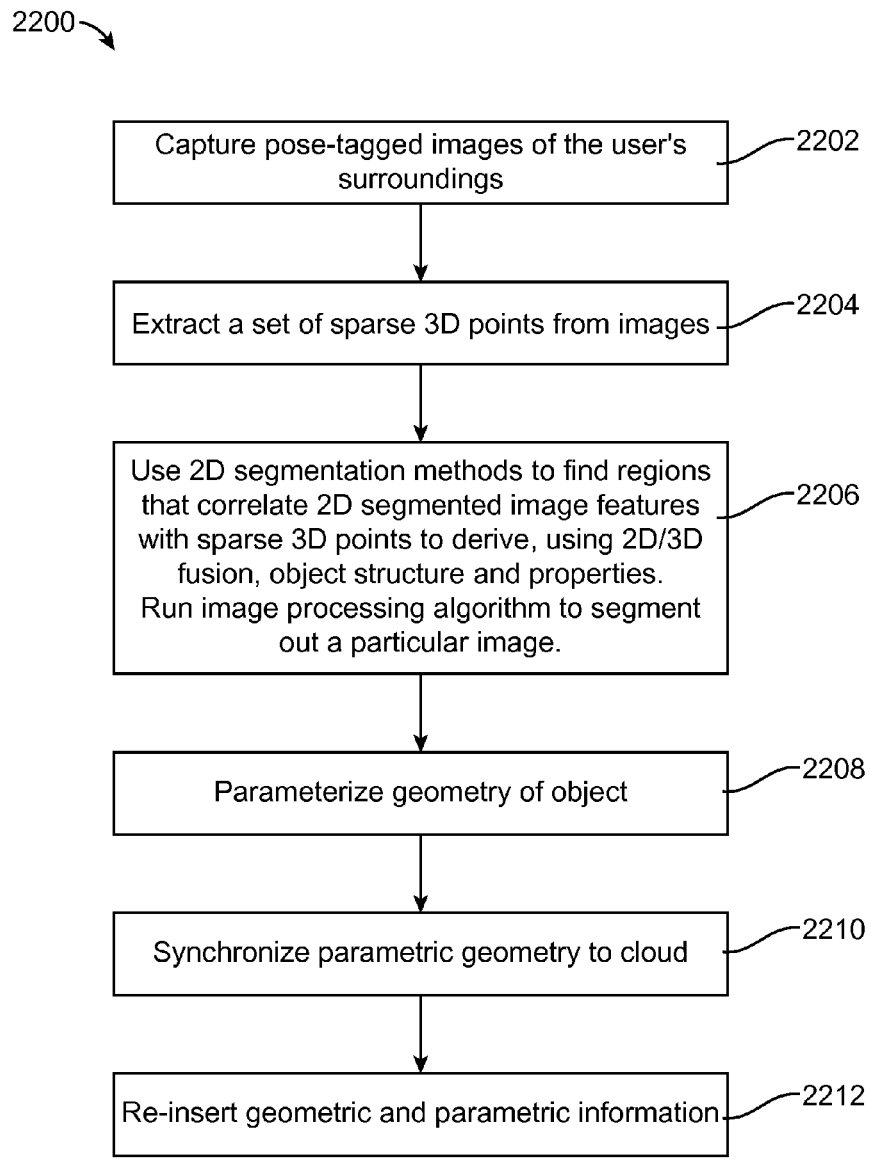
FIG. 11 illustrates a high level flow diagram for a process of recognizing an object, according to one embodiment.

FIG. 11 illustrates an example method 2200 of recognizing objects through object recognizers. At 2202, when a user walks into a room, the user's individual AR system captures information (e.g., images, sensor information, pose tagged images, etc.) about the user's surroundings from multiple points of view. At 2204, a set of 3D points may be extracted from the one or more captured images. For example, by the time the user walks into a section of a room, the user's individual AR system has already captured numerous keyframes and pose tagged images about the surroundings (similar to the embodiment shown in FIG. 9). It should be appreciated that in one or more embodiments, each keyframe may include information about the depth and color of the objects in the surroundings.

In one or more embodiments, the object recognizers (either locally or in the cloud) may use image segmentation techniques to find one or more objects. It should be appreciated that different objects may be recognized by their own object recognizers that have been written by developers and programmed to recognize that particular object. For illustrative purposes, the following example, will assume that the object recognizer recognizes doors. The object recognizer may be an autonomous and/or atomic software object or "robot" that utilizes the pose tagged images of the space, including key frames and 2D and 3D feature points taken from multiple keyframes, and uses this information, and geometry of the space to recognize one or more objects (e.g., the door)

It should be appreciated that multiple object recognizers may run simultaneously on a set of data, and multiple object recognizers may run independent of each other. It should be appreciated that the object recognizer takes 2D images of the object (2D color information, etc.), 3D images (depth information) and also takes 3D sparse points to recognize the object in a geometric coordinate frame of the world.

Next, at 2206, the object recognizer(s) may correlate the 2D segmented image features with the sparse 3D points to derive object structures and one or more properties about the object using 2D/3D data fusion. For example, the object recognizer may identify specific geometry of the door with respect to the keyframes. Next, at 2208, the object recognizer parameterizes the geometry of the object. For example, the object recognizer may attach semantic information to the geometric primitive (e.g., the door has a hinge, the door can rotate 90 degrees, etc.) of the object. Or, the object recognizer may reduce the size of the door, to match the rest of the objects in the surroundings, etc.

At 2210, the AR system may synchronize the parametric geometry of the objects to the cloud. Next, at 2212, the object recognizer may re-insert the geometric and parametric information into the passable world model. For example, the object recognizer may dynamically estimate the angle of the door, and insert it into the world. Thus, it can be appreciated that using the object recognizer allows the system to save computational power because, rather than constantly requiring real-time capture of information about the angle of the door or movement of the door, the object recognizer uses the stored parametric information to estimate the movement or angle of the door. This allows the system to function independently based on computational capabilities of the individual AR system without necessarily relying on information in the cloud servers. It should be appreciated that this information may be updated to the cloud, and transmitted to other AR systems such that virtual content may be appropriately displayed in relation to the recognized door.

As briefly discussed above, object recognizers are atomic autonomous software and/or hardware modules which ingest sparse points (e.g., not necessarily a dense point cloud), pose-tagged images, and geometry, and produce parametric geometry that has semantics attached. The semantics may take the form of taxonomical descriptors, for example "wall," "chair," "Aeron® chair," and properties or characteristics associated with the taxonomical descriptor. For example, a taxonomical descriptor such as a table may have associated descriptions such as "has a flat horizontal surface which can support other objects." Given an ontology, an object recognizer turns images, points, and optionally other geometry, into geometry that has meaning (e.g., semantics).

Since the individual AR systems are intended to operate in the real world environment, the points represent sparse, statistically relevant, natural features. Natural features are those that are inherent to the object (e.g., edges, holes), in contrast to artificial features added (e.g., printed, inscribed or labeled) to objects for the purpose of machine-vision recognition. The points do not necessarily need to be visible to humans. It should be appreciated that the points are not limited to point features, e.g., line features and high dimensional features.

In one or more embodiments, object recognizers may be categorized into two types, Type 1—Basic Objects (e.g., walls, cups, chairs) and Type 2—Detailed Objects (e.g., Aeron® chair, my wall, etc.). In some implementations, the Type 1 recognizers run across the entire cloud, whereas the Type 2 recognizers run against previously found Type 1 data (e.g., search all chairs for Aeron® chairs). In one or more embodiments, the object recognizers may use inherent properties of an object to facilitate object identification. Or, in other embodiments, the object recognizers may use ontological relationships between objects in order to facilitate implementation. For example, an object recognizer may use the fact that window must be "in" a wall to facilitate recognition of instances of windows.

In one or more embodiments, object recognizers may be bundled, partnered or logically associated with one or more applications. For example, a "cup finder" object recognizer may be associated with one, two or more applications in which identifying a presence of a cup in a physical space would be useful. For example, a coffee company may create its own "cup finder" application that allows for the recognition of cups provided by the coffee company. This may enable delivery of virtual content/advertisements, etc. related to the coffee company, and may directly and/or indirectly encourage participation or interest in the coffee company.

Applications can be logically connected for associated with defined recognizable visual data or models. For example, in response to a detection of any Aeron® chairs in an image, the AR system calls or executes an application from the Herman Miller Company, the manufacturer and/or seller of Aeron® chairs. Similarly, in response to detection of a Starbucks® signs or logo in an image, the AR system calls or executes a Starbucks® application.

In yet another example, the AR system may employ an instance of a generic wall finder object recognizer. The generic wall finder object recognizer identifies instances of walls in image information, without regard to specifics about a wall. Thus, the generic wall finder object recognizer may identify vertically oriented surfaces that constitute walls in the image data. The AR system may also employ an instance of a specific wall finder object recognizer, which is separate and distinct from the generic wall finder.

The specific wall finder object recognizer identifies vertically oriented surfaces that constitute walls in the image data and which have one or more specific characteristics beyond those of generic wall. For example, a given specific wall may have one or more windows in defined positions, one or more doors in defined positions, may have a defined paint color, may have artwork hung from the wall, etc., which visually distinguishes the specific wall from other walls. Such features allows the specific wall finder object recognizer to identify particular walls. For example, one instance of a specific wall finder object recognizer may identify a wall of a user's office. Other instances of specific wall finder object recognizers may identify respective walls of a user's living room or bedroom.

A specific object recognizer may stand independently from a generic object recognizer. For example, a specific wall finder object recognizer may run completely independently from a generic wall finder object recognizer, not employing any information produced by the generic wall finder object recognizer. Alternatively, a specific (e.g., more refined) object recognizer may be run nested against objects previously found by a more generic object recognizer. For example, a generic and/or a specific door finder object recognizer may run against a wall found by a generic and/or specific wall finder object recognizer, since a door must be in a wall. Likewise, a generic and/or a specific window finder object recognizer may run against a wall found by a generic and/or specific wall finder object recognizer, since a window must be "in" a wall.

In one or more embodiments, an object recognizer may not only identify the existence or presence of an object, but may also identify other characteristics associated with the object. For example, a generic or specific door finder object recognizer may identify a type of door, whether the door is hinged or sliding, where the hinge or slide is located, whether the door is currently in an open or a closed position, and/or whether the door is transparent or opaque, etc.

As noted above, each object recognizer is atomic, that is the object recognizer is autonomic, autonomous, asynchronous, and essentially a black box software object. This allows object recognizers to be community-built. Developers may be incentivized to build object recognizers. For example, an online marketplace or collection point for object recognizers may be established. Object recognizer developers may be allowed to post object recognizers for linking or associating with applications developed by other object recognizer or application developers.

Various other incentives may be similarly provided. Also for example, an incentive may be provided to an object recognizer developer or author based on the number of times an object recognizer is logically associated with an application and/or based on the total number of distributions of an application to which the object recognizer is logically associated. As a further example, an incentive may be provided to an object recognizer developer or author based on the number of times an object recognizer is used by applications that are logically associated with the object recognizer. The incentives may be monetary incentives, in one or more embodiments. In other embodiments, the incentive may comprise providing access to services or media behind a pay-wall, and/or providing credits for acquiring services, media, or goods.

It would, for example, be possible to instantiate any number of distinct generic and/or specific object recognizers. Some embodiments may require a very large number of generic and specific object recognizers. These generic and/or specific object recognizers can all be run against the same data. As noted above, some object recognizers can be nested such that they are essentially layered on top of each other.

In one or more embodiments, a control program may control the selection, use or operation of the various object recognizers, for example arbitrating the use or operation thereof. Some object recognizers may be placed in different regions, to ensure that the object recognizers do not overlap each other. As discussed above, the object recognizers may run locally at the individual AR system's belt back, or may be run on one or more cloud servers.

Ring Buffer of Object Recomizers

Figure 12:
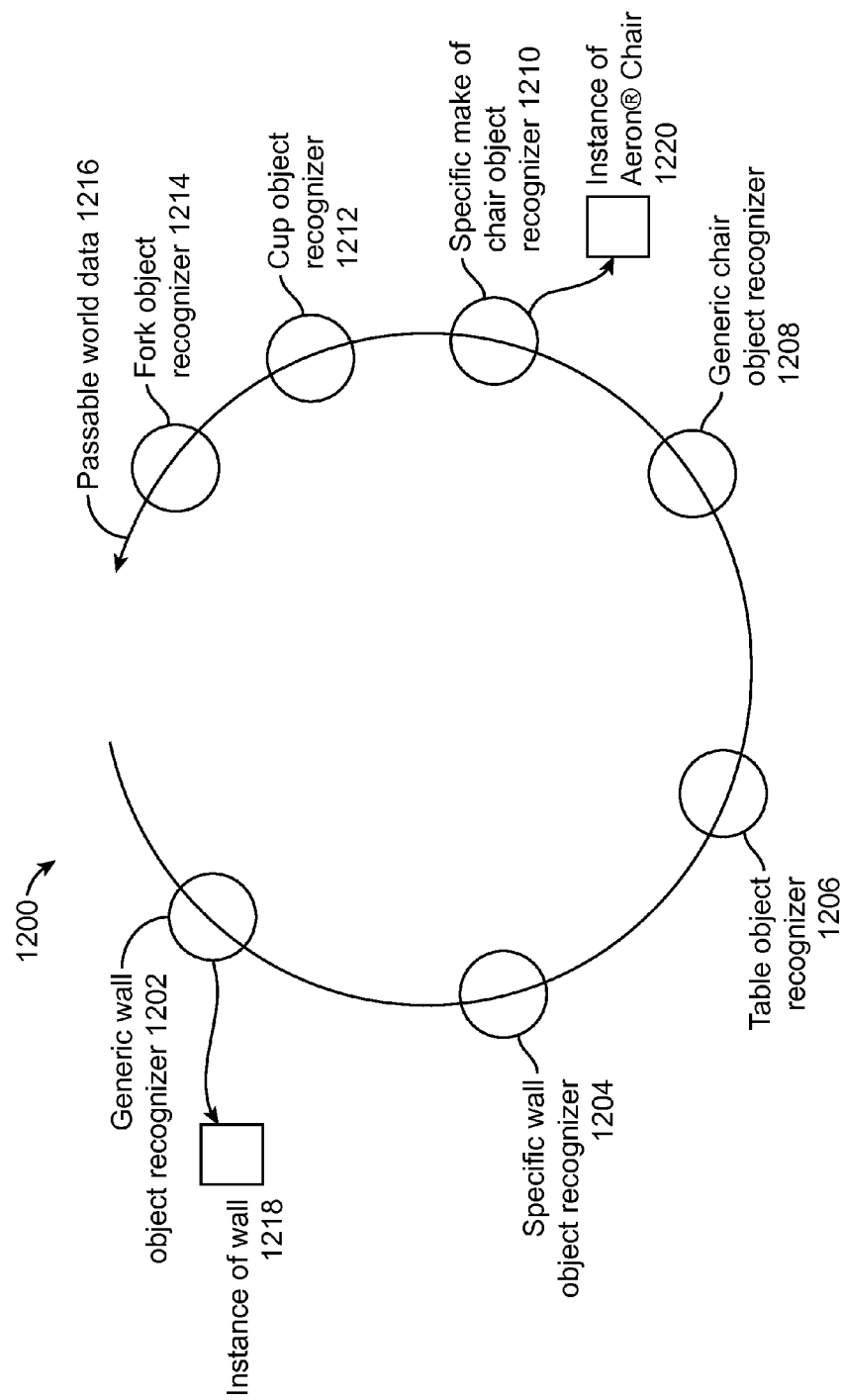
FIG. 12 illustrates a ring buffer approach employed by object recognizers to recognize objects in the passable world, according to one embodiment.

FIG. 12 shows a ring buffer 1200 of object recognizers, according to one illustrated embodiment. The AR system may organize the object recognizers in a ring topology, for example to achieve low disk-read utilization. The various object recognizers may sit on or along the ring, all running in parallel. Passable world model data (e.g., walls, ceiling, floor) may be run through the ring, in one or more embodiments. As the data rolls by, each object recognizer collects that data relevant to the object which the object recognizer recognizes. Some object recognizers may need to collect large amounts of data, while others may only need to collect small amounts of data. The respective object recognizers collect whatever data they require, and return results in the same manner described above.

In the illustrated embodiment, the passable world data 1216 runs through the ring. Starting clockwise, a generic wall object recognizer 1202 may first be run on the passable world data 1216. The generic wall object recognizer 1202 may recognize an instance of a wall 1218. Next, a specific wall object recognizer 1204 may run on the passable world data 1216. Similarly, a table object recognizer 1206, and a generic chair object recognizer 1208 may be run on the passable world data 1216.

Specific object recognizers may also be run on the data, such as the specific Aeron® object recognizer 1210 that successfully recognizes an instance of the Aeron chair 1220. In one or more embodiments, bigger, or more generic object recognizers may go through the data first, and smaller, and finer-detail recognizers may run through the data after the bigger ones are done. Going through the ring, a cup object recognizer 1212 and a fork object recognizer 1214 may be run on the passable world data 1216.

Avatars in the Passable World

As an extension of the passable world model, not only objects are recognized, but other users/people of the real world may be recognized and may be rendered as virtual objects. For example, as discussed above, a friend of a first user may be rendered as an avatar at the AR system of the first user.

In some implementations, in order to render an avatar that properly mimics the user, the user may train the AR system, for example by moving through a desired or prescribed set of movements. In response, the AR system may generate an avatar sequence in which an avatar replicates the movements, for example, by animating the avatar. Thus, the AR system captures or receives images of a user, and generates animations of an avatar based on movements of the user in the captured images. The user may be instrumented, for example, by wearing one or more sensors. In one or more embodiments, the AR system knows where the pose of the user's head, eyes, and/or hands based on data captured by various sensors of his/her individual AR system.

In one or more embodiments, the AR system may allow the user to "set-up" an avatar and "train" the avatar based on predetermined movements and/or patterns. The user can, for example, simply act out some motions for training purposes. In one or more embodiments, the AR system may perform a reverse kinematics analysis of the rest of user's body, and may create an animation based on the reverse kinematics analysis.

In one or more embodiments, the passable world may also contain information about various avatars inhabiting a space. It should be appreciated that every user may be rendered as an avatar in one embodiment. Or, a user operating an individual AR system from a remote location can create an avatar and digitally occupy a particular space as well. In either case, since the passable world is not a static data structure, but rather constantly receives information, avatar rendering and remote presence of users into a space may be based on the user's interaction with the user's individual AR system. Thus, rather than constantly updating an avatar's movement based on captured keyframes, as captured by cameras, avatars may be rendered based on a user's interaction with his/her individual augmented reality device. Advantageously, this reduces the need for individual AR systems to retrieve data from the cloud, and instead allows the system to perform a large number of computation tasks involved in avatar animation on the individual AR system itself.

More particularly, the user's individual AR system contains information about the user's head pose and orientation in a space, information about hand movement etc. of the user, information about the user's eyes and eye gaze, information about any totems that are being used by the user. Thus, the user's individual AR system already holds a lot of information about the user's interaction within a particular space that is transmitted to the passable world model. This information may then be reliably used to create avatars for the user and help the avatar communicate with other avatars or users of that space. It should be appreciated that in one or more embodiments, third party cameras may not be needed to animate the avatar. Rather, the avatar may be animated based on the user's individual AR system, and then transmitted to the cloud to be viewed/interacted with by other users of the AR system.

In one or more embodiments, the AR system captures a set of data pertaining to the user through the sensors of the AR system. For example, accelerometers, gyroscopes, depth sensors, IR sensors, image-based cameras, etc. may determine a movement of the user relative to the head mounted system. This movement may be computed through the processor and translated through one or more algorithms to produce a similar movement in a chose avatar. The avatar may be selected by the user, in one or more embodiments. Or, in other embodiments, the avatar may simply be selected by another user who is viewing the avatar. Or, the avatar may simply be a virtual, real-time, dynamic image of the user itself.

Based on captured set of data pertaining to the user (e.g., movement, emotions, direction of movement, speed of movement, physical attributes, movement of body parts relative to the head, etc.) a pose of the sensors (e.g., sensors of the individual AR system) relative to the user may be determined. The pose (e.g., position and orientation) allow the system to determine a point of view from which the movement/set of data was captured such that it can be translated/transformed accurately. Based on this information, the AR system may determine a set of parameters related to the user's movement (e.g., through vectors) and animate a desired avatar with the calculated movement.

Any similar method may be used to animate an avatar to mimic the movement of the user. It should be appreciated that the movement of the user and the movement of the avatar (e.g., in the virtual image being displayed at another user's individual AR device) are coordinated such that the movement is captured and transferred to the avatar in as little time as possible. Ideally, the time lag between the captured movement of the user, to the animation of the avatar should be minimal.

For example, if the user is not currently at a conference room, but wants to insert an avatar into that space to participate in a meeting at the conference room, the AR system takes information about the user's interaction with his/her own system and uses those inputs to render the avatar into the conference room through the passable world model. The avatar may be rendered such that the avatar takes the form of the user's own image such that it looks like the user himself/herself is participating in the conference. Or, based on the user's preference, the avatar may be any image chosen by the user. For example, the user may render himself/herself as a bird that flies around the space of the conference room.

At the same time, information about the conference room (e.g., key frames, points, pose-tagged images, avatar information of people in the conference room, recognized objects, etc.) may be rendered as virtual content to the user who is not currently in the conference room. In the physical space, the system may have captured keyframes that are geometrically registered and may then derive points from the captured keyframes. As mentioned before, based on these points, the system may calculate pose and may run object recognizers, and may reinsert parametric geometry into the keyframes, such that the points of the keyframes also have semantic information attached to them. Thus, with all this geometric and semantic information, the conference room may now be shared with other users. For example, the conference room scene may be rendered on the user's table. Thus, even if there is no camera at the conference room, the passable world model, using information collected through prior key frames etc., is able to transmit information about the conference room to other users and recreate the geometry of the room for other users in other spaces.

Topological Map

An integral part of the passable world model is to create maps of very minute areas of the real world. For example, in order to render virtual content in relation to physical objects, very detailed localization is required. Such localization may not be achieved simply through GPS or traditional location detection techniques. For example, the AR system may not only require coordinates of a physical location that a user is in, but may, for example, need to know exactly what room of a building the user is located in. Based on this information, the AR system may retrieve data (e.g., specific geometries of real objects in the room, map points for the room, geometric information of the room, etc.) for that room to appropriately display virtual content in relation to the real objects of the identified room. At the same time, however, this precise, granular localization must be done in a cost-effective manner such that not too many resources are consumed unnecessarily.

To this end, the AR system may use topological maps for localization purposes instead of GPS or retrieving detailed geometric maps created from extracted points and pose tagged images (e.g., the geometric points may be too specific, and hence most costly). In one or more embodiments, the topological map is a simplified representation of physical spaces in the real world that is easily accessible from the cloud and only presents a fingerprint of a space, and the relationship between various spaces. Further details about the topological map will be provided further below.

In one or more embodiments, the AR system may layer topological maps on the passable world model, for example to localize nodes. The topological map can layer various types of information on the passable world model, for instance: point cloud, images, objects in space, global positioning system (GPS) data, Wi-Fi data, histograms (e.g., color histograms of a room), received signal strength (RSS) data, etc. This allows various layers of information (e.g., a more detailed layer of information to interact with a more high-level layer) to be placed in context with each other, such that it can be easily retrieved. This information may be thought of as fingerprint data; in other words, it is designed to be specific enough to be unique to a location (e.g., a particular room).

As discussed above, in order to create a complete virtual world that can be reliably passed between various users, the AR system captures different types of information about the user's surroundings (e.g., map points, features, pose tagged images, objects in a scene, etc.). This information is processed and stored in the cloud such that it can be retrieved as needed. As mentioned previously, the passable world model is a combination of raster imagery, point and descriptors clouds, and polygonal/geometric definitions (referred to herein as parametric geometry). Thus, it should be appreciated that the sheer amount of information captured through the users' individual AR system allows for high quality and accuracy in creating the virtual world.

In other words, since the various AR systems (e.g., user-specific head-mounted systems, room-based sensor systems, etc.) are constantly capturing data corresponding to the immediate environment of the respective AR system, very detailed and accurate information about the real world in any point in time may be known with a high degree of certainty. Although this amount of information is highly useful for a host of AR applications, for localization purposes, sorting through that much information to find the piece of passable world most relevant to the user is highly inefficient and costs precious bandwidth.

To this end, the AR system creates a topological map that essentially provides less granular information about a particular scene or a particular place. In one or more embodiments, the topological map may be derived through global positioning system (GPS) data, Wi-Fi data, histograms (e.g., color histograms of a room), received signal strength (RSS) data, etc. For example, the topological map may be created by histograms (e.g., a color histogram) of various rooms/areas/spaces, and be reduced to a node on the topological map. For example, when a user walks into a room or space, the AR system may take a single image (or other information) and construct a color histogram of the image. It should be appreciated that on some level, the histogram of a particular space will be mostly constant over time (e.g., the color of the walls, the color of objects of the room, etc.). In other words, each room or space has a distinct signature that is different from any other room or place. This unique histogram may be compared to other histograms of other spaces/areas and identified. Now that the AR system knows what room the user is in, the remaining granular information may be easily accessed and downloaded.

Thus, although the histogram will not contain particular information about all the features and points that have been captured by various cameras (keyframes), the system may immediately detect, based on the histogram, where the user is, and then retrieve all the more particular geometric information associated with that particular room or place. In other words, rather than sorting through the vast amount of geometric and parametric information that encompasses that passable world model, the topological map allows for a quick and efficient way to localize the AR user. Based on the localization, the AR system retrieves the keyframes and points that are most relevant to the identified location. For example, after the system has determined that the user is in a conference room of a building, the system may then retrieve all the keyframes and points associated with the conference room rather than searching through all the geometric information stored in the cloud.

Figure 13:
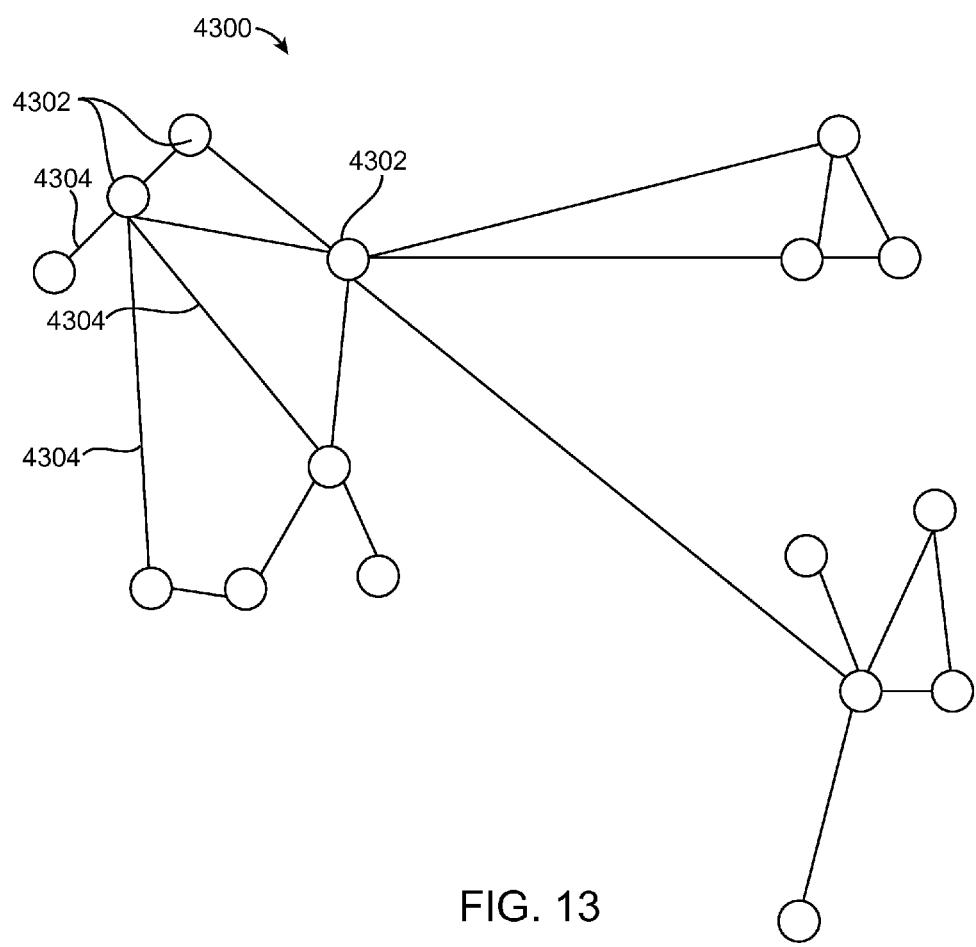
FIG. 13 illustrates an example topological map, according to one embodiment.

Referring now to FIG. 13, an example embodiment of a topological map 4300 is presented. As discussed above, the topological map 4300 may be a collection of nodes 4302 and connections 4304 between the nodes 4302 (e.g., represented by connecting lines). Each node 4302 represents a particular location (e.g., the conference room of an office building) having a distinct signature or fingerprint (e.g., GPS information, color histogram or other histogram, Wi-Fi data, RSS data etc.) and the lines may represent the connectivity between them. It should be appreciated that the connectivity may not have anything to do with geographical connectivity, but rather may simply be a shared device or a shared user. For example, a first user may have walked from a first node to a second node. This relationship may be represented through a connection between the nodes. As the number of AR users increases, the nodes and connections between the nodes will also proportionally increase, providing more precise information about various locations.

Once the AR system has identified a node of the topological map, the system may then retrieve a set of geometric information pertaining to the node to determine how/where to display virtual content in relation to the real objects of that space. Thus, layering the topological map on the geometric map is especially helpful for localization and efficiently retrieving only relevant information from the cloud.

In one or more embodiments, the AR system can represent two images captured by respective cameras of a part of the same scene in a graph theoretic context as first and second pose tagged images. It should be appreciated that the cameras in this context may refer to a single camera taking images of different scenes, or it may be two different cameras. There is some strength of connection between the pose tagged images, which could, for example, be the points that are in the field of views of both of the cameras. In one or more embodiments, the cloud based computer may construct such as a graph (e.g., a topological representation of a geometric world similar to that of FIG. 13). The total number of nodes and edges in the graph is much smaller than the total number of points in the images.

At a higher level of abstraction, other information monitored by the AR system can be hashed together. For example, the cloud based computer(s) may hash together one or more of global positioning system (GPS) location information, Wi-Fi location information (e.g., signal strengths), color histograms of a physical space, and/or information about physical objects around a user. The more points of data there are, the more likely that the computer will statistically have a unique identifier for that space. In this case, space is a statistically defined concept.

As an example, an office may be a space that is represented as, for example a large number of points and two dozen pose tagged images. The same space may be represented topologically as a graph having only a certain number of nodes (e.g., 5, 25, 100, 1000, etc.), which can be easily hashed against. Graph theory allows representation of connectedness, for example as a shortest path algorithmically between two spaces.

Thus, the system abstracts away from the specific geometry by turning the geometry into pose tagged images having implicit topology. The system takes the abstraction a level higher by adding other pieces of information, for example color histogram profiles, and the Wi-Fi signal strengths. This makes it easier for the system to identify an actual real world location of a user without having to understand or process all of the geometry associated with the location.

Figure 14:
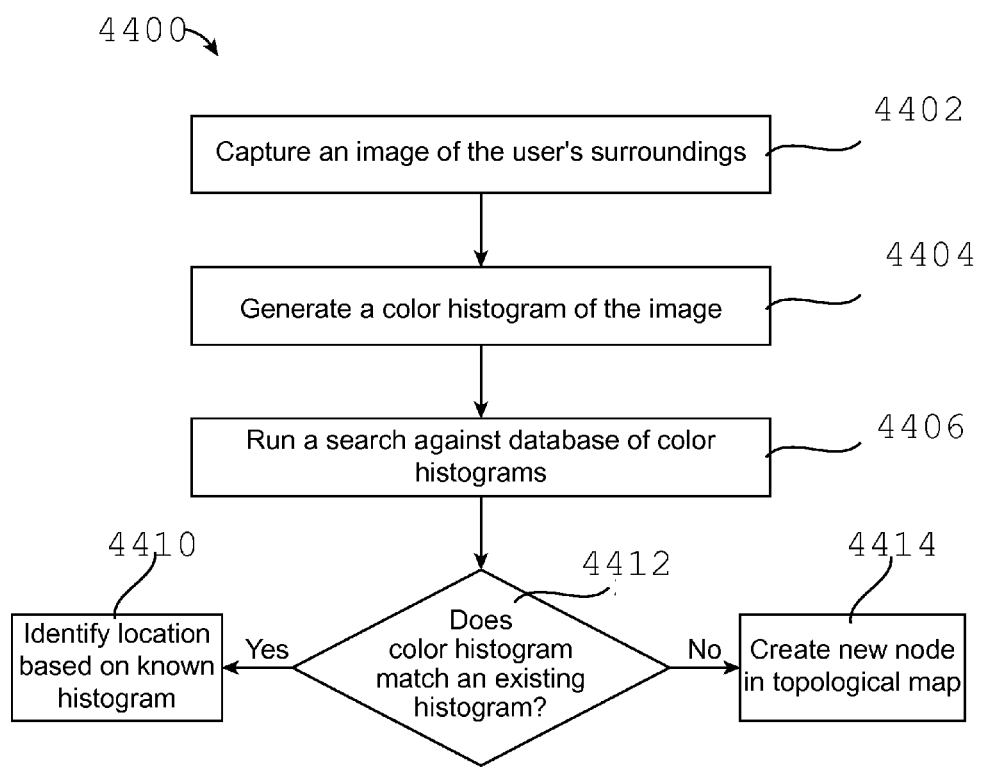
FIG. 14 illustrates a high level flow diagram for a process of localization using the topological map, according to one embodiment.

FIG. 14 illustrates an example method 4400 of constructing a topological map. First, at 4402, the user's individual AR system may capture an image from a first point of view of a particular location (e.g., the user walks into a room of a building, and an image is captured from that point of view). At 4404, a color histogram may be generated based on the captured image. As mentioned before, the system may use any other type of identifying information, (e.g., Wi-Fi data, RSS information, GPS data, number of windows, etc.) but the color histogram is used in this example for illustrative purposes.

Next, at 4406, the system runs a search to identify the location of the user by comparing the color histogram to a database of color histograms stored in the cloud. At 4410, a decision is made to determine whether the color histogram matches an existing color histogram stored in the cloud. If the color histogram does not match any color histogram of the database of color histograms, it may then be stored as a node in the topological made (4414). If the color histogram matches an existing color histogram of the database, it is stored as a node in the cloud (4412). If the color histogram matches an existing color histogram in the database, the location is identified, and the appropriate geometric information is provided to the individual AR system.

Continuing with the same example, the user may walk into another room or another location, where the user's individual AR system takes another picture and generates another color histogram of the other location. If the color histogram is the same as the previous color histogram or any other color histogram, the AR system identifies the location of the user. If the color histogram is not the same as a stored histogram, another node is created on the topological map. Additionally, since the first node and second node were taken by the same user (or same camera/same individual user system), the two nodes are connected in the topological map.

In addition to aiding in localization, the topological map may also be used to improve/fix errors and or missing information in geometric maps. In one or more embodiments, topological maps may be used to find loop-closure stresses in geometric maps or geometric configurations of a particular place. As discussed above, for any given location or space, images taken by one or more AR systems (multiple field of view images captured by one user's individual AR system or multiple users' AR systems) give rise a large number of map points of the particular space. For example, a single room may correspond to thousands of map points captured through multiple points of views of various cameras (or one camera moving to various positions).

The AR system utilizes map points to recognize objects (through object recognizers) as discussed above, and to add to on to the passable world model in order to store a more comprehensive picture of the geometry of various objects of the real world. In one or more embodiments, map points derived from various key frames may be used to triangulate the pose and orientation of the camera that captured the images. In other words, the collected map points may be used to estimate the pose (e.g., position and orientation) of the keyframe (e.g. camera) capturing the image.

It should be appreciated, however, that given the large number of map points and keyframes, there are bound to be some errors (e.g., stresses) in this calculation of keyframe position based on the map points. To account for these stresses, the AR system may perform a bundle adjust. A bundle adjust allows for the refinement, or optimization of the map points and keyframes to minimize the stresses in the geometric map.

Figure 15:
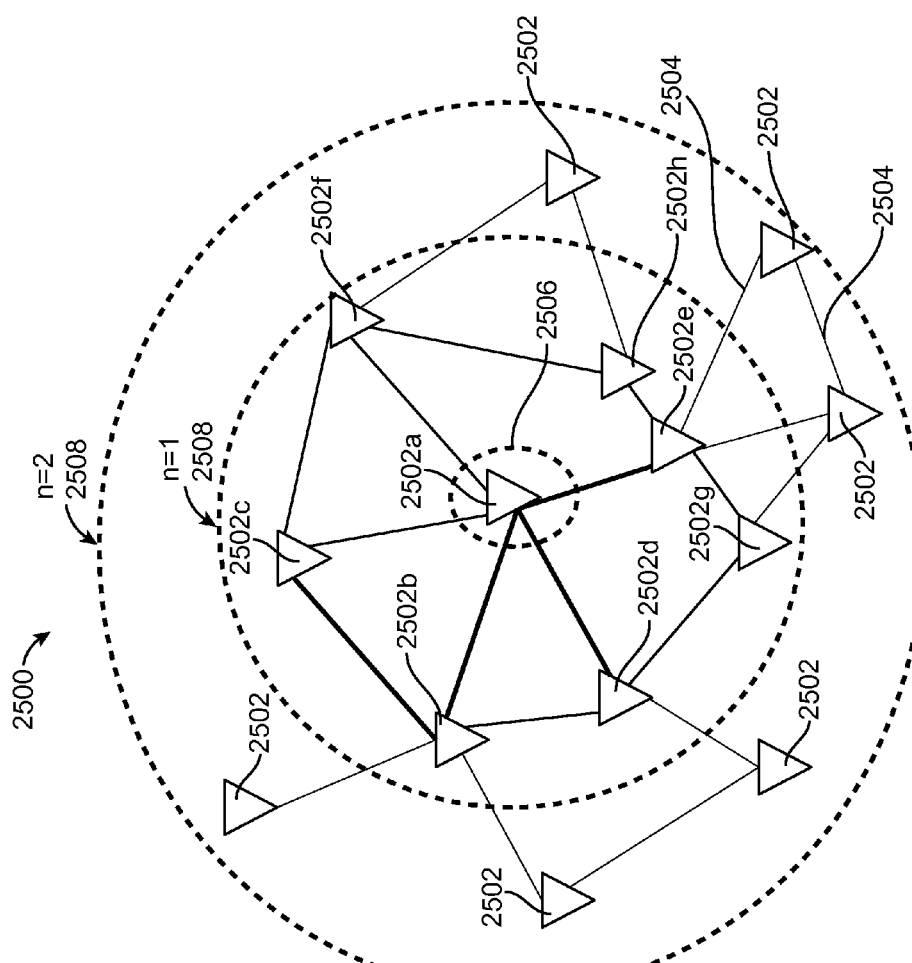
FIG. 15 illustrates a geometric map as a connection between various keyframes, according to one embodiment.

For example, as illustrated in FIG. 15, an example geometric map is presented. As shown in FIG. 15, the geometric map may be a collection of keyframes 2502 that are all connected to each other. The keyframes 2502 may represent a point of view from which various map points are derived for the geometric map. In the illustrated embodiment, each node of the geometric map represents a keyframe (e.g., camera), and the various keyframes are connected to each other through connecting lines 2504.

In the illustrated embodiment, the strength of the connection between the different keyframes is represented by the thickness of the connecting lines 2504. For example, as shown in FIG. 15, the connecting lines between node 2502a and 2502b is depicted as a thicker connecting line 2504 as compared to the connecting lines between node 2502a and node 2502f. The connecting lines between node 2502a and node 2502d is also depicted to be thickener than the connecting line between 2502b and node 2502d. In one or more embodiments, the thickness of the connecting lines represents the number of features or map points shared between them. For example, if a first keyframe and a second keyframe are close together, they may share a large number of map points (e.g., node 2502a and node 2502b), and may thus be represented with a thicker connecting line. Of course, it should be appreciated that other ways of representing geometric maps may be similarly used.

For example, the strength of the line may be based on a geographical proximity between the keyframes, in another embodiment. Thus, as shown in FIG. 15, each geometric map represents a large number of keyframes 2502 and their connection to each other. Now, assuming that a stress is identified in a particular point of the geometric map, a bundle adjust may be performed to alleviate the stress by radially pushing the stress out radially out from the identified point of stress 2506. The stress is pushed out radially in waves 2508 (e.g., n=1, n=2, etc.) propagating from the point of stress, as will be described in further detail below.

The following description illustrates an example method of performing a wave propagation bundle adjust. It should be appreciated that all the examples below refer solely to wave propagation bundle adjusts, and other types of bundle adjusts may be similarly used in other embodiments. First, a particular point of stress is identified. In the illustrated embodiment of FIG. 15, consider the center (node 2502a) to be the identified point of stress. For example, the system may determine that the stress at a particular point of the geometric map is especially high (e.g., residual errors, etc.). The stress may be identified based on one of two reasons. One, a maximum residual error may be defined for the geometric map. If a residual error at a particular point is greater than the predefined maximum residual error, a bundle adjust may be initiated. Second, a bundle adjust may be initiated in the case of loop closure stresses, as will be described further below (when a topological map indicates mis-alignments of map points).

When a stress is identified, the AR system distributes the error evenly, starting with the point of stress and propagating it radially through a network of nodes that surround the particular point of stress. For example, in the illustrated embodiment, the bundle adjust may distribute the error to n=1 (one degree of separation from the identified point of stress, node 2502a) around the identified point of stress. In the illustrated embodiment, nodes 2502b-2502g are all part of the n=1 wave around the point of stress, node 2502a.

In some cases, this may be sufficient. In other embodiments, the AR system may propagate the stress even further, and push out the stress to n=2 (two degrees of separation from the identified point of stress, node 2502a), or n=3 (three degrees of separation from the identified point of stress, node 2502a) such that the stress is radially pushed out further and further until the stress is distributed evenly. Thus, performing the bundle adjust is an important way of reducing stress in the geometric maps. Ideally, the stress is pushed out to n=2 or n=3 for better results.

In one or more embodiments, the waves may be propagated in even smaller increments. For example, after the wave has been pushed out to n=2 around the point of stress, a bundle adjust can be performed in the area between n=3 and n=2, and propagated radially. By controlling the wave increments, this iterative wave propagating bundle adjust process can be run on massive data to reduce stresses on the system. In an optional embodiment, because each wave is unique, the nodes that have been touched by the wave (e.g., bundle adjusted) may be colored so that the wave does not re-propagate on an adjusted section of the geometric map. In another embodiment, nodes may be colored so that simultaneous waves may propagate/originate from different points in the geometric map.

As mentioned previously, layering the topological map on the geometric map of keyframes and map points may be especially crucial in finding loop-closure stresses. A loop-closure stress refers to discrepancies between map points captured at different times that should be aligned but are mis-aligned. For example, if a user walks around the block and returns to the same place, map points derived from the position of the first keyframe and the map points derived from the position of the last keyframe as extrapolated from the collected map points should ideally be identical. However, given stresses inherent in the calculation of pose (position of keyframes) based on the different map points, there are often errors and the system does not recognize that the user has come back to the same position because estimated key points from the first key frame are not geometrically aligned with map points derived from the last keyframe. This may be an example of a loop-closure stress.

Figure 16:
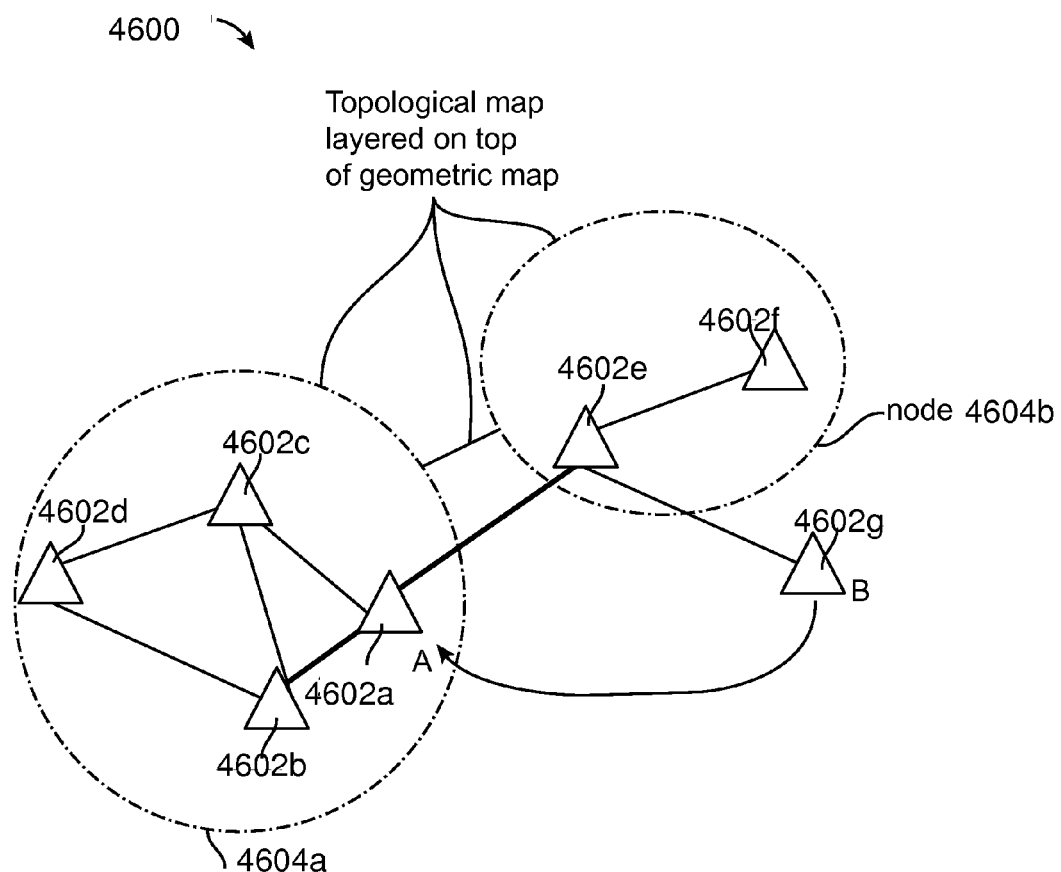
FIG. 16 illustrates an example embodiment of the topological map layered on top of the geometric map, according to one embodiment.

To this end, the topological map may be used to find the loop-closure stresses in a geometric map. Referring back to the previous example, using the topological map along with the geometric map allows the AR system to recognize the loop-closure stresses in the geometric map because the topological map may indicate that the user has come back to the starting point (based on the color histogram, for example). For example, referring to the layered map 4600 of FIG. 16, the nodes of the topological map (e.g., 4604a and 4604b) are layered on top of the nodes of the geometric map (e.g., 4602a-4602f). As shown in FIG. 16, the topological map, when placed on top of the geometric map may suggest that keyframe B (node 4602g) is the same as keyframe A (node 4602a). Based on this, a loop closure stress may be detected, the system detects that keyframes A and B should be closer together in the same node, and the system may then perform a bundle adjust. Thus, having identified the loop-closure stress, the AR system may then perform a bundle adjust on the identified point of stress, using a bundle adjust technique, such as the one discussed above.

It should be appreciated that performing the bundle adjust based on the layering of the topological map and the geometric map ensures that the system only retrieves the keyframes on which the bundle adjust needs to be performed instead of retrieving all the keyframes in the system. For example, if the AR system identifies, based on the topological map that there is a loop-closure stress, the system may simply retrieve the keyframes associated with that particular node or nodes of the topological map, and perform the bundle adjust on only those keyframes rather than all the keyframes of the geometric map. Again, this enables the system to be efficient and not retrieve unnecessary information that might unnecessarily tax the system.

Figure 17:
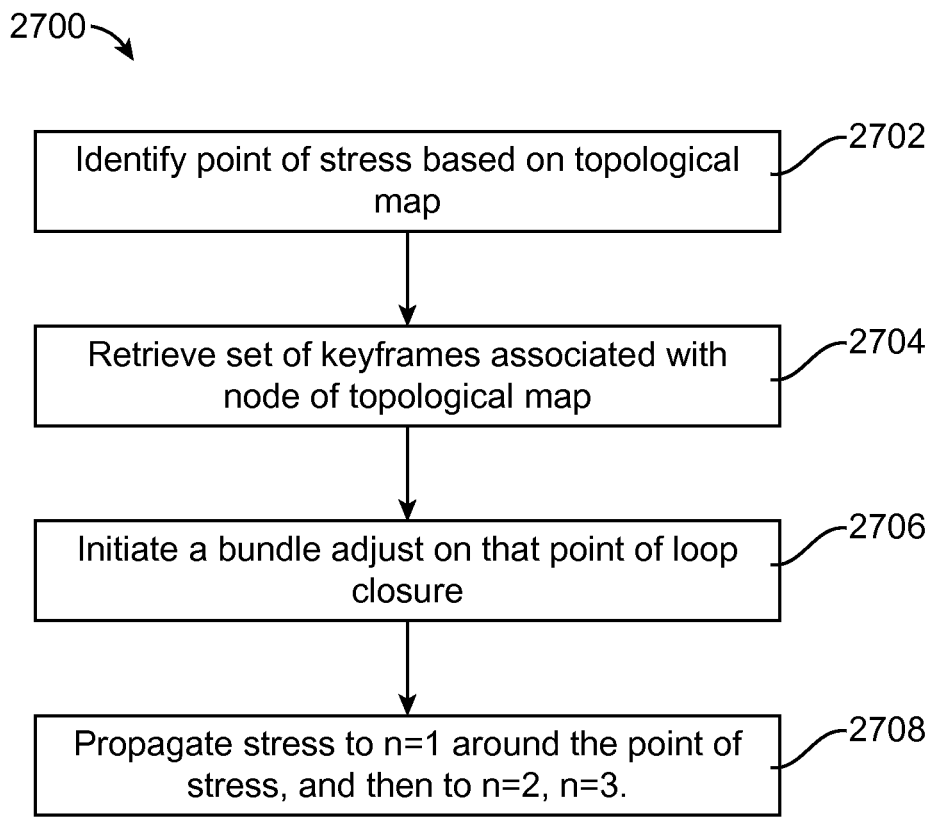
FIG. 17 illustrates a high level flow diagram for a process of performing a wave propagation bundle adjust, according to one embodiment.

Referring now to FIG. 17, an example method 2700 for correcting loop-closure stresses based on the topological map is described. At 2702, the system may identify a loop closure stress based on a topological map that is layered on top of a geometric map. Once the loop closure stress has been identified, at 2704, the system may retrieve the set of key frames associated with the node of the topological map at which the loop closure stress has occurred. After having retrieved the key frames of that node of the topological map, the system may, at 2706, initiate a bundle adjust on that point in the geometric map. At 2708, the stress is propagated away from the identified point of stress and is radially distributed in waves, to n=1 (and then n=2, n=3, etc.) similar to the technique shown in FIG. 15.

Mapping

In mapping out the virtual world, it is important to know all the features and points in the real world to accurately portray virtual objects in relation to the real world. To this end, as discussed above, map points captured from various head-worn AR systems are constantly adding to the passable world model by adding in new pictures that convey information about various points and features of the real world. Based on the points and features, as discussed above, one can also extrapolate the pose and position of the keyframe (e.g., camera, etc.). While this allows the AR system to collect a set of features (2D points) and map points (3D points), it may also be important to find new features and map points to render a more accurate version of the passable world.

One way of finding new map points and/or features may be to compare features of one image against another. Each feature may have a label or feature descriptor attached to it (e.g., color, identifier, etc.). Comparing the labels of features in one picture to another picture may be one way of uniquely identifying natural features in the environment. For example, if there are two keyframes, each of which captures about 500 features, comparing the features of one keyframe with the other may help determine new map points. However, while this might be a feasible solution when there are just two keyframes, it becomes a very large search problem that takes up a lot of processing power when there are multiple keyframes, each of which captures millions of points. In other words, if there are M keyframes, each having N unmatched features, searching for new features involves an operation of $MN^2$ ($O(MN^2)$). Unfortunately, this is a very large search operation.

Figure 18:
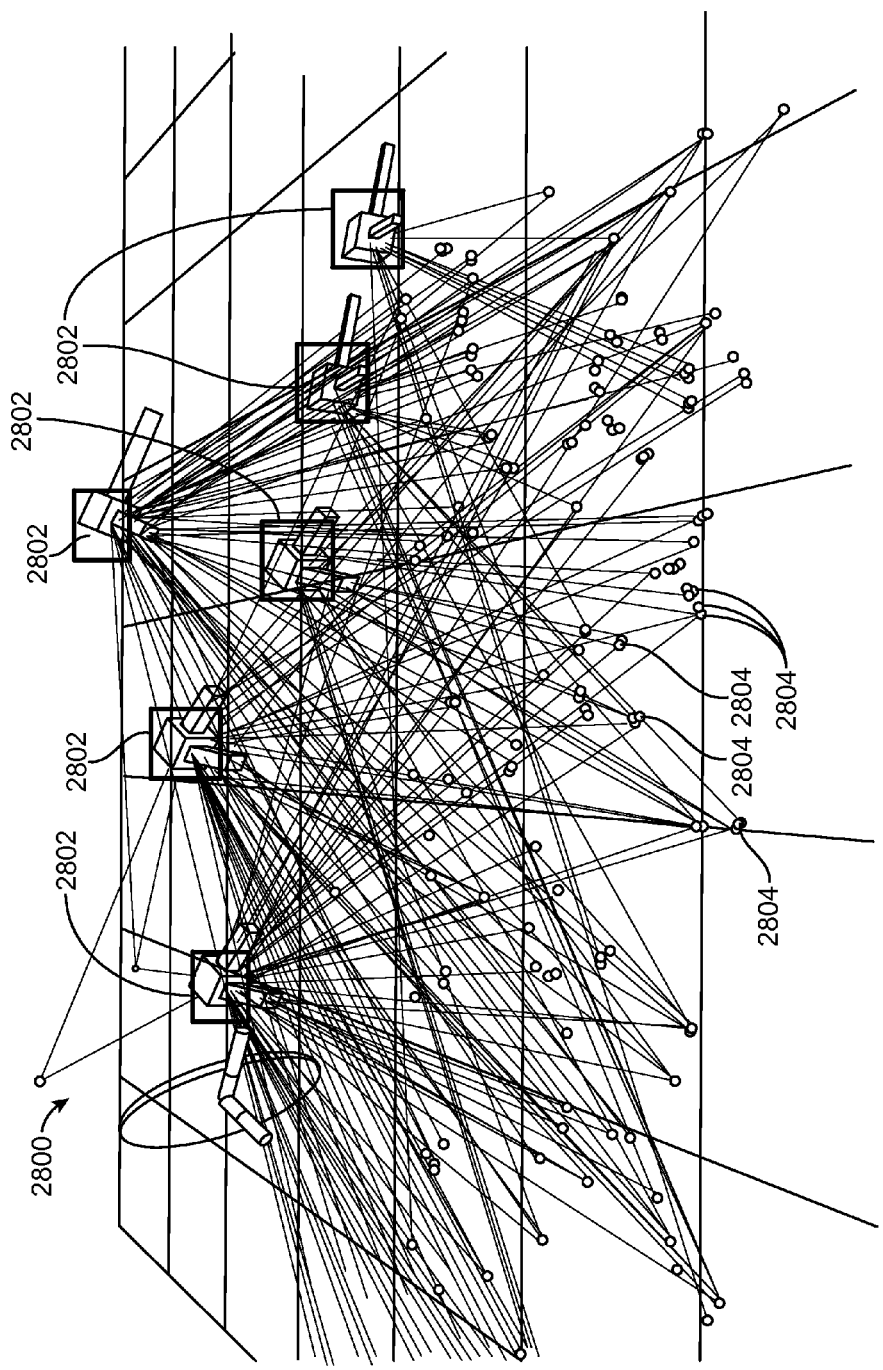
FIG. 18 illustrates map points and render lines from the map points to the keyframes as seen through a virtual keyframe, according to one embodiment.

One approach to find new points that avoids such a large search operation is by render rather than search. In other words, assuming the position of M keyframes are known and each of them has N points, the AR system may project lines (or cones) from N features to the M keyframes to triangulate a 3D position of the various 2D points. Referring now to FIG. 18, in this particular example, there are 6 keyframes 2802, and lines or rays are rendered (using a graphics card) from the 6 keyframes to the points 2804 derived from the respective keyframe. In one or more embodiments, new 3D map points may be determined based on the intersection of the rendered lines. In other words, when two rendered lines intersect, the pixel coordinates of that particular map point in a 3D space may be 2 instead of 1 or 0. Thus, the higher the intersection of the lines at a particular point, the higher the likelihood is that there is a map point corresponding to a particular feature in the 3D space. In one or more embodiments, this intersection approach, as shown in FIG. 18 may be used to find new map points in a 3D space.

It should be appreciated that for optimization purposes, rather than rendering lines from the keyframes, triangular cones may instead be rendered from the keyframe for more accurate results. The triangular cone is projected such that a rendered line to the N feature (e.g., 2804) represents a bisector of the triangular cone, and the sides of the cone are projected on either side of the Nth feature. In one or more embodiments, the half angles to the two side edges may be defined by the camera's pixel pitch, which runs through the lens mapping function on either side of the Nth feature.

The interior of the cone may be shaded such that the bisector is the brightest and the edges on either side of the Nth feature may be set of 0. The camera buffer may be a summing buffer, such that bright spots may represent candidate locations of new features, but taking into account both camera resolution and lens calibration. In other words, projecting cones, rather than lines may help compensate for the fact that certain keyframes are farther away than others that may have captured the features at a closer distance In this approach, a triangular cone rendered from a keyframe that is farther away will be larger (and have a large radius) than one that is rendered from a keyframe that is closer. A summing buffer may be applied in order to determine the 3D map points (e.g., the brightest spots of the map may represent new map points).

Essentially, the AR system may project rays or cones from a number of N unmatched features in a number M prior key frames into a texture of the M+1 keyframe, encoding the keyframe identifier and feature identifier. The AR system may build another texture from the features in the current keyframe, and mask the first texture with the second. All of the colors are a candidate pairing to search for constraints. This approach advantageously turns the $O(MN^2)$ search for constraints into an $O(MN)$ render, followed by a tiny $O((<M)N(<<N))$ search.

In another approach, new map points may be determined by selecting a virtual keyframe from which to view the existing N features. In other words, the AR system may select a virtual key frame from which to view the map points. For instance, the AR system may use the above keyframe projection, but pick a new "keyframe" based on a PCA (Principal component analysis) of the normals of the M keyframes from which {M,N} labels are sought (e.g., the PCA-derived keyframe will give the optimal view from which to derive the labels).

Performing a PCA on the existing M keyframes provides a new keyframe that is most orthogonal to the existing M keyframes. Thus, positioning a virtual key frame at the most orthogonal direction may provide the best viewpoint from which to find new map points in the 3D space. Performing another PCA provides a next most orthogonal direction, and performing a yet another PCA provides yet another orthogonal direction. Thus, it can be appreciated that performing 3 PCAs may provide an x, y and z coordinates in the 3D space from which to construct map points based on the existing M key frames having the N features.

Figure 19:
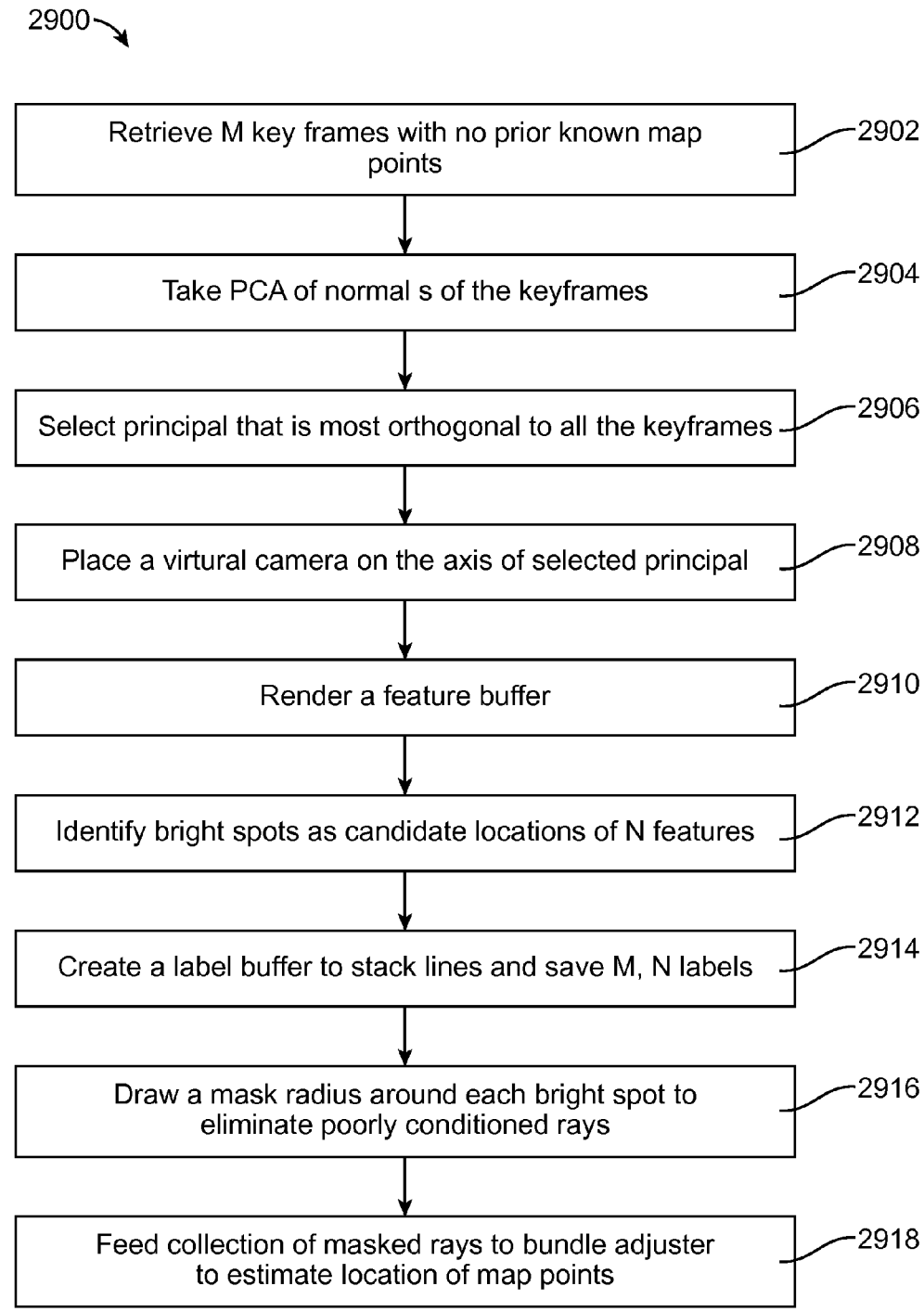
FIG. 19 illustrates a high level flow diagram for a process of finding map points based on render rather than search, according to one embodiment.

FIG. 19 describes an example method 2900 for determining map points from M known keyframes. First, at 2902, the AR system retrieves M keyframes associated with a particular space. As discussed above, M keyframes refers to known keyframes that have captured the particular space. Next, at 2904, a PCA of the normal of the keyframes is performed to find the most orthogonal direction of the M key frames. It should be appreciated that the PCA may produce three principals each of which is orthogonal to the M key frames. Next, at 2906, the AR system selects the principal that is smallest in the 3D space, and is also the most orthogonal to the view of all the M keyframes.

At 2908, after having identified the principal that is orthogonal to the keyframes, a virtual keyframe may be placed along the axis of the selected principal. In one or more embodiments, the virtual keyframe may be placed far away enough so that its field of view includes all the M keyframes.

Next, at 2910, the AR system may render a feature buffer, such that rays (or cones) are rendered from each of the M key frames to the Nth feature. The feature buffer may be a summing buffer, such that the bright spots (pixel coordinates at which lines N lines have intersected) represent candidate locations of N features. It should be appreciated that the same process described above may be repeated with all three PCA axes, such that map points are found on x, y and z axes.

Next, at 2912 the system may store all the bright spots in the image as virtual "features". Next, at 2914, a second "label" buffer may be created at the virtual keyframe to stack the lines (or cones) and to save their {M, N} labels. Next, at 2916, a "mask radius" may be drawn around each bright spot in the feature buffer. It should be appreciated that the mask radius represents the angular pixel error of the virtual camera. The AR system may fill the resulting circles around each bright spot, and mask the label buffer with the resulting binary image. In an optional embodiment, the circles may be filled by applying a gradient filter such that the center of the circles are bright, but the brightness fades to zero at the periphery of the circle.

In the now-masked label buffer, the principal rays may be collected using the {M, N}-tuple label of each triangle. It should be appreciated that if cones/triangles are used instead of rays, the AR system may only collect triangles where both sides of the triangle are captured inside the circle. Thus, the mask radius essentially acts as a filter that eliminates poorly conditioned rays or rays that have a large divergence (e.g., a ray that is at the edge of a field of view (FOV) or a ray that emanates from far away).

For optimization purposes, the label buffer may be rendered with the same shading as used previously in generated cones/triangles). In another optional optimization embodiment, the triangle density may be scaled from one to zero instead of checking the extents (sides) of the triangles. Thus, rays that are very divergent will effectively raise the noise floor inside a masked region. Running a local threshold-detect inside the mark will trivially pull out the centroid from only those rays that are fully inside the mark.

At 2918, the collection of masked/optimized rays m may be fed to a bundle adjuster to estimate and/or correct the location of the newly-determined map points. It should be appreciated that this system is functionally limited to the size of the render buffers that are employed. For example, if the keyframes are widely separated, the resulting rays/cones will have a lower resolution.

In an alternate embodiment, rather than using PCA analysis to find the orthogonal direction, the virtual key frame may be placed at the location of one of the M key frames. This may be a simpler and more effective solution because the M key frames may have already captured the space at the best resolution of the camera. If PCAs are used to find the orthogonal directions at which to place the virtual keyframes, the process above is repeated by placing the virtual camera along each PCA axis and finding map points in each of the axes.

In yet another example method of finding new map points, the AR system may hypothesize new map points. The AR system may retrieve the first three principal components from a PCA analysis on M keyframes. Next, a virtual keyframe may be placed at each principal. Next, a feature buffer may be rendered exactly as discussed above at each of the three virtual keyframes. Since the principal components are by definition orthogonal to each other, rays drawn from each camera outwards may hit each other at a point in 3D space.

It should be appreciated that there may be multiple intersections of rays in some instances. Thus, there may now be N features in each virtual keyframe. Next, a geometric algorithm may be used to find the points of intersection between the different rays. This geometric algorithm may be a constant time algorithm because there may be $N^3$ rays. Masking and optimization may be performed in the same manner described above to find the map points in 3D space.

World Model Refinement

In one or more embodiments, the AR system may stitch separate small world model segments into larger coherent segments. This may occur on two levels: small models and large models. Small models correspond to a local user level (e.g., on the computational component, for instance belt pack). Large models, on the other hand, correspond to a large scale or system-wide level (e.g., cloud system) for "entire world" modeling. This can be implemented as part of the passable world model concept.

For example, the individual AR system worn by a first user captures information about a first office, while the individual AR system worn by a second user captures information about a second office that is different from the first office. The captured information may be passed to cloud-based computers, which eventually builds a comprehensive, consistent, representation of real spaces sampled or collected by various users walking around with individual AR devices. The cloud based computers build the passable world model incrementally, via use over time. It is anticipated that different geographic locations will build up, mostly centered on population centers, but eventually filling in more rural areas.

The cloud based computers may, for example, perform a hash on GPS, Wi-Fi, room color histograms, and caches of all the natural features in a room, and places with pictures, and generate a topological graph that is the topology of the connectedness of things, as described above. The cloud-based computers may use topology to identify where to stitch the regions together. Alternatively, the cloud based computers could use a hash of features (e.g., the topological map), for example identifying a geometric configuration in one place that matches a geometric configuration in another place.

Rendering Systems

In one or more embodiments, the AR system may simultaneously or concurrently employ separate occlusion, depth, and color display or rendering.

For example, the individual AR system may have a color rendering module (e.g., LCD, DLP, LCOS, fiber scanner projector, etc.) that gives spatial color and a spatial backlight which can selectively illuminate parts of color mechanism. In one or more embodiments, the individual AR system may employ a time sequential approach. For example, the individual AR system may produce or load one color image, then step through different regions of the image and selectively illuminate the regions.

In conjunction with selective illumination, the individual AR system can operate a variable focal element that changes the actual perceived depth of the light. The variable focal element may shape the wave front, for example, synchronously with a backlight. The individual AR system may render color, for instance at 60 frames per second. For every one of those frames, the individual AR system can have six frames that are rendered during that period of time that are selectively illuminating one portion of the background. The individual AR system renders all the light in the background in the 60th of a second. This approach advantageously allows rendering of various pieces of an image at different depths.

Most often, a person's head faces forward. The AR system may infer hip orientation using a low pass filter that identifies a direction in which a user's head is pointing and/or by detecting motion relative to the real world or ambient environment. In one or more embodiments, the AR system may additionally or alternatively employ knowledge of an orientation of hands. There is a statistical correlation between these body parts and the hip location and/or hip orientation. Thus, the AR system can infer a hip coordinate frame without using instrumentation to detect hip orientation.

In one or more embodiments, the AR system can use the hip coordinate frame as a virtual coordinate frame to which virtual content is rendered. This may constitute the most general class. The AR system may render virtual objects around the hip coordinate frame like a home screen (e.g., a social networking screen rendered on one part of the user's view, a video screen rendered on another part of the user's view, etc.).

In a world-centric coordinate frame, virtual content (e.g., virtual objects, virtual tools, and other virtual constructs, for instance applications, features, characters, text and other symbols) is fixed with respect to objects of the real world, rather than being fixed to a coordinate frame oriented around the user.

Depth Packing

In some implementations, the AR system blends multiple levels of depth data into a single color frame, for example exploiting the timing characteristics of the LCD display. For example, the AR system may pack six depth layers of data into one single red/green/blue (RGB) frame.

Depth in color space may be achieved by, for example, manipulating depth frames by encoding a Z-buffer in color space. The AR system may encode depth planes as layer-masks in individual color channels.

In one or more embodiments, this may be implemented using standard graphic cards to create a custom shader that renders a single frame that has an RGB frame and the z distance. Thus, the encoded z-buffer may be used to generate volumetric information and determine the depth of the image. A hardware component may be used to interpret the frame buffer and the encoded z-buffer. This means that the hardware and software portions are completely abstracted and that there is minimal coupling between the software and hardware portions.

Three (3) Stage Interaction System

The AR system may render virtual content locked to various reference frames, as discussed above. For example, where the AR system includes a head worn component, a view locked (HUD) reference frame may be useful. That is, the reference frame stays locked to a reference frame of the head, turning and/or tilting with movement of the head. A body locked reference frame is locked to a reference frame of the body, essentially moving around (e.g., translating, rotating) with the movement of the user's body. A world locked reference frame is fixed to a reference frame of the environment and remains stationary within environment. For example, a world locked reference frame may be fixed to a room, wall or table.

In some implementations, the AR system may render virtual content with portions locked to respective ones of two or more reference frames. For example, the AR system may render virtual content using two or more nested reference frames. For instance, the AR system may employ a spherical paradigm. As an example, an inner-most sphere extending to a first radial distance may be locked to a head or view reference frame. Radially outward of the inner-most sphere, an intermediate sphere (e.g., slightly-less than arm's length) may be locked to a body reference frame. Radially outward of the intermediate sphere, an outer or an outer-most sphere (e.g., full arm extension) may be locked to a world reference frame.

As previously noted, the AR system may statistically or otherwise infer actual pose of a body or portion thereof (e.g., hips, hands). For instance, the AR system may select or use the user's hips as a coordinate frame. The AR system statistically infers where the hips are (e.g., position, orientation) and treats that pose as a persistent coordinate frame. As a user moves their head (e.g., rotate, tilt), the AR system renders virtual content (e.g., virtual objects, virtual tools, and other virtual constructs, for instance applications, features, characters, text, digits and other symbols) which are locked to the pose of the user's hips. This can advantageously dramatically increase the virtual field of view. If the user moves their head to look around, the user can see virtual content that is tied around the user's body. That is, the AR system can use a body centered coordinate frame for rendering, e.g., render virtual content with respect to the hip coordinate frame and the virtual content stays locked in the user's field of view no matter how the user's head moves.

Predictive Head Model

In one or more embodiments, the AR system may use information from one or more of actual feature tracker, gyros, accelerometers, compass and other sensors to predict head movement direction, speed and/or acceleration. It takes a certain amount of time to render a frame of virtual content for the rendering engine. The AR system may use various structures or components for rendering frames of virtual content. For example, the AR system may employ a fiber scan projector. Alternatively, the AR system may employ a low persistence display. The AR system may cause flashing of the frame, for example via a backlight. The AR system could use an LCD, for instance, quickly flash the LCD with a very bright backlight, to realize an extremely low persistence display that does not scan through the rasterization. In other words, the AR system gets the pixels in line, and then flashes the LCD with a very bright light for a very short duration.

In some implementations, the AR system may render frames to the world coordinate system, allowing the frame scanning projector (FSP) to scan in the world coordinates and sample the frames. Further details on predictive head modeling are disclosed in U.S. patent application Ser. No. 14/212,961, entitled "DISPLAY SYSTEMS AND METHOD," filed on Mar. 14, 2014, which is herein incorporated by reference in its entirety.

Content Rendering

Ambient light is sometimes a problem for AR systems because it may affect a quality of projection of virtual content to the user. Typically, AR systems have little or no control over the entry of ambient light. Thus there is typically little or no control over how the ambient environment appears where an AR system is used in a real world environment. For instance, ambient light conditions over an entire scene may be overly bright or overly dim. Also for instance, light intensity may vary greatly throughout a scene. Further, there is little or no control over the physical objects that appear in a scene, some of which may be sources of light (e.g., luminaries, windows) or sources of reflection. This can cause rendered virtual content (e.g., virtual objects, virtual tools, and other virtual constructs, for instance applications, features, characters, text and other symbols) difficult to perceive by the AR user.

In one or more embodiments, the AR system may automatically identify relatively dark and/or relatively bright area(s) in an ambient environment. Based on the identified dark and/or bright areas, the AR system may render virtual content (e.g., virtual text, digits or other symbols) at relatively dark places in the AR user's field of vision in order to address occlusion issues. In this way, the AR system renders virtual content in a manner such that it is best visible to the AR user in view of the ambient environment.

Optimizing Content for Environment

In one or more embodiments, the AR system may additionally or alternatively optimize rendered virtual content based at least in part on one or more characteristics of the particular ambient environment. The AR system may render virtual content to accommodate for aspects of the ambient environment, in some embodiments. For instance, if a wall is relatively light, the AR system may render text that will appear superimposed on the door as dark text. Or, in another instance, virtual content may be dynamically altered (e.g., darkened, lightened, etc.) based on the detected light of the ambient environment.

Typically, it may be difficult for the AR system to render black. However, the AR system may be able to render white or other colors. If a scene includes a white physical wall, then the AR system will render text, digits, and/or other symbols that can be seen against the white background. For example, the AR system may render a color halo about the text, digits or other symbols, allowing the white wall to shine through. If a scene includes a black or dark colored wall, the AR system may render the text, digits, other symbols in a relatively light color. Thus, the AR system adjusts visual properties of what is being rendered based on characteristics of the ambient background.

Image Based Lighting Solutions

In order to create convincing realism in the virtual content (e.g., virtual objects, virtual tools, and other virtual constructs, for instance applications, features, characters, text, digits and other symbols) in augmented reality, it is advantageous to emulate the lighting system incident to the environment in which it is super-imposed. The classic Lambertian lighting model does not illuminate an object in the way that people are used to seeing in the real, natural world. The lighting in a real world environment is a complex system that is constantly and continuously changing throughout the space, rich with both dramatic contrasts and subtle nuances of intensity and color. The eye is used to seeing this in the real world. The Lambertian lighting model does not capture these nuances, and the human visual perception system notices the missing lighting effects, thereby destroying the illusion of realism.

In one or more embodiments, a technique called Image Based Lighting (IBL) may be effective in creating realism in computer graphics (CG). IBL does not attempt to compute a complex lighting system the way the radiosity solution does, but rather captures real world lighting photographically with light probes. A technique termed the "silver sphere light probe" technique is effective in capturing the complex colors reflected toward the viewer; however 360 degree cameras are able to capture higher fidelity of data of the entire environment, creating much more convincing light maps.

In one or more embodiments, IBL techniques may be used to render virtual content that appears indistinguishable from real objects. Modeling packages such as Maya®, utilize libraries of IBL light maps, from which the user can choose to illuminate a particular virtual scene. The user chooses a light map from the library that seems consistent with the content of the scene. Thus, it is possible to create realism from IBL, without the light map being identical to the environment in which the light map is used, if the light map is simply similar to the environment. This suggests that it is the subtle nuances in the lighting that the human visual perception system expects to see on the object. If those nuances are inconsistent with the environment, they may interfere with creating an illusion of reality.

One solution to employ IBL in an AR system is to supply a vast library of sample light maps created by photography, covering many different environments to encompass a wide variety of potential situations. Each of the light maps may be associated with various light parameters specific to the identified situation. The light maps could be stored in the cloud and referenced as needed to illuminate various items or instances of virtual content. In such an implementation, it would be advantageous to automate the selection of light map for a particular real world environment.

The user's individual AR system is already equipped with one or more cameras (e.g., outward facing cameras), and photographically samples the environment in which the user is located. The AR system may use the captured image data as map selection criteria. Samples from the cameras can be used to heuristically search a library of light maps, and find the closest approximation light map. The AR system may use a variety of parameters, for example frequency data, color palette, dynamic range, etc., The AR system may compare the parameters of the captured visual data against the library light maps and find the light map with the least error.

Figure 20:
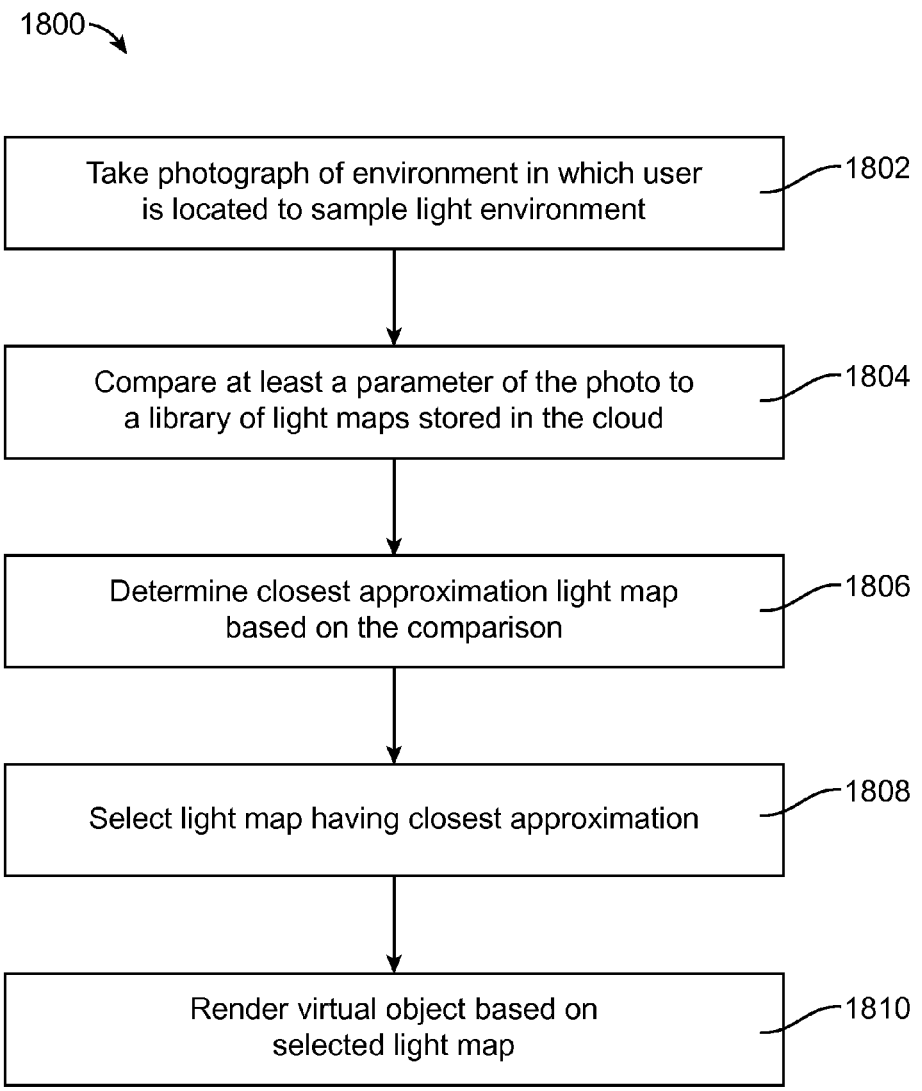
FIG. 20 illustrates a high level flow diagram for a process of rendering a virtual object based on a light map, according to one embodiment.

Referring now to FIG. 20, an example method 1800 of selecting an appropriate light map is provided. At 1802, the user's individual AR system captures an image of the ambient surrounding through the user's FOV cameras. Next, the system selects at least one parameter of the captured image data to compare against the library of light maps. For example, the system may compare a color palette of the captured image against the library of light maps. At 1804, the system compares the parameter of the captured image against the parameters of the light maps, determines a closest approximation of the parameter (1806) and selects a light map having the closest approximation (1808). The system selects the closest approximation, and renders the virtual object based on the selected light map, at 1810.

Alternatively, or additionally, a selection technique utilizing artificial neural networks may be used. The AR system may use a neural network trained on the set or library of light maps. The neural network uses the selection criteria data as input, and produces a light map selection as output. After the neural network is trained on the library, the AR system presents the real world data from the user's camera to the neural network, and the neural network selects the light map with the least error from the library, either instantly or in real-time.

This approach may also allow for modification of a light map. Regardless of whether the selection is done heuristically or with a neural network, the selected light map will have error compared to the input samples in the criteria data. If the selected light map is, for example, close in frequency data and dynamic range, but the color palette contains excessive error, the AR system may modify the color palette to better align with the color palette of the real world sampled data, and may construct a modified light map from the new constituency data.

The AR system may also combine data from multiple light maps that were identified as near solutions to produce a newly constructed light map. In one or more embodiments, the AR system can then store the newly constructed map as a new entry in the library for future selection. If neural net selection is used, this would require re-training the neural network in the cloud on the augmented set or library. However, the re-training may be brief because the new additions may only require minor adjustments to one or more network weights utilized by the neural network.

Figure 21:
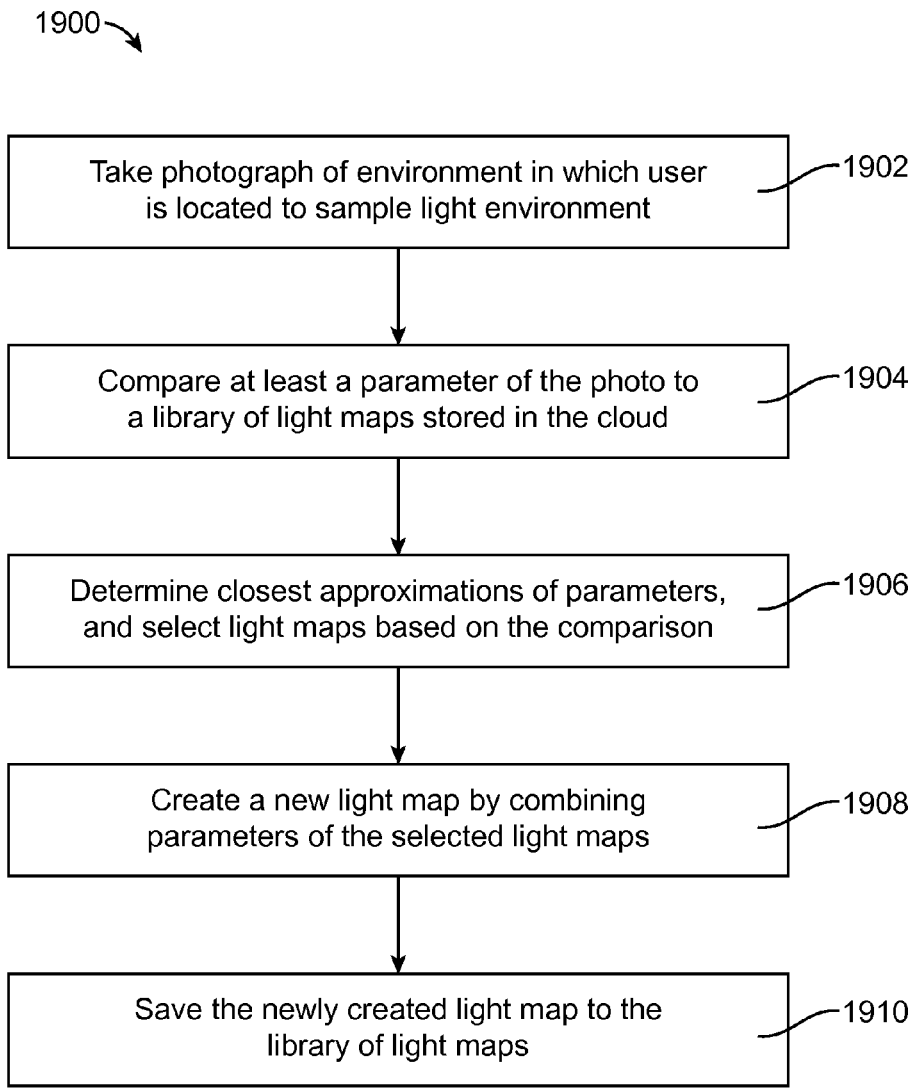
FIG. 21 illustrates a high level flow diagram for a process of creating a light map, according to one embodiment.

FIG. 21 illustrates an example method 1900 for creating a light map. First, at 1902, the user's individual AR system captures an image of the ambient surroundings through the user's FOV cameras. Next, the system selects at least one parameter of the captured image data to compare against the library of light maps. For example, the system may compare a color palette of the captured image against the library of light maps. Next, at 1904 the system compares the parameter of the captured image against the parameters of the light maps, determines one or more closest approximation of the parameters (1906), and selects light maps corresponding to the closest approximations.

For example, the light map may be selected based on a light intensity detected from the captured image. Or, the light map may compare a brightness, or gradient of brightness, or pattern of brightness in the image, and use that information to select the closest approximation. At 1908, the system constructs a new light map by combining parameters of the selected light maps. Next, at 1910, the new light map is added to the library of light maps.

Interactive Solution to Lighting

Another approach to supplying appropriate light maps for IBL applications is to use the user's AR device (e.g., head worn component) itself as a light probe to create the IBL light map from scratch. As previously noted, the device is equipped with one or more cameras. The camera(s) can be arranged and/or oriented to capture images of the entire 360 degree environment, which can be used to create a usable light map in situ. Either with 360 degree cameras or with an array of narrow angle cameras stitched together, the AR system may be used as a light probe, operating in real time to capture a light map of the actual environment, not just an approximation of the environment.

Although the captured light map is centric to the user's position, it may be sufficient to create a "convincing enough" object light map. In such a situation, the error is inversely proportional to the level of scrutiny it is subjected to. That is, a far-away object will exhibit a high amount of error using a user-centric light map, but the user's visual perception system will be in a poor position to detect that error due to the distance from the eye being relatively large. Whereas, the closer the user is to the object, the more keen the user's visual perception system is to detect error, but at the same time, the more accurate the light map will be, as the user's head approaches a position of the object. While this may be sufficient in many situations, a technique to address that error is discussed below.

Transformations of Light Maps

Figure 22:
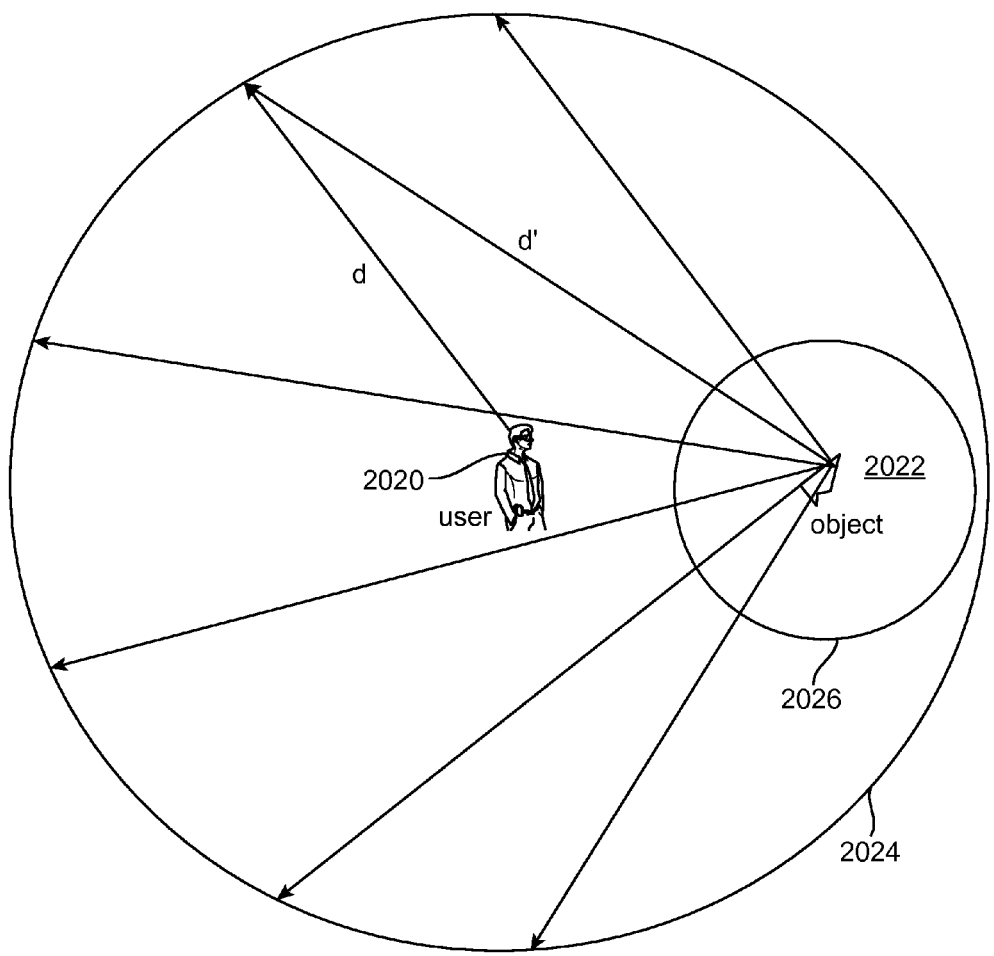
FIG. 22 depicts a user-centric light map, according to one embodiment

In one or more embodiments, the AR system (e.g., cloud based computers, individual computational components) may apply transformations to the user-centric light maps that project the user-centric light map as a suitable object centric light map, reducing or eliminating the error of the translational offset. As schematically illustrated in FIG. 22, one technique models the user-centric light map as a classic sphere 2024 centered on the user 2020, of an appropriate radius, perhaps similar to a size of the room. Another sphere 2026 is modeled around the object 2022 to be lit, of a radius that fits inside the user-centric sphere 2024. The data from the user-centric sphere 2024 is then projected onto the object-centric sphere 2026 from the point of view of the object 2022, creating a new light map. Ray casting will work for this projection. Alternatively, a numerical method may be employed. This transformation warps the user-centric light map to be more accurate from the point of view of the object.

Color intensities are then modified to adjust for distance attenuation according to the offset position of the object. Let $att(x)$ be a light attenuation function, where x is the distance from the light to the viewer. The intensity of a given Texel of the user-centric light map is expressed as $lm=ls*att(d)$, where lm is the intensity in the map and ls is the intensity at the light's source. Thus $ls=lm/att(d)$. So the new intensity in the new object-centric transformation is $lm'=ls*att(d')$.

It should be appreciated that the sky sphere method of transformation may work well for situations where the sources of light captured are significantly far from the user and object positions.

More specifically, if the sources of light are at least as far away as the sphere boundary which was modeled to represent the sources of light, the technique will likely work. However, as light data sources encroach upon the inner sphere space, error may quickly grow. The worst case scenario is when light data is sourced directly between the user and the object. This would result in the light data mapping to the rear of the object, rather than the front where it is needed.

If the light camera system on the user's device is equipped with stereoscopic or depth sensing utility, the AR system can store a depth value associated with each Texel of the light map. The only area this depth data is particularly useful is on the data that resides between the user and the object. Thus, a stereoscopic camera system may suffice so long as it captures depth in the user's field of view, which is the area in question. The areas of the light map residing behind the user, or for that matter behind the object, is less dependent on depth data because those areas project similarly to both user and object alike. Simply attenuating the values for different distances may be sufficient for that area of the light map.

Figure 23:
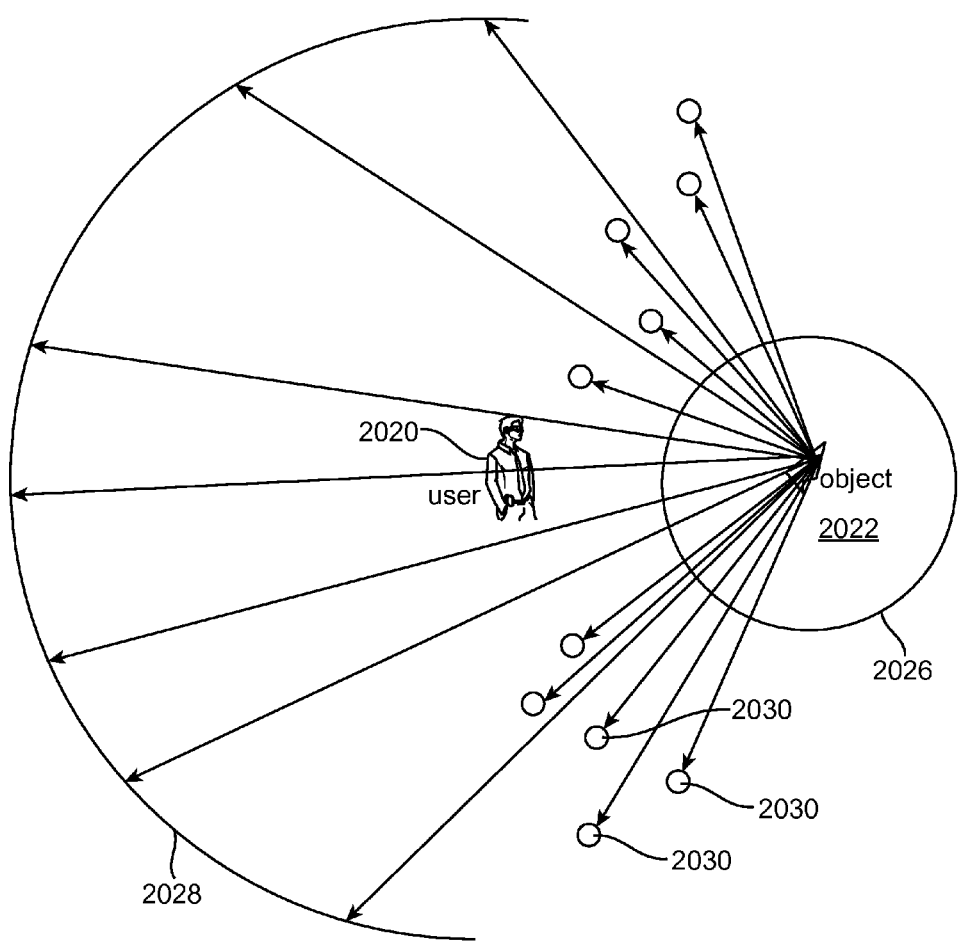
FIG. 23 depicts an object-centric light map, according to one embodiment.

Once depth data is captured for the area of the map where it is needed (e.g., in front of the user), the AR system can compute the exact Euclidean coordinates of the source of that light data on a Texel by Texel basis. As schematically illustrated in FIG. 23, an object-centric light map may be constructed by projecting those coordinates onto the object sphere, and attenuating the intensities accordingly. As shown in FIG. 23, the user is located at the center of the user semi-sphere 2028, and an object sphere 2026 is modeled around the object 2022, similar to that of FIG. 22. Once the depth data is captured for the area of the map, the AR system computes the exact coordinates of the source of the light data for each space point 2030 based on the depth data.

Although there is no guarantee that the color data projecting toward the object is the same as the color projecting toward the user from these inner space points, the color data will likely be close enough for the general case.

Iterative Learning

The above discussion focused on constructing an object-centric light map based on user-centric data from one sampled user position. However, in many or most cases, the user will be navigating throughout an environment, enabling the collection of many samples of the light environment from many different perspectives. Furthermore, having multiple users in the environment increases the sample sets that can be collected interactively in real time. As the user traverses or users traverse the physical space, the AR system captures new light maps at smart intervals and key positions. These light maps may be stored in the cloud as a grid. As new virtual content enters a scene, the AR system access the stored grid and finds a corresponding light map that represents a position closest to the location of the virtual content. The AR system computes the transformation of the light map from the grid position to the virtual object's own position.

Figure 24:
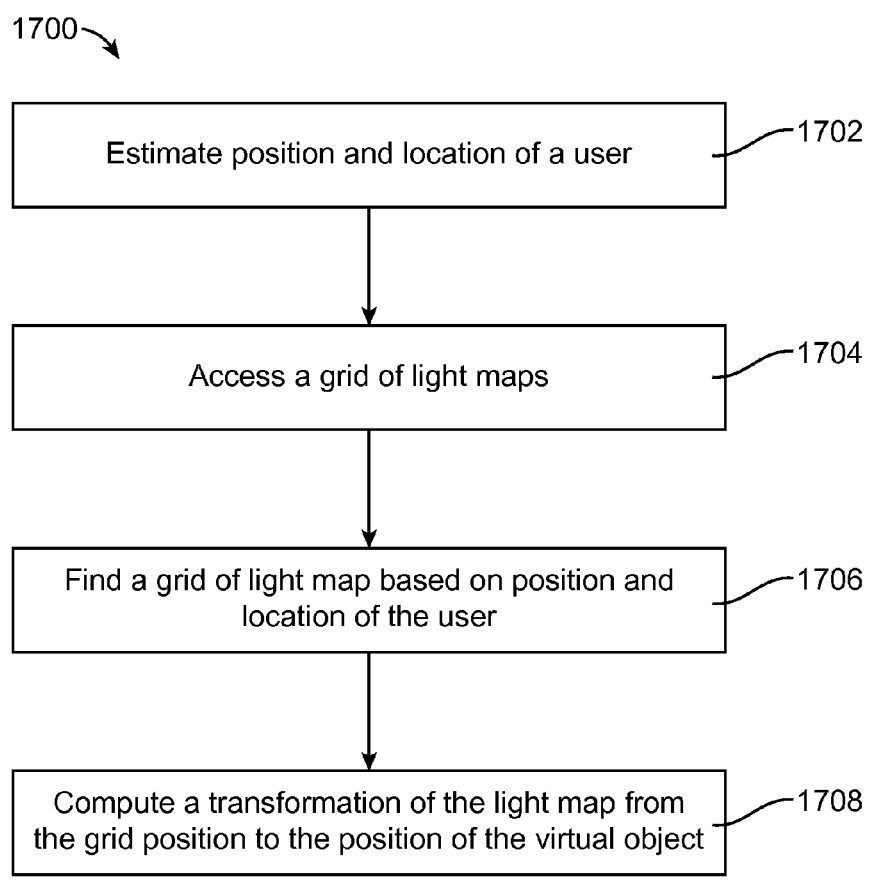
FIG. 24 illustrates a high level flow diagram for a process of transforming a light map, according to one embodiment.

FIG. 24 describes an example method 1700 for using a transformation light map in order to project virtual content. At 1702, the user's individual AR system estimates a location and position of a user relative to the world. Next, at 1704, the AR system accesses a grid of light maps stored in the cloud, and selects a light map in a grid that is closest to the location and position of the user (1706). At 1708, the AR system computes a transformation of the light map from the grid position to the virtual object's position such that the lighting of the virtual object matches the lighting of the ambient surroundings.

In one or more embodiments, case based reasoning is employed in that a solution of the 'nearest case' is adopted, modified, and employed. The transformed case may be stored back in the grid as a meta-case to be used for that location until better sampled data becomes available to replace the meta-case data. As the grid becomes populated with more and more cases, the opportunity will become available to upgrade the light maps for the existing virtual content to more appropriate cases. This way, the interactivity of the users allows the AR system to learn the lighting of the environment, and iteratively converge the virtual content to a realistic solution.

The stored grid may remain in the cloud for future use in the same environment. Certainly, drastic changes to the environment may challenge the effectiveness of the grid, and the grid may need to be rebuilt from start. However certain types of changes can still utilize previously collected data. For instance, global changes, such as dimming the lights, can still use the collected data, with a scaling down of the luminance across the dataset while keeping the higher frequency data.

Updating the Light Maps

A number of techniques are discussed below to apply effective image based lighting to virtual content in the AR system. In one or more embodiments, the AR system learns the lighting of a physical environment through interaction of the users and their device cameras. The data may be stored in the cloud and continuously improved with further interaction. The objects select light maps using case-based reasoning techniques, applying transformations to adjust the light maps, and discreetly update the light maps at opportune times or conditions, converging toward a realistic solution.

Through interaction and sampling, the AR system improves its understanding of the light environment of a physical space. In one or more embodiments, the AR system will update that the light maps being used in rendering of various virtual content to more realistic ones based on the acquired knowledge of the light environment.

A potential problem may occur if, for example a user witnesses an update (e.g., change in rendering of a virtual content). For example, if the user sees changes occurring on the surface of a virtual object, the surface will appear to animate, destroying the desired illusion of realism. To solve this potential problem, the AR system executes updates discreetly, during special circumstances that minimize the risk of the user noticing an update or change to a piece of or instance of virtual content.

For example, consider an initial application when a virtual object enters a scene. An update or change may be performed as a virtual object leaves the field of view of user, briefly or even just far into the periphery of the user's field of view. This minimizes the likelihood that the user will perceive the update or change of the virtual object.

The AR system may also update partial maps, corresponding to back-facing parts of the virtual object, which the user cannot see. If the user walks around the virtual object, the user will discover an increased realism on the far side without ever seeing the update or change. The AR system may update or change the fore-side of the virtual object, which is now out of the user's field of view while the user is viewing the rear or far side of the virtual object. The AR system may perform updates or changes on various selected portions (e.g., top, bottom, left, right, front, rear) of the map of the virtual object while those portions are not in the field of view of the user.

In one or more embodiments, the AR system may wait to perform updates or changes until an occurrence of one or more conditions that typically may lead a user to expect a change on the surface/lights of the virtual object. For example, the AR system may perform a change or update when a shadow passes over the virtual object. Since the positions of both virtual and real objects are known, standard shadowing techniques can be applied. The shadow would obscure the update or change from the viewer. Also for example, the AR system may update or change the map of the virtual object in response to light in the environment dimming, to reduce the perception of the update or change by the user.

In yet another example, the AR system may update or change a map of a virtual object in response to occurrence of an event that is known or to have a high probability of drawing the attention of a user. For instance, in response to a virtual monster crashing down through a ceiling, like in a video game, the AR system may update or change the map for other virtual objects since it is highly likely that the user is focusing on the virtual monster and not the other virtual objects.

User Interface System

The AR system may use one or more of a large variety of user interface (UI) components. The user interface components may include components that perform: eye tracking, hand tracking, totem tracking, natural feature pose determination, head pose determination, as well as predictive head pose determination. The user interface system may employ an asynchronous world model. The user interface components may employ view-centered (e.g., head) rendering, body centered rendering, and/or world centered rendering, as discussed herein. Further, the user interface components may employ various types of environmental data, for example GPS location data, Wi-Fi signal strength date, cellphone differential signal strength, known features, image histogram profiles, hashes of room features, etc., proximity to walls/ceiling/floors/3D-blobs/etc., location in the world (e.g., home, office, car, street), approximate social data (e.g., "friends"), and/or voice recognition.

As described above, asynchronous portion model refers to building a local copy in the individual AR system(s) and synchronizing any changes against the cloud. For example, if a chair is moved in a space, a chair object recognizer may recognize that the chair has moved. However, there may be a delay in getting that information to the cloud, and then getting it downloaded to the local system such that a remote presence avatar may sit in the chair.

It should be appreciated that environmental data can contribute to how the user interface can be used. Since the AR system is situationally aware, it implicitly has semantic understanding of where the user or physical objects are located. For example, GPS location data, Wi-Fi signal strength or network identity, differential signal strength, know features, histogram prof, etc., can be used to make statistical inferences for a topological map. The concept of user interface in the augmented reality implementation can be extended. For example, if a user is close to a wall and knocks on a wall, the knocking can be interpreted by the user interface as a user experience (UX) interaction modality. As another example, if a user selects a particular Wi-Fi signal on a device, the selection could be interpreted by the user interface as an interaction modality. The world around the user becomes part of the UI for the user.

User Inputs

Figure 25:
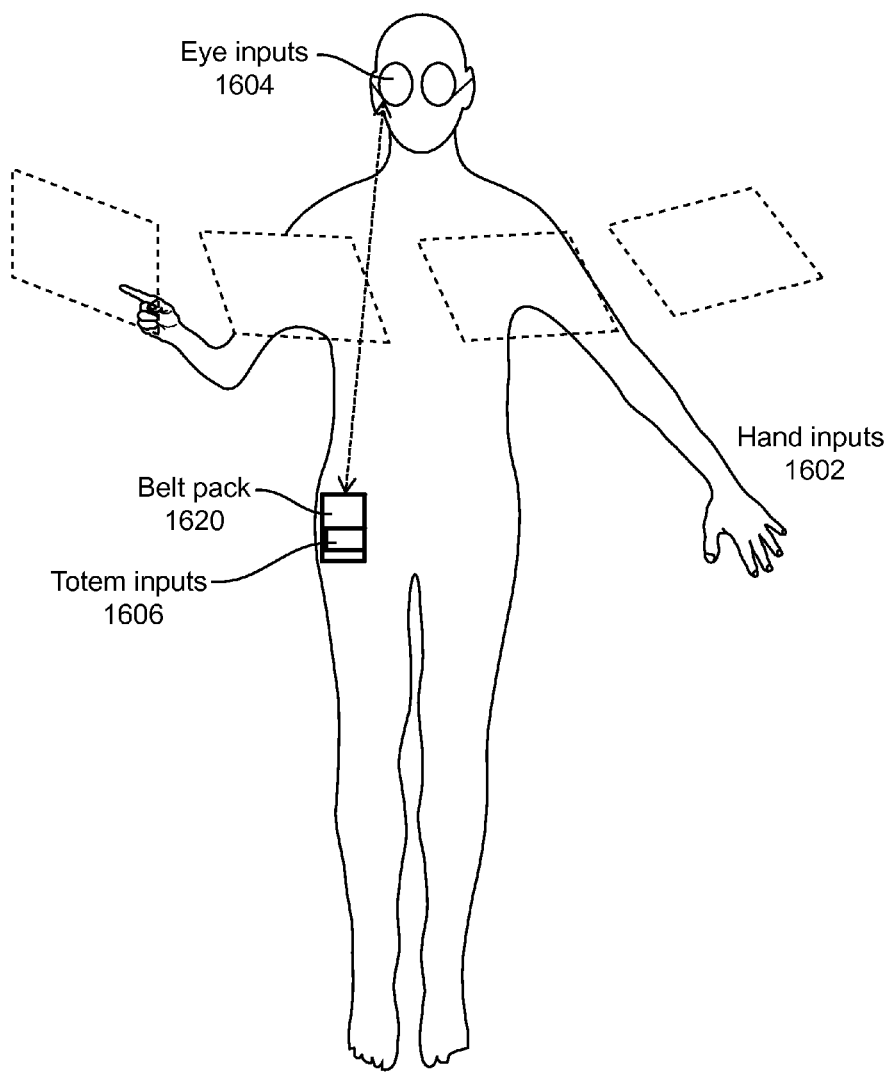
FIG. 25 illustrates a variety of user inputs to communicate with the augmented reality system, according to one embodiment.

As illustrated in FIG. 25, the user interface may be responsive to one or more of a variety of inputs. The user interface of the AR system may, for example, be responsive to hand inputs 1602, for instance: gestures, touch, multi-touch, and/or multiple hand input. The user interface of the AR system may, for example, be responsive to eye inputs 1604, for instance: eye vector, eye condition (e.g., Open/Close). The user interface of the AR system may, for example, be responsive to totem inputs 1606. Totems may take any of a large variety of forms, for example a belt pack. Totem input may be static, for example tracking a closed book/tablet, etc. Totem input may be dynamic, for example dynamically changing like flipping pages in a book etc. Totem input may be related to communications with the totem, for instance a ray gun totem. Totem input may be related to intrinsic communications, for instance communications via USB, datacomms, etc. Totem input may be generated via an analog joystick, click wheel, etc.

The user interface of the AR system may, for example, be responsive to head pose, for instance head position and/or orientation.

The user interface of the AR system may, for example, be responsive to voice, for instance spoken commands and parameters.

The user interface of the AR system may, for example, be responsive to environmental sounds. The AR system may, for instance, include one or more ambient microphone to pick up sounds, for example chest taps, etc.

The user interface of the AR system may, for example, be responsive to environmental situations. For instance, the user interface may be responsive to movement occurring against or proximate a wall, or a movement above a defined threshold (e.g., movement at a relatively high speed).

It may be useful to have a consistent user interface metaphor to suggest to developers and build into AR system's operating system (OS), and which may allow for reskinning for various applications and/or games. One approach may employ user actuatable levers or buttons icons, although that approach lacks tactile feedback. Levers may have a respective fulcrum point, although such an approach may be difficult for users. Another approach is based on a "force field" metaphor that intentionally keeps things away, sparks on boundaries, etc. A further approach uses a loose or sloppy control mechanism, like pull chains.

In one or more embodiments, a virtual image may be presented to the user in the form of a virtual user interface. The virtual user interface may be a floating virtual screen, as shown in FIG. 25. Since the system knows where (e.g., the depth, distance, perceived location, etc.) of the virtual user interface, the system may easily calculate the coordinates of the virtual interface, and allow the user to interact with the virtual screen, and receive inputs from the virtual user interface based on the coordinates at which the interaction happens, and a known coordinates of the user's hands, eyes, etc. Thus, in other words, the system maps coordinates of various "keys", or features of the virtual user interface, and also maps coordinates/knows a location of the user's hands, eyes (or any other type of input) and correlates them, to receive user input.

For example, if a virtual user interface is presented to the user in a head-centric reference frame, the system always knows a distance/location of various "keys" or features of the virtual user interface in relation to a world-centric reference frame. The system then performs some mathematical translations/transforms to find a relationship between both reference frames. Next, the user may "select" a button of the user interface by squeezing the virtual icon.

Since the system knows the location of the touch (e.g., based on haptic sensors, image-based sensors, depth sensors etc.), the system determines what button was selected based on the location of the hand squeeze and the known location of the button the user interface.

Thus, constantly knowing the location of virtual objects in relation to real objects, and in relation to various reference frames (e.g., world-centric, head centric, hand-centric, hip-centric etc.) allows the system to understand various user inputs. Based on the input, the system may use a mapping table to correlate the input to a particular action or command, and execute the action.

In other words, the user's interaction with the virtual user interface is always being tracked (e.g., eye interaction, gesture interaction, hand interaction, head interaction, etc.). These interactions (or characteristics of these interactions), including, but not limited to location of the interaction, force of interaction, direction of the interaction, frequency of interaction, number of interactions, nature of interactions, etc. are used to allow the user to provide user input to the user in response to the displayed virtual user interface.

Eye Tracking

In one or more embodiments, the AR system can track eye pose (e.g., orientation, direction) and/or eye movement of one or more users in a physical space or environment (e.g., a physical room). The AR system may employ information (e.g., captured images or image data) collected by one or more sensors or transducers (e.g., cameras) positioned and oriented to detect pose and or movement of a user's eyes. For example, head worn components of individual AR systems may include one or more inward facing cameras and/or light sources to track a user's eyes.

As noted above, the AR system can track eye pose (e.g., orientation, direction) and eye movement of a user, and construct a "heat map". A heat map may be a map of the world that tracks and records a time, frequency and number of eye pose instances directed at one or more virtual or real objects. For example, a heat map may provide information regarding what virtual and/or real objects produced the most number/time/frequency of eye gazes or stares. This may further allow the system to understand a user's interest in a particular virtual or real object.

Advantageously, in one or more embodiment, the heat map may be used in advertising or marketing purpose and to determine an effectiveness of an advertising campaign, in some embodiments. The AR system may generate or determine a heat map representing the areas in the space to which the user(s) are paying attention. In one or more embodiments, the AR system can render virtual content (e.g., virtual objects, virtual tools, and other virtual constructs, for instance applications, features, characters, text, digits, and other symbols), for example, with position and/or optical characteristics (e.g., color, luminosity, brightness) optimized based on eye tracking and/or the heat map.

Pseudo-Random Pattern

In one or more embodiments, the AR system may employ pseudo-random noise in tracking eye pose or eye movement. For example, the head worn component of an individual AR system may include one or more light sources (e.g., LEDs) positioned and oriented to illuminate a user's eyes when the head worn component is worn by the user. The camera(s) detects light from the light sources which is returned from the eye(s). For example, the AR system may use Purkinje images, e.g., reflections of objects from the structure of the eye.

The AR system may vary a parameter of the light emitted by the light source to impose a recognizable pattern on emitted, and hence detected, light which is reflected from eye. For example, the AR system may pseudo-randomly vary an operating parameter of the light source to pseudo-randomly vary a parameter of the emitted light. For instance, the AR system may vary a length of emission (ON/OFF) of the light source(s). This facilitates automated detection of the emitted and reflected light from light emitted and reflected from ambient light sources.

Figure 26:
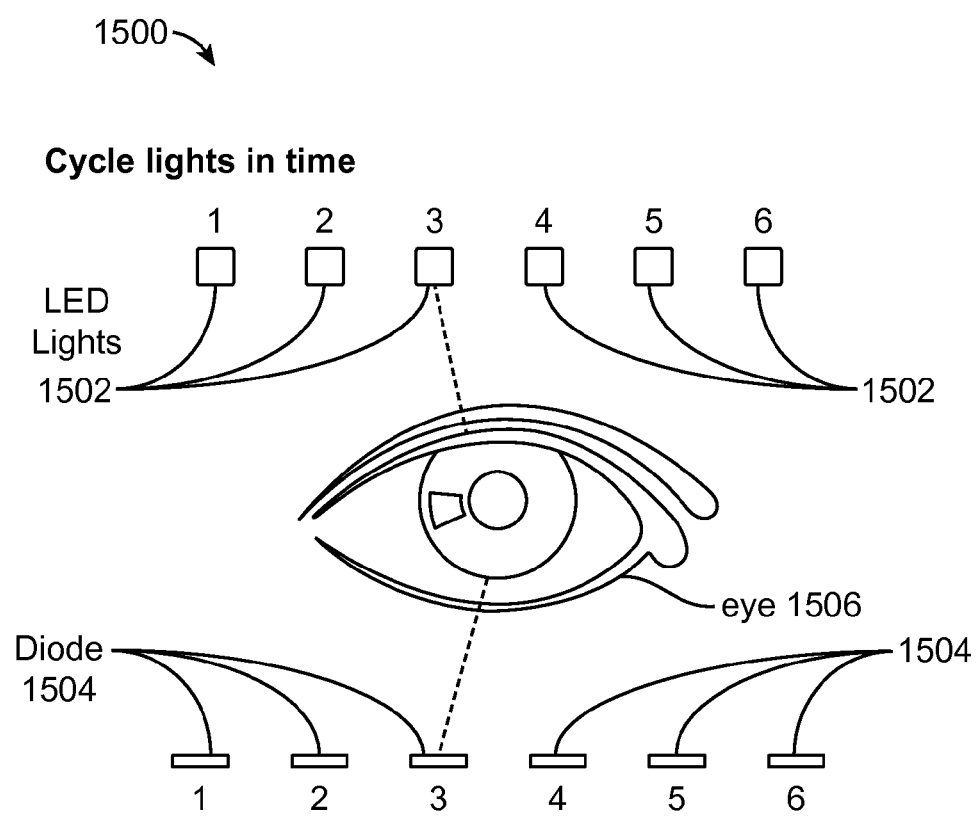
FIG. 26 illustrates LED lights and diodes tracking a movement of the user's eyes, according to one embodiment.
Figure 27:
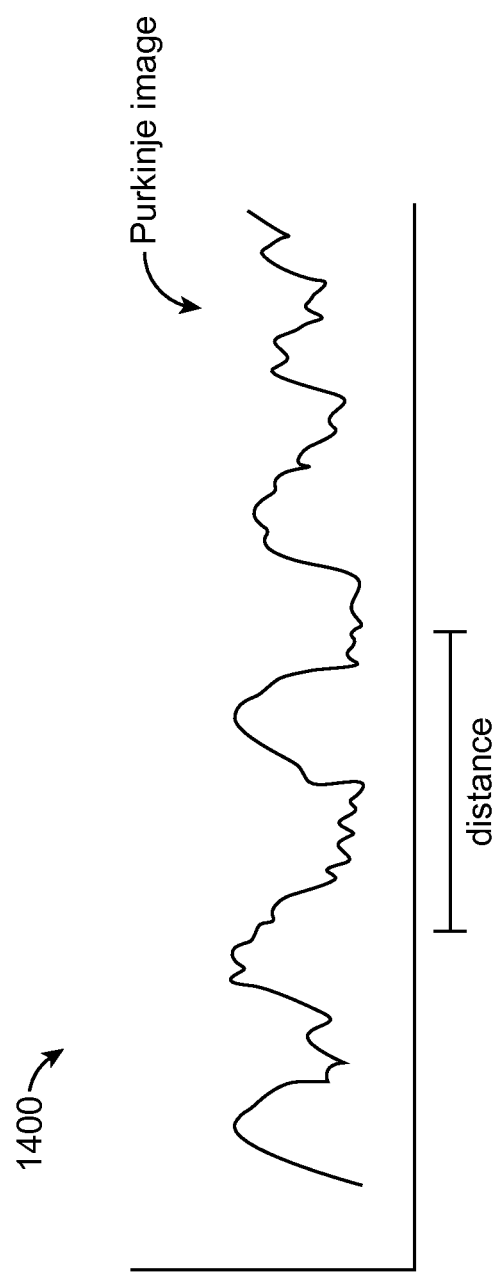
FIG. 27 illustrates a Purkinje image, according to one embodiment.

As illustrated in FIG. 26 and FIG. 27, in one implementation, light sources (e.g., LEDs) 1502 are positioned on a frame to be on one side (e.g., top) of the eye and sensors (e.g., photodiodes) are positioned on the bottom part of the frame. The eye may be seen as a reflector. Notably, one eye needs to be instrumented and tracked since pairs of eyes tend to move in tandem. The light sources 1502 (e.g., LEDs) are normally turned ON and OFF one at a time (e.g., time slice) to produce a patterned code (e.g., amplitude variation or modulation). The AR system performs autocorrelation of signals produced by the sensor(s) (e.g., photodiode(s)) to determine a time of flight signal. In one or more embodiments, the AR system employs a known geometry of the light sources (e.g., LEDs), the sensor(s) (e.g., photodiodes), and distance to the eye.

The sum of vectors with the known geometry of the eye allow for eye tracking. When estimating the position of the eye, since the eye has a sclera and a cornea, the geometry can be represented as two circles layered on top of each other. The eye pointing vector can be determined or calculated with no cameras. Also the eye center of rotation may be estimated since the cross section of the eye is circular and the cornea swings through a particular angle. This actually results in a vector distance because of autocorrelation of the received signal against known transmitted signal, not just ray traces. The output may be seen as a Purkinje image 1400, as shown in FIG. 27, which may in turn be used to track movement of the eyes.

In some implementations, the light sources may emit in the infrared (IR) range of the electromagnetic spectrum, and the photosensors may be selectively responsive to electromagnetic energy in the IR range.

In one or more embodiments, light rays are emitted toward the user's eyes as shown in the illustrated embodiment. The AR system is configured to detect one or more characteristics associated with an interaction of the light with the user's eyes (e.g., Purkinje image, an extent of backscattered light detected by the photodiodes, a direction of the backscattered light, etc.). This may be captured by the photodiodes, as shown in the illustrated embodiments. One or more parameters of the interaction may be measured at the photodiodes. These parameters may in turn be used to extrapolate characteristics of eye movements or eye pose.

Hand Tracking

In one or more embodiments, the AR system may perform hand tracking via one or more user input detection devices and/or techniques.

For example, the AR system may employ one or more image sensors (e.g., cameras) that are head worn and which face forward from the user's body reference frame. Additionally, or alternatively, the AR system may use one or more sensors (e.g., cameras) which are not head worn or not worn on any portion of the user's body. For instance, the AR system may use one or more sensors (e.g., cameras, inertial sensors, gyros, accelerometers, temperature sensor or thermocouples, perspiration sensors) mounted in the physical environment (e.g., room-based sensor systems discussed above).

As another example, the AR system may rely on stereo-pairs of cameras or photo sensors. Alternatively, the AR system may include one or more sources of structured light to illuminate the hands. The structured light may, or may not, be visible to the user. For example, the light sources may selectively emit in the infrared or near-infrared range of the electromagnetic spectrum.

As yet a further example, the AR system may perform hand tracking via an instrumented glove, for instance similar to the haptic glove discussed herein. The AR system may optically track the haptic glove. Additionally or alternatively, the AR system may use telemetry from one or more glove carried sensors, for example one or more internal sensors or accelerometers (e.g., MEMS accelerometers).

Finger Gestures

In some implementations, fingers gestures may be used as input for the AR system. Finger gestures can take a variety of forms and may, for example, be based on inter-finger interaction, pointing, tapping, rubbing, etc.

Other gestures may, for example, include 2D or 3D representations of characters (e.g., letters, digits, punctuation). To enter such a gesture, a user may simply swipe finger(s) in a predefined character pattern.

In one implementation of a user interface, the AR system may render three circles, each circle with specifically chosen characters (e.g., letters, digits, punctuation) arranged circumferentially around the periphery. The user can swipe through the circles and letters to designate a character selection or input. In another implementation, the AR system renders a keyboard (e.g., QWERTY keyboard) low in the user's field of view, proximate a position of the user's dominate hand in a bent-arm position. The user can than perform a swipe-like motion through desired keys, and then indicate that the swipe gesture selection is complete by performing another gesture (e.g., thumb-to-ring finger gesture) or other proprioceptive interaction.

Other gestures may include thumb/wheel selection type gestures, which may, for example be used with a "popup" circular radial menu (e.g., as shown in FIG. 39F) which may be rendered in a field of view of a user, according to one illustrated embodiment.

Figure 28:
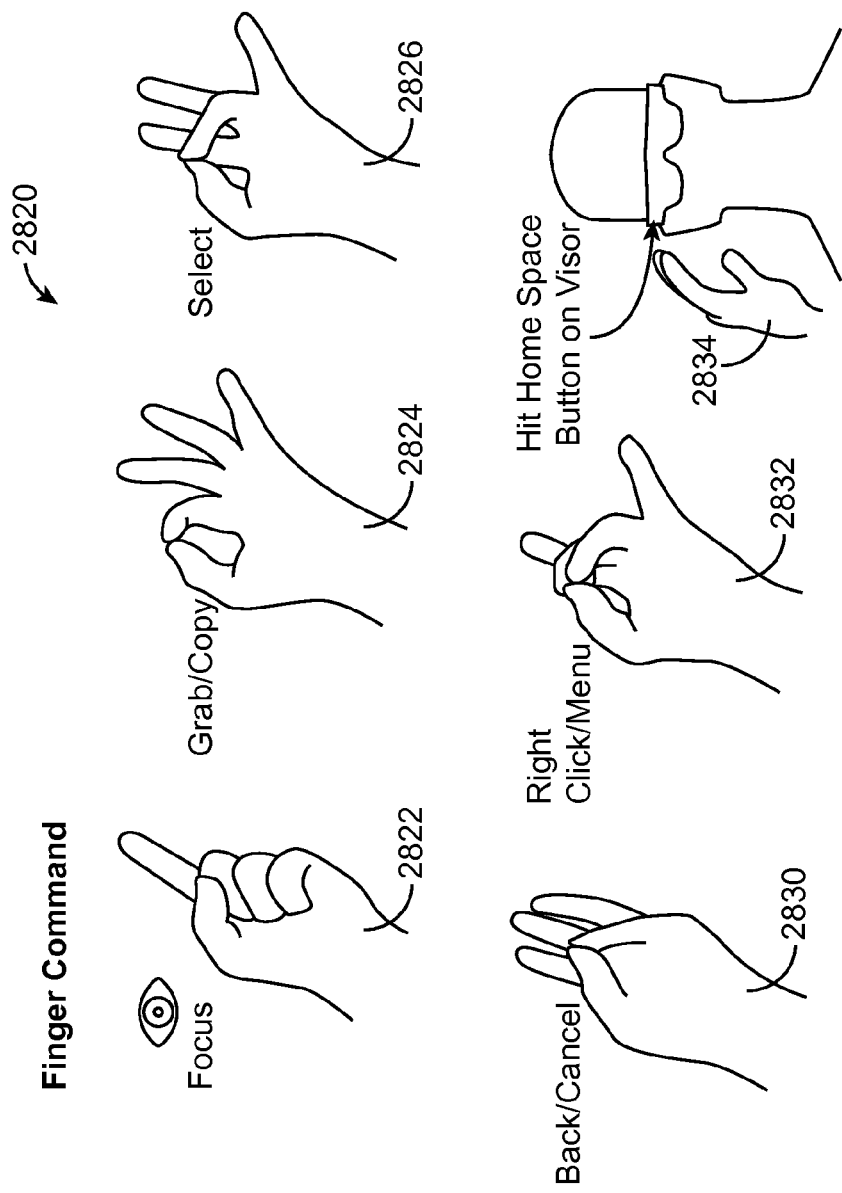
FIG. 28 illustrates a variety of hand gestures that may be used to communicate with the augmented reality system, according to one embodiment.

Referring now to FIG. 28, some additional gestures 2820 are also illustrated. It should be appreciated that the finger gestures shown in FIG. 28 are for examples only, and other gestures may be similarly used. In the top row left-most position, a pointed index finger may indicate a command to focus, for example to focus on a particular portion of a scene or virtual content at which the index finger is pointed. For example, gesture 2822 shows a gesture for a "focus" command consisting of a pointed index finger. The AR system may recognize the gesture (e.g., through the captured image/video of the finger, through sensors if a haptic glove is used, etc.) and perform the desired action.

In the top row middle position, a first pinch gesture with the tip of the index finger touching a tip of the thumb to form a closed circle may indicate a grab and/or copy command. As shown in FIG. 28, the user may press the index and thumb finger together to "pinch" or grab one part of the user interface to another (e.g., gesture 2824). For example, the user may use this gesture to copy or move an icon (e.g., an application) from one part of the virtual user interface to another.

In the top row right-most position, a second pinch gesture with the tip of the ring finger touching a tip of the thumb to form a closed circle may indicate a select command. Similarly, a "select" gesture may comprise pressing of the user's thumb with the ring finger, in one or more embodiments, as shown in FIG. 2826. For example, the user may use this gesture to select a particular document, or perform some type of AR command.

In the bottom row left-most position, a third pinch gesture with the tip of the pinkie finger touching a tip of the thumb to form a closed circle may indicate a back and/or cancel command. Gesture 2830 shows an example "back/cancel" gesture that involves pressing together of the pinky finger and the thumb.

In the bottom row middle position, a gesture in which the ring and middle fingers are curled with the tip of the ring finger touching a tip of the thumb may indicate a click and/or menu command. Gesture 2832 (e.g., pressing together of the thumb with the middle finger and the ring finger) may be used for a "right click" command or to signify to the system to go back to the "Main Menu."

In one or more embodiments, the user may simply hit a "Home Space" button on the AR system visor to go back to Home page (e.g., 2834). In the bottom row right-most position, touching the tip of the index finger to a location on the head worn component or frame may indicate a return to home command. This may cause the AR system to return to a home or default configuration, for example displaying a home or default menu.

As shown in FIG. 28, the AR system recognizes various commands, and in response to these commands, performs certain functions that are mapped to the commands. The mapping of gestures to commands may be universally defined, across many users, facilitating development of various applications which employ at least some commonality in user interfaces. Alternatively or additionally, users or developers may define a mapping between at least some of the gestures and corresponding commands to be executed by the AR system in response to detection of the commands.

Totems

As briefly described above, totems may be used to, for example, to provide a virtual user interface. The AR system may, for example, render a virtual user interface to appear on the totem.

The totem may take a large variety of forms. For example, the totem may be an inanimate object. For instance, the totem may take the form of a piece or sheet of metal (e.g., aluminum). A processor component of an individual AR system, for instance a belt pack, may serve as a totem.

The AR system may, for example, replicate a user interface of an actual physical device (e.g., keyboard and/or trackpad of a computer, a mobile phone) on what is essentially a "dumb" totem. As an example, the AR system may render the user interface of an Android® phone onto a surface of an aluminum sheet. The AR system may detect interaction with the rendered virtual user interface, for instance via a front facing camera, and implement functions based on the detected interactions.

For example, the AR system may implement one or more virtual actions, for instance render an updated display of Android® phone, render video, render display of a Web-page. Additionally or alternatively, the AR system may implement one or more actual or non-virtual actions, for instance send email, send text, and/or place a phone call. This may allow a user to select a desired user interface to interact with from a set of actual physical devices, for example various models of smartphones and/or tablets, or other smartphones, tablets, or even other types of appliances which have user interfaces such as televisions, DVD/Blu-ray players, thermostats, etc.

Thus a totem may be any object on which virtual content can be rendered, including for example a body part (e.g., hand) to which virtual content can be locked in a user experience (UX) context. In some implementations, the AR system can render virtual content so as to appear to be coming out from behind a totem, for instance appearing to emerge from behind a user's hand, and slowly wrapping at least partially around the user's hand. The AR system detects user interaction with the virtual content, for instance user finger manipulation with the virtual content which is wrapped partially around the user's hand.

Alternatively, the AR system may render virtual content so as to appear to emerge from a palm of the user's hand, and the system may detect a user's fingertip interaction and/or manipulation of that virtual content. Thus, the virtual content may be locked to a reference frame of a user's hand. The AR system may be responsive to various user interactions or gestures, including looking at some item of virtual content, moving hands, touching hands to themselves or to the environment, other gestures, opening and/or closing eyes, etc.

As described herein, the AR system may employ body centered rendering, user-centered rendering, hand-centered rendering, hip-centered rendering, world-centered rendering, propreaceptic tactile interactions, pointing, eye vectors, totems, object recognizers, body sensor rendering, head pose detection, voice input, environment or ambient sound input, and the environment situation input to interact with the user of the AR system.

Figure 29:
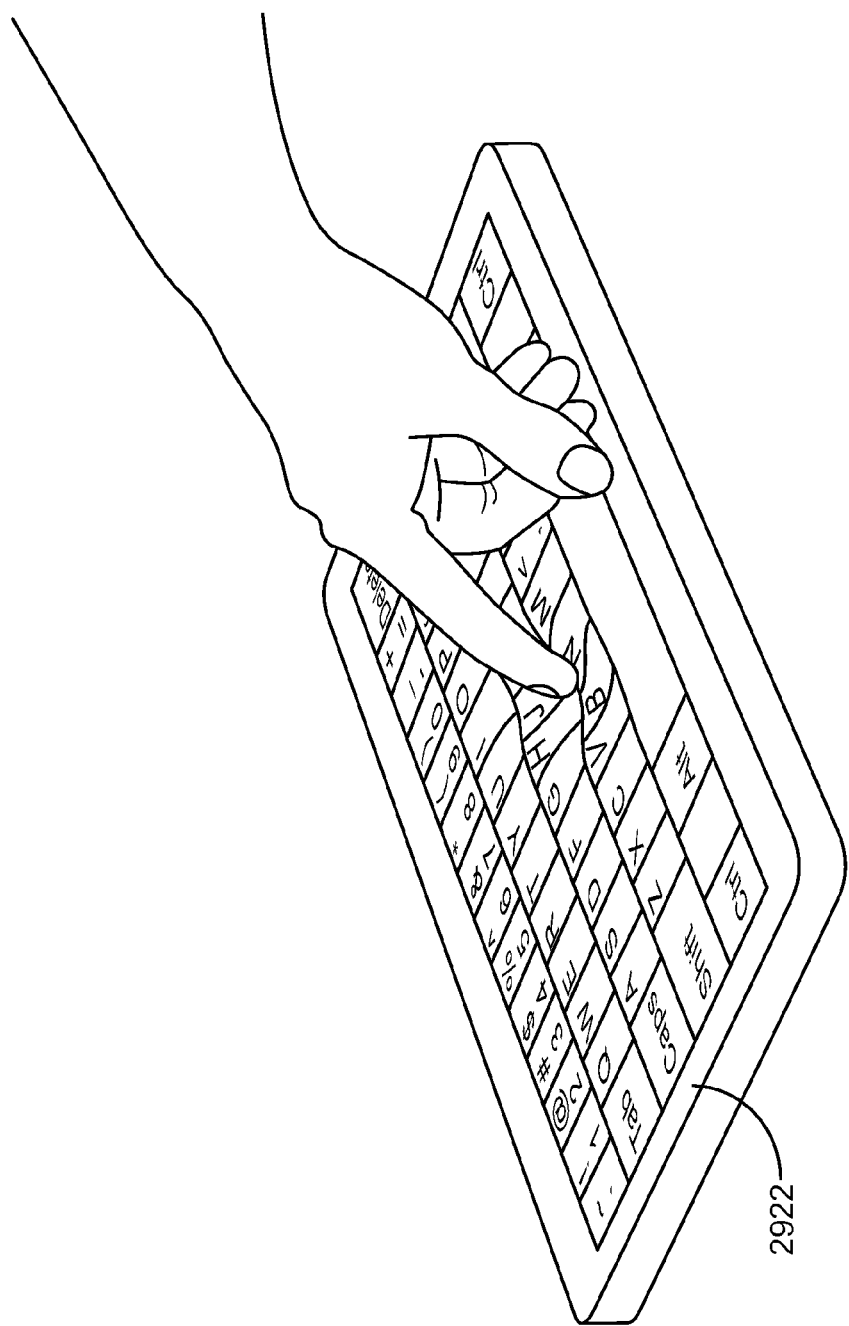
FIG. 29 illustrates an example totem, according to one embodiment.

FIG. 29 shows a totem according to one illustrated embodiment, which may be used as part of a virtual keyboard 2922 implementation. The totem may have a generally rectangular profile and a soft durometer surface. The soft surface provides some tactile perception to a user as the user interacts with the totem via touch.

As described above, the AR system may render the virtual keyboard image in a user's field of view, such that the virtual keys, switches or other user input components appear to reside on the surface of the totem. The AR system may, for example, render a 4D light field which is projected directly to a user's retina. The 4D light field allows the user to visually perceive the virtual keyboard with what appears to be real depth.

The AR system may also detect or capture the user's interaction with the surface of the totem. For example, the AR system may employ one or more front facing cameras to detect a position and/or movement of a user's fingers. In particularly, the AR system may identify from the captured images, any interactions of the user's fingers with various portions of the surface of the totem. The AR system maps the locations of those interactions with the positions of virtual keys, and hence with various inputs (e.g., characters, numbers, punctuation, controls, functions). In response to the inputs, the AR system may cause the inputs to be provided to a computer or some other device.

Additionally or alternatively, the AR system may render the virtual user interface differently in response to selected user interactions. For instance, some user interactions may correspond to selection of a particular submenu, application or function. The AR system may respond to such selection by rendering a new set of virtual interface elements, based at least in part on the selection. For instance, the AR system may render a submenu or a menu or other virtual interface element associated with the selected application or functions. Thus, rendering by AR system may be context sensitive.

Figure 30A:
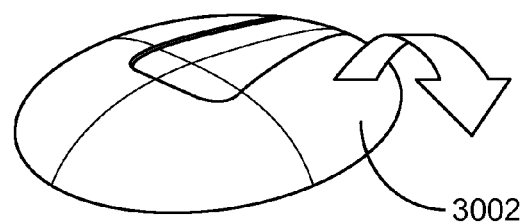
FIGS. 30A-30C illustrate other example totems, according to one or more embodiments.

FIG. 30A shows a top surface of a totem according to one illustrated embodiment, which may be used as part of a virtual mouse implementation 3002. The top surface of the totem may have generally ovoid profile, with hard surface portion, and one or more soft surface portions to replicate keys of a physical mouse. The soft surface portions do not actually need to implement switches, and the totem may have no physical keys, physical switches or physical electronics. The soft surface portion(s) provides some tactile perception to a user as the user interacts with the totem via touch.

The AR system may render the virtual mouse image 3002 in a user's field of view, such that the virtual input structures (e.g., keys, buttons, scroll wheels, joystick, thumbstick) appear to reside on the top surface of the totem. As discussed above, the AR system may, for example, render a 4D light field which is projected directly to a user's retina to provide the visual perception of the virtual mouse with what appears to be real depth.

The AR system may also detect or capture movement of the totem by the user, as well as, user interaction with the surface of the totem. For example, the AR system may employ one or more front facing cameras to detect a position and/or movement of the mouse and/or interaction of a user's fingers with the virtual input structures (e.g., keys). The AR system maps the position and/or movement of the mouse. The AR system maps user interactions with the positions of virtual input structures (e.g., keys), and hence with various inputs (e.g., controls, functions). In response to the position, movements and/or virtual input structure activations, the AR system may cause corresponding inputs to be provided to a computer or some other device.

Additionally or alternatively, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions, as discussed above.

Figure 30B:
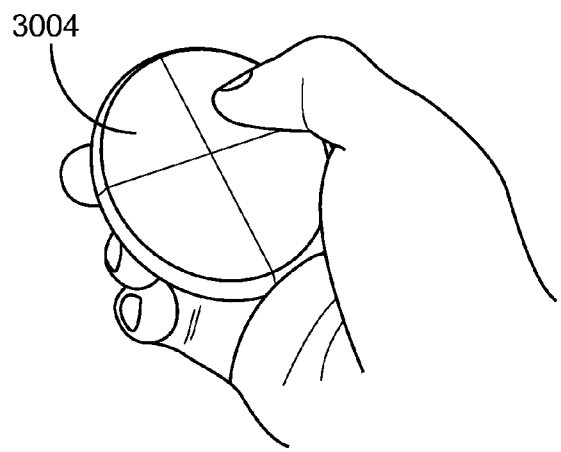

FIG. 30B shows a bottom surface 3004 of the totem of FIG. 30A, according to one illustrated embodiment, which may be used as part of a virtual trackpad implementation. The bottom surface of the totem may be flat with a generally oval or circular profile. The bottom surface may be a hard surface. The totem may have no physical input structures (e.g., keys, buttons, scroll wheels), no physical switches and no physical electronics.

The AR system may optionally render a virtual trackpad image in a user's field of view, such that the virtual demarcations appear to reside on the bottom surface of the totem. The AR system detects or captures a user's interaction with the bottom surface of the totem. For example, the AR system may employ one or more front facing cameras to detect a position and/or movement of a user's fingers on the bottom surface of the totem. For instance, the AR system may detect one or more static positions of one or more fingers, or a change in position of one or more fingers (e.g., swiping gesture with one or more fingers, pinching gesture using two or more fingers).

The AR system may also employ the front facing camera(s) to detect interactions (e.g., tap, double tap, short tap, long tap) of a user's fingers with the bottom surface of the totem. The AR system maps the position and/or movement (e.g., distance, direction, speed, acceleration) of the user's fingers along the bottom surface of the totem. The AR system maps user interactions (e.g., number of interactions, types of interactions, duration of interactions) with the bottom surface of the totem, and hence with various inputs (e.g., controls, functions). In response to the position, movements and/or interactions, the AR system may cause corresponding inputs to be provided to a computer or some other device.

Figure 30C:
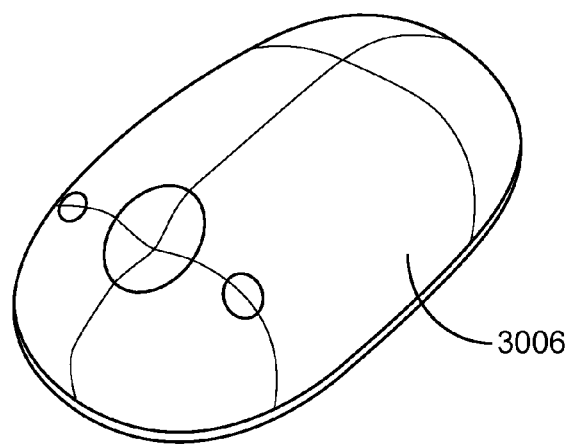

FIG. 30C shows a top surface of a totem 3006 according to another illustrated embodiment, which may be used as part of a virtual mouse implementation.

The totem of FIG. 30C is similar in many respects to that of the totem of FIG. 30A. Hence, similar or even identical structures are identified with the same reference numbers.

The top surface of the totem of FIG. 30C includes one or more indents or depressions at one or more respective locations on the top surface where the AR system with render keys or other structures (e.g., scroll wheel) to appear.

FIG. 31A shows an orb totem 3102 with a flower petal-shaped (e.g., Lotus flower) virtual user interface 3104 according to another illustrated embodiment.

The totem 3102 may have a spherical shape with either a hard outer surface or a soft outers surface. The outer surface of the totem 3102 may have texture to facilitate a sure grip by the user. The totem 3102 may have no physical keys, physical switches or physical electronics.

The AR system renders the flower petal-shaped virtual user interface image 3104 in a user's field of view, so as to appear to be emanating from the totem 3102. Each of the petals of the virtual user interface 3104 may correspond to a function, category of functions, and/or category of content or media types, tools and/or applications.

The AR system may optionally render one or more demarcations on the outer surface of the totem. Alternatively or additionally, the totem 3102 may optionally bear one or more physical demarcations (e.g., printed, inscribed) on the outer surface. The demarcation(s) may assist the user in visually orienting the totem 3102 with the flower petal-shaped virtual user interface 3104.

In one or more embodiments, the AR system detects or captures a user's interaction with the totem 3102. For example, the AR system may employ one or more front facing cameras to detect a position, orientation, and/or movement (e.g., rotational direction, magnitude of rotation, angular speed, angular acceleration) of the totem with respect to some reference frame (e.g., reference frame of the flower petal-shaped virtual user interface, real world, physical room, user's body, user's head). For instance, the AR system may detect one or more static orientations or a change in orientation of the totem 3102 or a demarcation on the totem 3102.

The AR system may also employ the front facing camera(s) to detect interactions (e.g., tap, double tap, short tap, long tap, fingertip grip, enveloping grasp) of a user's fingers with outer surface of the totem. The AR system maps the orientation and/or change in orientation (e.g., distance, direction, speed, acceleration) of the totem to user selections or inputs. The AR system optionally maps user interactions (e.g., number of interactions, types of interactions, duration of interactions) with the outer surface of the totem 3102, and hence with various inputs (e.g., controls, functions). In response to the orientations, changes in position (e.g., movements) and/or interactions, the AR system may cause corresponding inputs to be provided to a computer or some other device.

Additionally or alternatively, and as discussed above, the AR system may render the virtual user interface 3104 differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

Referring now to FIG. 31B, the totem 3106 is disc shaped. Similar to the user interface 3104 of FIG. 31A, a flower-petal shaped virtual user interface 3104 is rendered when the totem 3106 is selected, in some embodiments.

The totem of FIG. 31B is disc-shaped, having a top surface and bottom surface which may be flat or domed, as illustrated in FIG. 31B. That is, a radius of curvature may be infinite or much larger than a radius of curvature of a peripheral edge of the totem.

The AR system renders the flower petal-shaped virtual user interface 3104 image in a user's field of view, so as to appear to be emanating from the totem. As noted above, each of the petals may correspond to a function, category of functions, and/or category of content or media types, tools and/or applications. FIG. 31B represents a number of examples, including a search function, settings functions, collection of favorites, profiles, collection of games, collection of tools and/or applications, social media or application category, media or content category or collection (e.g., entertainment, electronic magazines, electronic books, other publications, movies, television programs).

FIG. 31C shows an orb totem 3108 in a first configuration 3110 and a second configuration 3112, according to another illustrated embodiment. In particular, the totem 3108 has a number of arms or elements which are selectively moveable or positionable with respect to each other. For example, a first arm or pair of arms may be rotated with respect to a second arm or pair of arms. The first arm or pair of arms may be rotated from a first configuration 3110 to a second configuration 3112. Where the arms are generally arcuate, as illustrated, in the first configuration, 3110, the arms form an orb or generally spherical structure. In the second configuration, 3112, the second arm or pairs of arms align with the first arm or pairs of arms to form an partial tube with a C-shaped profile, as shown in the illustrated embodiment.

The arms may have an inner diameter sized large enough to receive a wrist or other limb of a user, in one or more embodiments. The inner diameter may be sized small enough to prevent the totem 3108 from sliding off the limb during use. For example, the inner diameter may be sized to comfortably receive a wrist of a user, while not sliding past a hand of the user. This allows the totem 3108 to take the form of a bracelet, for example when not in use, for convenient carrying. A user may then configure the totem 3108 into an orb shape for use, in a fashion similar to the orb totems described above. The totem may have no physical keys, physical switches or physical electronics.

Notably, the virtual user interface (such as virtual user interface 3104 shows in FIGS. 31A and 31B) is omitted from FIG. 31C. The AR system may render a virtual user interface in any of a large variety of forms, for example the flower petal-shaped virtual user interface 3104 previously illustrated and discussed.

Figure 32A:
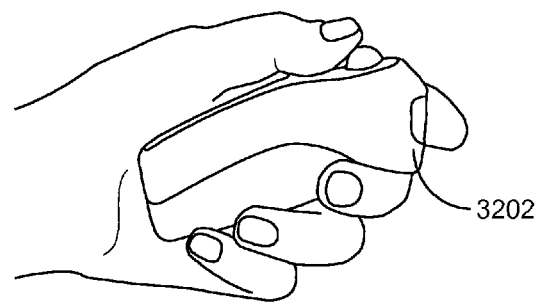
FIGS. 32A-32D illustrates other example totems, according to one or more embodiments.

FIG. 32A shows a handheld controller shaped totem 3202, according to another illustrated embodiment.

The totem 3202 has a gripping section sized and configured to comfortably fit in a user's hand. The totem 3202 may include a number of user input elements, for example a key or button and a scroll wheel. The user input elements may be physical elements, although not connected to any sensor or switches in the totem, which itself may have no physical switches or physical electronics. Alternatively, the user input elements may be virtual elements rendered by the AR system. Where the user input elements are virtual elements, the totem 3202 may have depressions, cavities, protrusions, textures or other structures to tactile replicate a feel of the user input element.

The AR system detects or captures a user's interaction with the user input elements of the totem. For example, the AR system may employ one or more front facing cameras to detect a position and/or movement of a user's fingers with respect to the user input elements of the totem. For instance, the AR system may detect one or more static positions of one or more fingers, or a change in position of one or more fingers (e.g., swiping or rocking gesture with one or more fingers, rotating or scrolling gesture, or both).

The AR system may also employ the front facing camera(s) to detect interactions (e.g., tap, double tap, short tap, long tap) of a user's fingers with the user input elements of the totem. The AR system maps the position and/or movement (e.g., distance, direction, speed, acceleration) of the user's fingers with the user input elements of the totem 3202. The AR system maps user interactions (e.g., number of interactions, types of interactions, duration of interactions) of the user's fingers with the user input elements of the totem, and hence with various inputs (e.g., controls, functions). In response to the position, movements and/or interactions, the AR system may cause corresponding inputs to be provided to a computer or some other device.

Figure 32B:
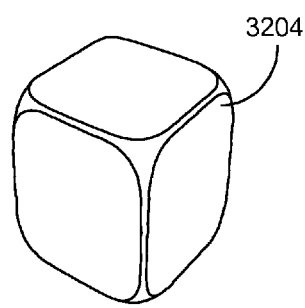

FIG. 32B shows a block shaped totem 3204, according to another illustrated embodiment.

The totem 3204 may have the shape of a cube with six faces, or some other three-dimensional geometric structure. The totem 3204 may have a hard outer surface or a soft outer surface. The outer surface of the totem 3204 may have texture to facilitate a sure grip by the user. The totem 3204 may have no physical keys, physical switches or physical electronics.

The AR system may render a virtual user interface image in a user's field of view, so as to appear to be on the face(s) of the outer surface of the totem 3204, in one or more embodiments. Each of the faces, and corresponding virtual input prompt, may correspond to a function, category of functions, and/or category of content or media types, tools and/or applications.

The AR system detects or captures a user's interaction with the totem 3204. For example, the AR system may employ one or more front facing cameras to detect a position, orientation, and/or movement (e.g., rotational direction, magnitude of rotation, angular speed, angular acceleration) of the totem 3204 with respect to some reference frame (e.g., reference frame of the real world, physical room, user's body, user's head). For instance, the AR system may detect one or more static orientations or a change in orientation of the totem 3204.

The AR system may also employ the front facing camera(s) to detect interactions (e.g., tap, double tap, short tap, long tap, fingertip grip, enveloping grasp) of a user's fingers with outer surface of the totem 3204. The AR system maps the orientation and/or change in orientation (e.g., distance, direction, speed, acceleration) of the totem 3204 to user selections or inputs. The AR system optionally maps user interactions (e.g., number of interactions, types of interactions, duration of interactions) with the outer surface of the totem 3204, and hence with various inputs (e.g., controls, functions). In response to the orientations, changes in position (e.g., movements) and/or interactions, the AR system may cause corresponding inputs to be provided to a computer or some other device.

In response to the orientations, changes in position (e.g., movements) and/or interactions, the AR system may change one or more aspects of the rendering the virtual user interface cause corresponding inputs to be provided to a computer or some other device. For example, as a user rotates the totem, different faces may come into the user's field of view, while other faces rotate out of the user's field of view. The AR system may respond by rendering virtual interface elements to appear on the now visible faces, which were previously hidden from the view of the user. Likewise, the AR system may respond by stopping the rendering of virtual interface elements which would otherwise appear on the faces now hidden from the view of the user.

Additionally or alternatively, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

Figure 32C:
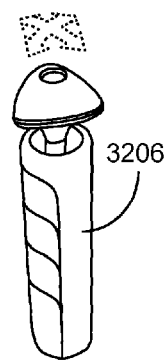

FIG. 32C shows a handheld controller shaped totem 3206, according to another illustrated embodiment.

The totem 3206 has a gripping section sized and configured to comfortably fit in a user's hand, for example a cylindrically tubular portion. The totem 3206 may include a number of user input elements, for example a number of pressure sensitive switches and a joy or thumbstick. The user input elements may be physical elements, although not connected to any sensor or switches in the totem, which itself may have no physical switches or physical electronics. Alternatively, the user input elements may be virtual elements rendered by the AR system. Where the user input elements are virtual elements, the totem 3206 may have depressions, cavities, protrusions, textures or other structures to tactile replicate a feel of the user input element.

The AR system detects or captures a user's interaction with the user input elements of the totem 3206. For example, the AR system may employ one or more front facing cameras to detect a position and/or movement of a user's fingers with respect to the user input elements of the totem. For instance, the AR system may detect one or more static positions of one or more fingers, or a change in position of one or more fingers (e.g., swiping or rocking gesture with one or more fingers, rotating or scrolling gesture, or both). The AR system may also employ the front facing camera(s) to detect interactions (e.g., tap, double tap, short tap, long tap) of a user's fingers with the user input elements of the totem.

As discussed above, the AR system maps the position and/or movement (e.g., distance, direction, speed, acceleration) of the user's fingers with the user input elements of the totem 3206. The AR system maps user interactions (e.g., number of interactions, types of interactions, duration of interactions) of the user's fingers with the user input elements of the totem 3206, and hence with various inputs (e.g., controls, functions). In response to the position, movements and/or interactions, the AR system may cause corresponding inputs to be provided to a computer or some other device.

Figure 32D:
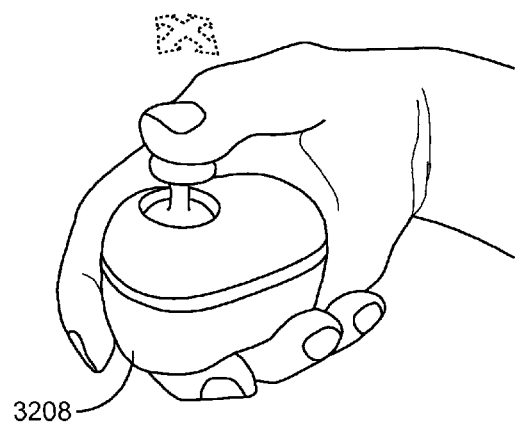

FIG. 32D shows another handheld controller shaped totem, 3208 according to another illustrated embodiment. The totem 3208 has a gripping section sized and configured to comfortably fit in a user's hand. The totem 3208 may include a number of user input elements, for example a key or button and a joy or thumbstick. The user input elements may be physical elements, although not connected to any sensor or switches in the totem, which itself may have no physical switches or physical electronics. Alternatively, the user input elements may be virtual elements rendered by the AR system. Where the user input elements are virtual elements, the totem 3208 may have depressions, cavities, protrusions, textures or other structures to tactile replicate a feel of the user input element.

The AR system detects or captures a user's interaction with the user input elements of the totem 3208. For example, the AR system may employ one or more front facing cameras to detect a position and/or movement of a user's fingers with respect to the user input elements of the totem. For instance, the AR system may detect one or more static positions of one or more fingers, or a change in position of one or more fingers (e.g., swiping or rocking gesture with one or more fingers, rotating or scrolling gesture, or both).

Similar to the above, the AR system may also employ the front facing camera(s) to detect interactions (e.g., tap, double tap, short tap, long tap) of a user's fingers with the user input elements of the totem. The AR system maps the position and/or movement (e.g., distance, direction, speed, acceleration) of the user's fingers with the user input elements of the totem 3208. The AR system maps user interactions (e.g., number of interactions, types of interactions, duration of interactions) of the user's fingers with the user input elements of the totem, and hence with various inputs (e.g., controls, functions). In response to the position, movements and/or interactions, the AR system may cause corresponding inputs to be provided to a computer or some other device.

Figure 33A:
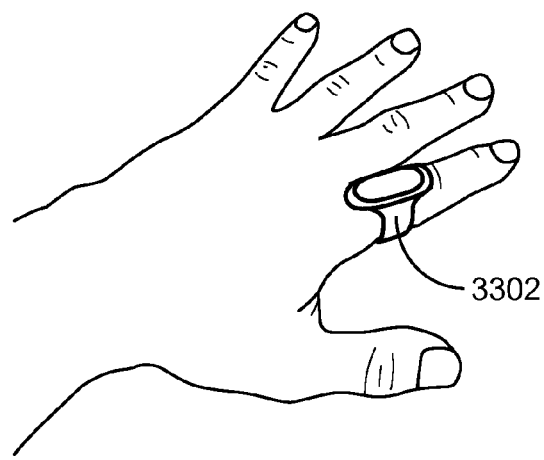
FIGS. 33A-33C illustrate example embodiments of ring and bracelet totems, according to one or more embodiments.

FIG. 33A shows a ring totem 3302, according one illustrated embodiment.

In particular, the ring totem 3302 has a tubular portion and an interaction portion physically coupled to the tubular portion. The tubular and interaction portions may be integral, and may be formed as or from a single unitary structure. The tubular portion has an inner diameter sized large enough to receive a finger of a user there through. The inner diameter may be sized small enough to prevent the totem 3302 from sliding off the finger during normal use. This allows the ring totem 3302 to be comfortably worn even when not in active use, ensuring availability when needed. The ring totem 3302 may have no physical keys, physical switches or physical electronics.

Notably, the virtual user interface (e.g., 3104 shown in FIGS. 31A and 31B) is omitted from FIG. 31C. The AR system may render a virtual user interface in any of a large variety of forms. For example, the AR system may render a virtual user interface in the user's field of view as to appear as if the virtual user interface element(s) reside on the interaction surface. Alternatively, the AR system may render a virtual user interface as the flower petal-shaped virtual user interface 3104 previously illustrated and discussed, emanating from the interaction surface.

Similar to the above, the AR system detects or captures a user's interaction with the totem 3302. For example, the AR system may employ one or more front facing cameras to detect a position, orientation, and/or movement (e.g., position, direction, distance, speed, acceleration) of the user's finger(s) with respect to interaction surface in some reference frame (e.g., reference frame of the interaction surface, real world, physical room, user's body, user's head). For instance, the AR system may detect one or more locations of touches or a change in position of a finger on the interaction surface.

Again, as discussed above, the AR system may also employ the front facing camera(s) to detect interactions (e.g., tap, double tap, short tap, long tap, fingertip grip, enveloping grasp) of a user's fingers with the interaction surface of the totem. The AR system maps the position, orientation, and/or movement of the finger with respect to the interaction surface to a set of user selections or inputs. The AR system optionally maps other user interactions (e.g., number of interactions, types of interactions, duration of interactions) with the interaction surface of the totem, and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

Figure 33B:
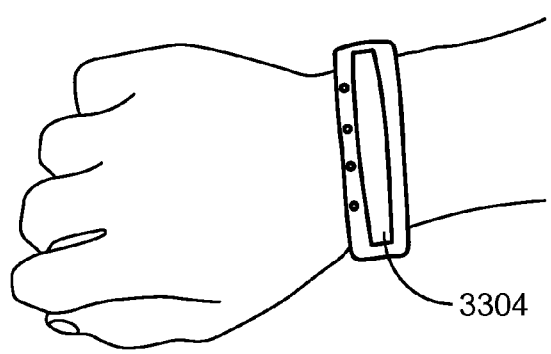

FIG. 33B shows a bracelet totem 3304, according one illustrated embodiment.

In particular, the bracelet totem 3304 has a tubular portion and a touch surface physically coupled to the tubular portion. The tubular portion and touch surface may be integral, and may be formed as or from a single unitary structure. The tubular portion has an inner diameter sized large enough to receive a wrist or other limb of a user. The inner diameter may be sized small enough to prevent the totem 3304 from sliding off the limb during use. For example, the inner diameter may be sized to comfortably receive a wrist of a user, while not sliding past a hand of the user. This allows the bracelet totem 3304 to be worn whether in active use or not, ensuring availability when desired. The bracelet totem 3304 may have no physical keys, physical switches or physical electronics.

Notably, the virtual user interface is omitted from FIG. 31C. The AR system may render a virtual user interface in any of a large variety of forms. For example, the AR system may render a virtual user interface in the user's field of view as to appear as if the virtual user interface element(s) reside on the touch surface. Alternatively, the AR system may render a virtual user interface as the flower petal-shaped virtual user interface 3104 previously illustrated and discussed, emanating from the touch surface.

The AR system detects or captures a user's interaction with the totem 3304. For example, the AR system may employ one or more front facing cameras to detect a position, orientation, and/or movement (e.g., position, direction, distance, speed, acceleration) of the user's finger(s) with respect to touch surface in some reference frame (e.g., reference frame of the touch surface, real world, physical room, user's body, user's head). For instance, the AR system may detect one or more locations of touches or a change in position of a finger on the touch surface.

As discussed above, the AR system may also employ the front facing camera(s) to detect interactions (e.g., tap, double tap, short tap, long tap, fingertip grip, enveloping grasp) of a user's fingers with the touch surface of the totem. The AR system maps the position, orientation, and/or movement of the finger with respect to the touch surface to a set of user selections or inputs. The AR system optionally maps other user interactions (e.g., number of interactions, types of interactions, duration of interactions) with the touch surface of the totem 3304, and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

Figure 33C:
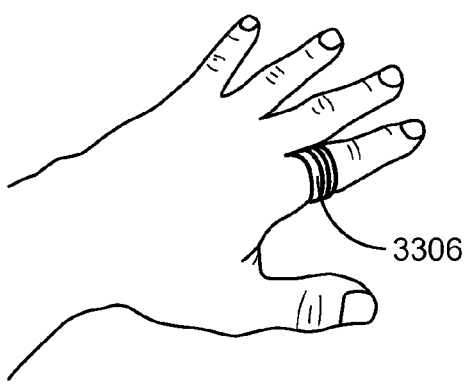

FIG. 33C shows a ring totem 3306, according another illustrated embodiment. In particular, the ring totem 3306 has a tubular portion and an interaction portion physically rotatably coupled to the tubular portion to rotate with respect thereto. The tubular portion has an inner diameter sized large enough to receive a finger of a user there through. The inner diameter may be sized small enough to prevent the totem from sliding off the finger during normal use. This allows the ring totem to be comfortably worn even when not in active use, ensuring availability when needed.

The interaction portion may itself be a closed tubular member, having a respective inner diameter received about an outer diameter of the tubular portion. For example, the interaction portion may be journaled or slidably mounted to the tubular portion. The interaction portion is accessible from an exterior surface of the ring totem. The interaction portion may, for example, be rotatable in a first rotational direction about a longitudinal axis of the tubular portion. The interaction portion may additionally be rotatable in a second rotational, opposite the first rotational direction about the longitudinal axis of the tubular portion. The ring totem 3306 may have no physical switches or physical electronics.

The AR system may render a virtual user interface in any of a large variety of forms. For example, the AR system may render a virtual user interface in the user's field of view as to appear as if the virtual user interface element(s) reside on the interaction portion. Alternatively, the AR system may render a virtual user interface as the flower petal-shaped virtual user interface previously illustrated and discussed, emanating from the interaction portion.

Similar to the above, the AR system detects or captures a user's interaction with the totem. For example, the AR system may employ one or more front facing cameras to detect a position, orientation, and/or movement (e.g., position, direction, distance, speed, acceleration) of the interaction portion with respect to the tubular portion (e.g., finger receiving portion) in some reference frame (e.g., reference frame of the tubular portion, real world, physical room, user's body, user's head).

For instance, the AR system may detect one or more locations or orientations or changes in position or orientation of the interaction portion with respect to the tubular portion.

The AR system may also employ the front facing camera(s) to detect interactions (e.g., tap, double tap, short tap, long tap, fingertip grip, enveloping grasp) of a user's fingers with the interaction portion of the totem. The AR system maps the position, orientation, and/or movement of the interaction portion with respect the tubular portion to a set of user selections or inputs. The AR system optionally maps other user interactions (e.g., number of interactions, types of interactions, duration of interactions) with the interaction portion of the totem, and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection.

Figure 34A:
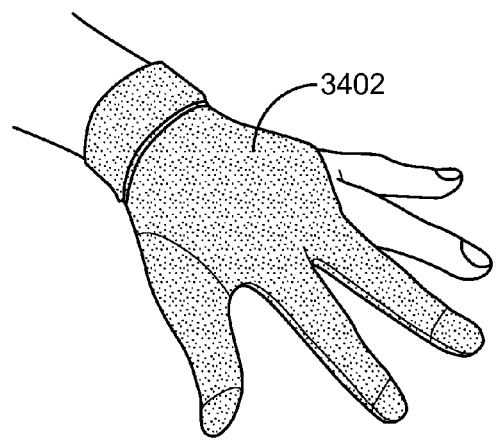
FIGS. 34A-34C illustrate more example totems, according to one or more embodiments.

FIG. 34A shows a glove-shaped haptic totem 3402, according one illustrated embodiment. In particular, the glove-shaped haptic totem 3102 is shaped like a glove or partial glove, having an opening for receiving a wrist and one or more tubular glove fingers (three shown) sized to receive a user's fingers. The glove-shaped haptic totem 3102 may be made of one or more of a variety of materials. The materials may be elastomeric or may otherwise conform the shape or contours of a user's hand, providing a snug but comfortable fit.

The AR system may render a virtual user interface in any of a large variety of forms. For example, the AR system may render a virtual user interface in the user's field of view as to appear as if the virtual user interface element(s) is inter-actable via the glove-shaped haptic totem 3402. For example, the AR system may render a virtual user interface as one of the previously illustrated and/or described totems or virtual user interfaces.

Similar to the above, the AR system detects or captures a user's interaction via visual tracking of the user's hand and fingers on which the glove-shaped haptic totem 3402 is worn. For example, the AR system may employ one or more front facing cameras to detect a position, orientation, and/or movement (e.g., position, direction, distance, speed, acceleration) of the user's hand and/or finger(s) with respect to some reference frame (e.g., reference frame of the touch surface, real world, physical room, user's body, user's head).

Similar to the above embodiments, for instance, the AR system may detect one or more locations of touches or a change in position of a hand and/or fingers. The AR system may also employ the front facing camera(s) to detect interactions (e.g., tap, double tap, short tap, long tap, fingertip grip, enveloping grasp) of a user's hands and/or fingers. Notably, the AR system may track the glove-shaped haptic totem instead of the user's hands and fingers. The AR system maps the position, orientation, and/or movement of the hand and/or fingers to a set of user selections or inputs. The AR system optionally maps other user interactions (e.g., number of interactions, types of interactions, duration of interactions), and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render the virtual user interface differently in response to select user interactions. For instance, some user interactions may correspond to selection of a particular submenu, application or function. The AR system may respond to such selection by rendering a new set of virtual interface elements, based at least in part on the selection. For instance, the AR system render a submenu or a menu or other virtual interface element associated with the selected application or functions.

The glove-shaped haptic totem 3402 includes a plurality of actuators, which are responsive to signals to provide haptic sensations such as pressure and texture. The actuators may take any of a large variety of forms, for example piezoelectric elements, and/or micro electrical mechanical structures (MEMS).

The AR system provides haptic feedback to the user via the glove-shaped haptic totem 3402. In particular, the AR system provides signals to the glove-shaped haptic totem to replicate a sensory sensation of interacting with a physical object which a virtual object may represent. Such may include providing a sense of pressure and/or texture associated with a physical object. Thus, the AR system may cause a user to feel a presence of a virtual object, for example including various structural features of the physical object such as edges, corners, roundness, etc. The AR system may also cause a user to feel textures such as smooth, rough, dimpled, etc.

Figure 34B:
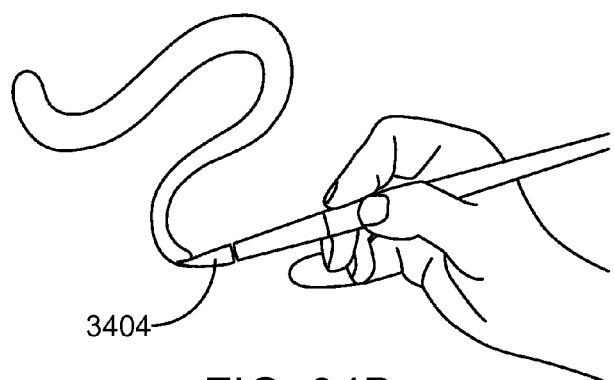

FIG. 34B shows a stylus or brush shaped totem 3404, according one illustrated embodiment. The stylus or brush shaped totem 3404 includes an elongated handle, similar to that of any number of conventional stylus or brush. In contrast to conventional stylus or brush, the stylus or brush has a virtual tip or bristles. In particular, the AR system may render a desired style of virtual tip or bristle to appear at an end of the physical stylus or brush 3404. The tip or bristle may take any conventional style including narrow or wide points, flat bristle brushed, tapered, slanted or cut bristle brushed, natural fiber bristle brushes (e.g., horse hair), artificial fiber bristle brushes, etc. This advantageously allows the virtual tip or bristles to be replaceable.

Similar to the above, the AR system detects or captures a user's interaction via visual tracking of the user's hand and/or fingers on the stylus or brush and/or via visual tracking of the end of the stylus or brush. For example, the AR system may employ one or more front facing cameras to detect a position, orientation, and/or movement (e.g., position, direction, distance, speed, acceleration) of the user's hand and/or finger(s) and/or end of the stylus or brush with respect to some reference frame (e.g., reference frame of a piece of media, the real world, physical room, user's body, user's head). For instance, the AR system may detect one or more locations of touches or a change in position of a hand and/or fingers. Also for instance, the AR system may detect one or more locations of the end of the stylus or brush and/or an orientation of the end of the stylus or brush with respect to, for example, a piece of media or totem representing a piece of media. The AR system may additionally or alternatively detect one or more change in locations of the end of the stylus or brush and/or change in orientation of the end of the stylus or brush with respect to, for example, the piece of media or totem representing the piece of media.

As discussed above, the AR system may also employ the front facing camera(s) to detect interactions (e.g., tap, double tap, short tap, long tap, fingertip grip, enveloping grasp) of a user's hands and/or fingers or of the stylus or brush. The AR system maps the position, orientation, and/or movement of the hand and/or fingers and/or end of the stylus or brush to a set of user selections or inputs. The AR system optionally maps other user interactions (e.g., number of interactions, types of interactions, duration of interactions), and hence with various inputs (e.g., controls, functions). In response to the position, orientation, movement, and/or other interactions, the AR system may cause corresponding inputs to be provided to a computer or some other device.

Additionally or alternatively, the AR system may render a virtual image of markings made by the user using the stylus or brush 3404, taking into account the visual effects that would be achieved by the selected tip or bristles.

The stylus or brush may have one or more haptic elements (e.g., piezoelectric elements, MEMS elements), which the AR system control to provide a sensation (e.g., smooth, rough, low friction, high friction) that replicate a feel of a selected point or bristles, as the selected point or bristles pass over media. The sensation may also reflect or replicate how the end or bristles would interact with different types of physical aspects of the media, which may be selected by the user. Thus, paper and canvass may produce two different haptic responses.

Figure 34C:
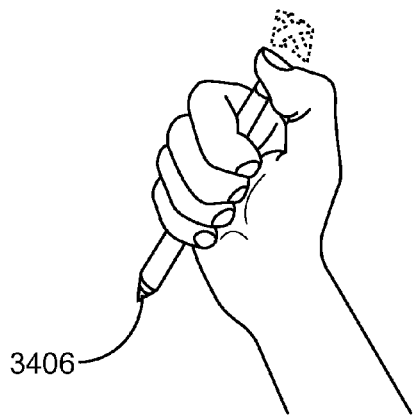

FIG. 34C shows a pen shaped totem 3406, according one illustrated embodiment. The pen shaped totem 3406 includes an elongated shaft, similar to that of any number of conventional pen, pencil, stylus or brush. The pen shaped totem 3406 has a user actuatable joy or thumbstick located at one end of the shaft. The joy or thumbstick is moveable with respect to the elongated shaft in response to user actuation. The joy or thumbstick may, for example, be pivotally movable in four directions (e.g., forward, back, left, right). Alternatively, the joy or thumbstick may, for example, be movable in all directions four directions, or may be pivotally moveable in any angular direction in a circle, for example to navigate. Notably, the joy or thumbstick is not coupled to any switch or electronics.

Instead of coupling the joy or thumbstick to a switch or electronics, the AR system detects or captures a position, orientation, or movement of the joy or thumbstick. For example, the AR system may employ one or more front facing cameras to detect a position, orientation, and/or movement (e.g., position, direction, distance, speed, acceleration) of the joy or thumbstick with respect to some reference frame (e.g., reference frame of the elongated shaft).

Additionally, as discussed above, the AR system may employ one or more front facing cameras to detect a position, orientation, and/or movement (e.g., position, direction, distance, speed, acceleration) of the user's hand and/or finger(s) and/or end of the pen shaped totem with respect to some reference frame (e.g., reference frame of the elongated shaft, of a piece of media, the real world, a physical room, a user's body, or a user's head).

For instance, the AR system may detect one or more locations of touches or a change in position of a hand and/or fingers. Also for instance, the AR system may detect one or more locations of the end of the pen shaped totem and/or an orientation of the end of the pen shaped totem with respect to, for example, a piece of media or totem representing a piece of media. The AR system may additionally or alternatively detect one or more change in locations of the end of the pen shaped totem and/or change in orientation of the end of the pen shaped totem with respect to, for example, the piece of media or totem representing the piece of media.

Similar to the above, the AR system may also employ the front facing camera(s) to detect interactions (e.g., tap, double tap, short tap, long tap, fingertip grip, enveloping grasp) of a user's hands and/or fingers with the joy or thumbstick or the elongated shaft of the pen shaped totem.

The AR system maps the position, orientation, and/or movement of the hand and/or fingers and/or end of the joy or thumbstick to a set of user selections or inputs. The AR system optionally maps other user interactions (e.g., number of interactions, types of interactions, duration of interactions), and hence with various inputs (e.g., controls, functions). In response to the position, orientation, movement, and/or other interactions, the AR system may cause corresponding inputs to be provided to a computer or some other device.

Additionally or alternatively, as discussed above, the AR system may render a virtual image of markings made by the user using the pen shaped totem 3406, taking into account the visual effects that would be achieved by the selected tip or bristles.

The pen shaped totem 3406 may have one or more haptic elements (e.g., piezoelectric elements, MEMS elements), which the AR system control to provide a sensation (e.g., smooth, rough, low friction, high friction) that replicate a feel of passing over media.

Figure 35A:
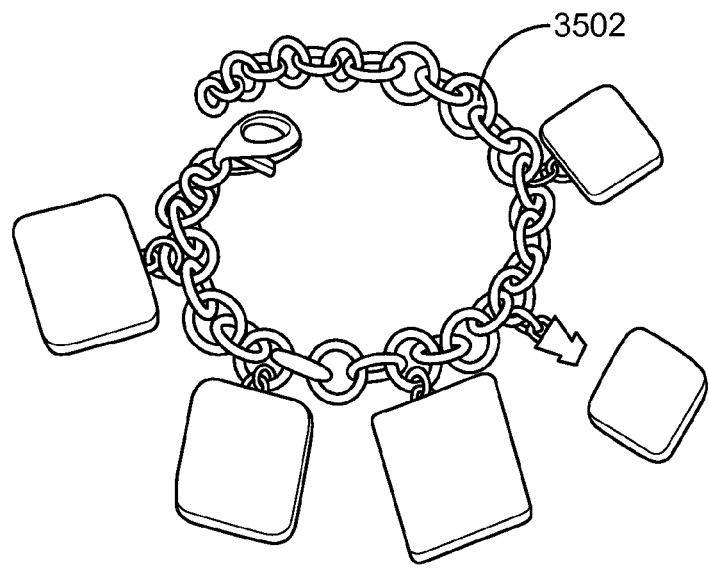
FIGS. 35A-35B illustrate a charms totem and a keychain totem, according to one or more embodiments.

FIG. 35A shows a charm chain totem 3502, according one illustrated embodiment. The charm chain totem 3502 includes a chain and a number of charms. The chain may include a plurality of interconnected links which provides flexibility to the chain. The chain may also include a closure or clasp which allows opposite ends of the chain to be securely coupled together. The chain and/or clasp may take a large variety of forms, for example single strand, multi-strand, links or braided. The chain and/or clasp may be formed of any variety of metals, or other non-metallic materials. A length of the chain should accommodate a portion of a user's limb when the two ends are clasped together. The length of the chain should also be sized to ensure that the chain is retained, even loosely, on the portion of the limb when the two ends are clasped together. The chain may be worn as a bracket on a wrist of an arm or on an ankle of a leg. The chain may be worn as a necklace about a neck. The charms may take any of a large variety of forms. The charms may have a variety of shapes, although will typically take the form of plates or discs. While illustrated with generally rectangular profiles, the charms may have any variety of profiles, and different charms on a single chain may have respective profiles which differ from one another. The charms may be formed of any of a large variety of metals, or non-metallic materials.

Each charm may bear an indicia, which is logically associable in at least one computer- or processor-readable non-transitory storage medium with a function, category of functions, category of content or media types, and/or tools or applications which is accessible via the AR system.

Figure 35B:
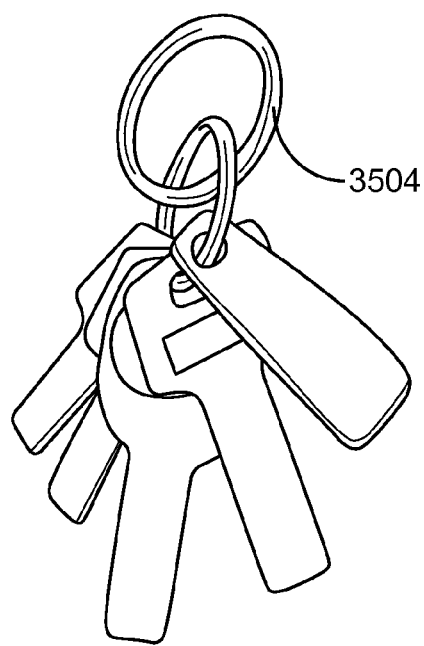

FIG. 35B shows a keychain totem 3504, according one illustrated embodiment. The keychain totem 3504 includes a chain and a number of keys. The chain may include a plurality of interconnected links which provides flexibility to the chain. The chain may also include a closure or clasp which allows opposite ends of the chain to be securely coupled together. The chain and/or clasp may take a large variety of forms, for example single strand, multi-strand, links or braided. The chain and/or clasp may be formed of any variety of metals, or other non-metallic materials.

The keys may take any of a large variety of forms. The keys may have a variety of shapes, although will typically take the form of conventional keys, either with or without ridges and valleys (e.g., teeth). In some implementations, the keys may open corresponding mechanical locks, while in other implementations the keys only function as totems and do not open mechanical locks. The keys may have any variety of profiles, and different keys on a single chain may have respective profiles which differ from one another. The keys may be formed of any of a large variety of metals, or non-metallic materials. Various keys may be different colors from one another.

Each key may bear an indicia, which is logically associable in at least one computer- or processor-readable non-transitory storage medium with a function, category of functions, category of content or media types, and/or tools or applications which is accessible via the AR system.

As discussed above, the AR system detects or captures a user's interaction with the keys. For example, the AR system may employ one or more front facing cameras to detect touching or manipulation of the keys by the user's fingers or hands. For instance, the AR system may detect a selection of a particular key by the user touching the respective key with their finger or grasping the respective key with two or more fingers. Further, the AR may detect a position, orientation, and/or movement (e.g., rotational direction, magnitude of rotation, angular speed, angular acceleration) of a key with respect to some reference frame (e.g., reference frame of the portion of the body, real world, physical room, user's body, user's head). The AR system may also employ the front facing camera(s) to detect other interactions (e.g., tap, double tap, short tap, long tap, fingertip grip, enveloping grasp) of a user's fingers with a key.

As discussed above, the AR system maps selection of the key to user selections or inputs, for instance selection of a social media application. The AR system optionally maps other user interactions (e.g., number of interactions, types of interactions, duration of interactions) with the key, and hence with various inputs (e.g., controls, functions) with the corresponding application. In response to the touching, manipulation or other interactions with the keys, the AR system may cause corresponding applications to be activated and/or provide corresponding inputs to the applications.

Additionally or alternatively, similar to the above embodiments, the AR system may render the virtual user interface differently in response to select user interactions. For instance, some user interactions may correspond to selection of a particular submenu, application or function. The AR system may respond to such selection by rendering a set of virtual interface elements, based at least in part on the selection. For instance, the AR system render a submenu or a menu or other virtual interface element associated with the selected application or functions.

Figure 36:
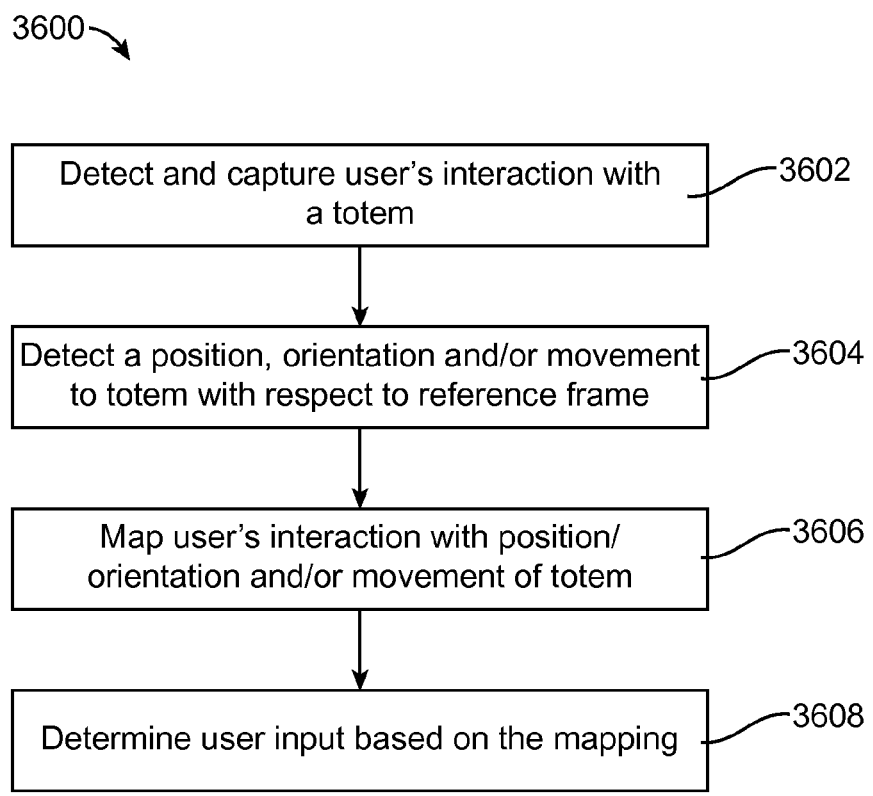
FIG. 36 illustrates a high level flow diagram for a process of determining user input through a totem, according to one embodiment.

Referring now to FIG. 36, an example method 3600 of using totems is described. At 3602, a user's interaction with a totem is detected and/or captured. For example, the interaction may be captured based on inputs from the haptic glove, or through the front-facing cameras. At 3604, the AR system may detect a position, orientation and/or movement of the totem with respect to a given reference frame. The reference frame may be a predetermined reference frame that allows the AR system to calculate how much the totem has moved, in order to understand a user command. At 3606, the user's interaction (e.g., position/orientation/movement against reference frame) is consulted with a map stored in the system. In one or more embodiments, the map may be a 1:1 map that correlates certain movements/positions or orientations with a particular user input. Other mapping tables and/or techniques may be similarly used in other embodiments. At 3608, the AR system may determine the user input based on the mapping.

In one or more embodiments, the AR system may identify an object as a totem. The object may be a real object or a virtual object. Typically, the totem may be a pre-designated object, for example, a set of keys, or a virtual set of keys, that may be displayed as a totem. In one or more embodiments, the user may have selected a totem. Or, if the totem is a real object, the system may have captured one or more images/ and or other data about the totem, to recognize it in the future. Further, the AR system may request the user to "set up" the totem such that the system understands commands that are made in relation to the totem. For example, a center part of the totem may be pressed to indicate a particular command. This requires the system to be pre-programmed to understand that command.

In one or more embodiments, a reference frame of the totem may be correlated against a reference frame of the world to understand certain commands. For example, the system must recognize the user's hand movement (in one embodiment) in relation to the totem. In one or more embodiments, the AR system tracks an interaction of the user with the totem (e.g., hand movements, totem movements, eye movements, etc.). When an interaction matches a predetermined interaction (e.g., a pattern of movements, a speed of movement, a direction of movement, a force of touch, a proximity to another object, etc.), the system may determine a user input, and understand a command, in response to the determined user input.

Light Wavefront and Sound Wavefront:

In one or more embodiments, the AR system may produce a sound wavefront that is the analog of the light wavefront, producing a realistic sound field. In some implementations, the AR system may adjust microphone gain in the sound range dynamically to mix real physical players with virtual players in the virtual space. In other words, the AR system produces a realistic sound wavefront such that an emanating sound from a particular object (e.g., a virtual object, etc.) matches the light field.

For example, if the virtual object is depicted such that it appears from far away, the sound emanating from the object should not be constant, but rather mimic the sound that would come from the object if it were approaching from far away. Since the light field of the AR system produces a realistic visual experience of the virtual object, the sound wavefront of the AR system is also modified to realistically depict sound. For example, if the virtual object is approaching from behind, the sound coming from the virtual object will be different than if it were simply approaching from the front side. Or if the virtual object is approaching from the right side, the sound may be modified such that the user instinctively turns to the right to look at the virtual object. Thus, it can be appreciated that modifying the sound wavefront to realistically depict sounds may improve the overall experience of the AR system.

The sound wavefront may also depend on the user's physical location. For example, natural sounds are perceived differently if the user is in a cathedral (e.g., there may be an echo, etc.), as compared to when the user is in an open space. The AR system is configured to capture local and ambient sound for game-engine driven reproduction.

Figure 37:
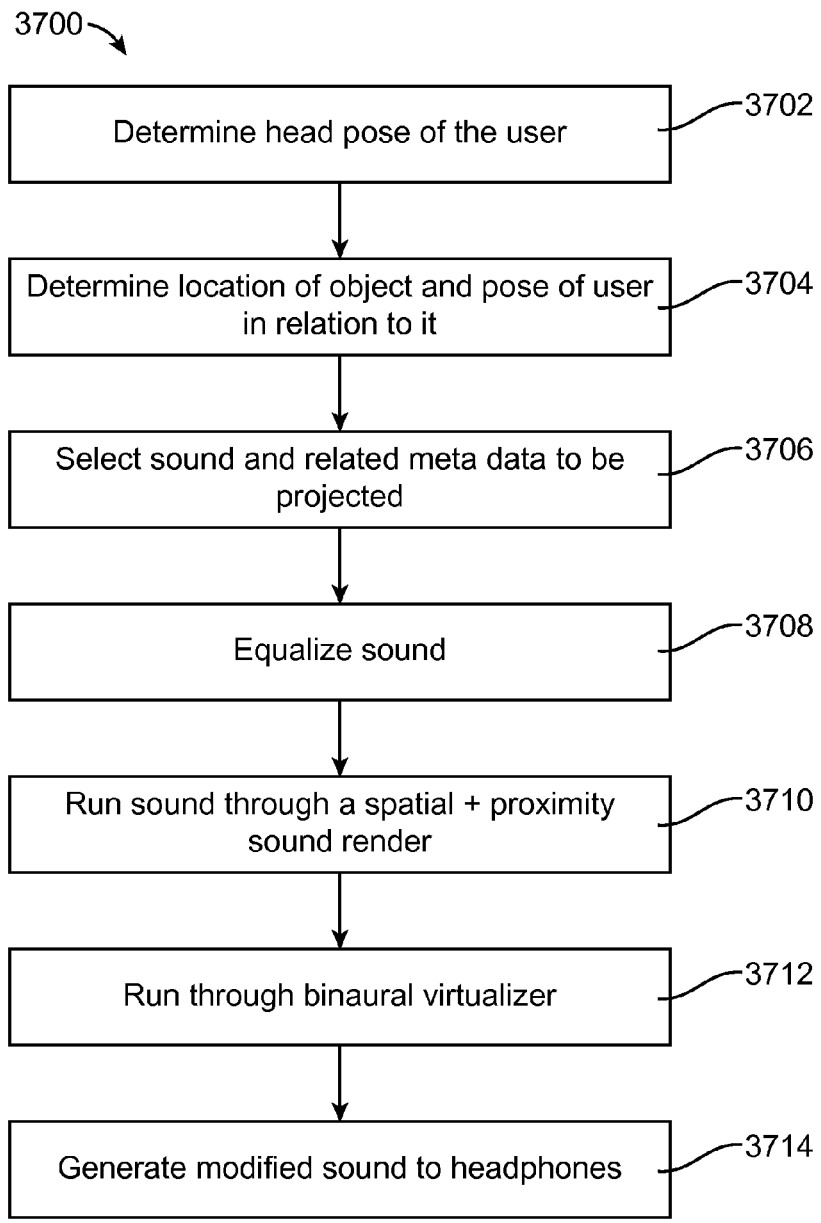
FIG. 37 illustrates a high level flow diagram for a process of producing a sound wavefront, according to one embodiment.

Referring now to FIG. 37, an example method 3700 of producing an appropriate sound wavefront is described. At 3702, the AR system determines the head pose of the user. Next, at 3704, the AR system determines a location of the virtual object to be display to the user, and the pose of the user in relation to it. In other words, the system determines how the sound from the virtual object will be perceived by the user. Next, at 3706, the appropriate sound data to be projected to the user and related metadata is retrieved. This information may be run through a sound design tool. Next, at 3708, the sound may be equalized. Next, at 3710, the sound may be run through a spatial and proximity sound render to ensure that the sound accounts for the spatial location of the virtual object to the user, and their proximity. This may then be run through a binaural virtualizer (3712) before eventually being generated as sound to the headphones of the individual AR device of the user, at 3714.

Figure 38:
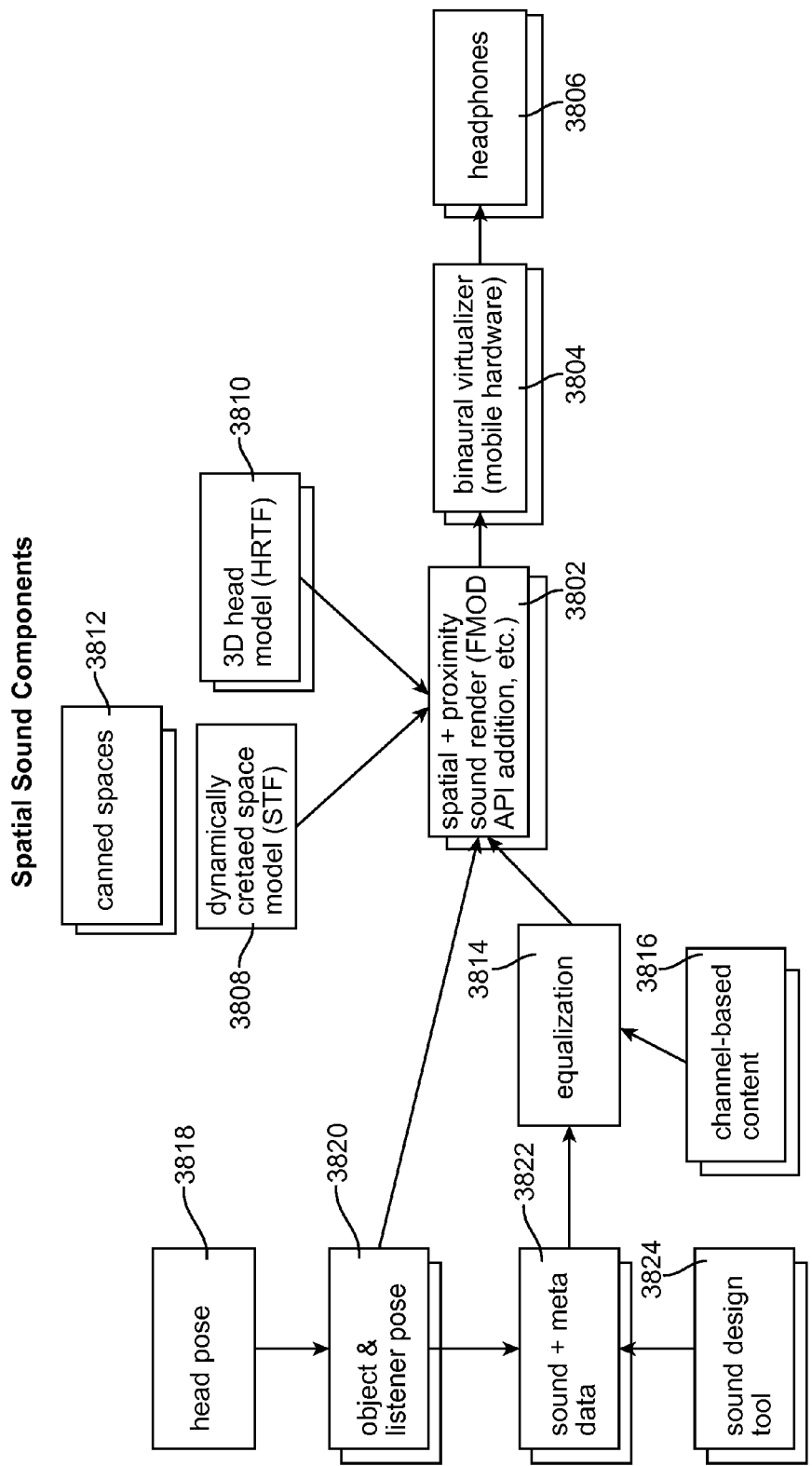
FIG. 38 is a block diagram of components used to produce a sound wavefront, according to one embodiment.

Referring now to FIG. 38, a block diagram showing various components of the sound design system is provided. As shown in FIG. 38, head pose information 3818 may be used determine object and listener pose 3820. This information, once determined may be fed into a spatial and proximity sound render module 3802.

The object and listener pose 3820 may be fed into sound data module 3822, which may comprise various sound data files which may be stored in a database, in one or more embodiments. The sound data module 3822 may interact with a sound design tool 3824 (e.g., FMOD Studio, etc.) to provide sound design filters etc. by which to manipulate the sound data files.

The sound and metadata 3822 may be fed into an equalization module 3814, which may also be fed with channel-based content 3816. The equalized sound may also be fed into the spatial and proximity render module 3802.

In one or more embodiments, a 3D head model transfer function 3810 and a dynamically created space model (e.g., space transfer function) are also inputted to the spatial and proximity sound render module 3802. In one or more embodiments, the spatial and proximity sound render module 3802 may also receive inputs about sounds from canned spaces. The transfer functions may manipulate the sound data by applying transforms based on the user's head pose and the virtual object information received from 3818 and 3820 respectively.

In one or more embodiments, the spatial and proximity sound render module 3802 interacts with the binaural virtualizer 3804, and the sound is finally outputted to the user's headphones 3806.

In one or more embodiments, the AR system may determine a head pose of a user to determine how to manipulate an audio object. The audio object may be tied to a virtual object (e.g., the audio is supposed to come from the virtual object, or may be located at a different place, but is associated with the virtual object). The audio object may be associated with the virtual object based on perceived location, such that the audio object (sound data) emanates from a perceived location of the virtual object. The AR system knows the perceived location of the virtual object (e.g., the map, the passable world model, etc.), so the AR system may place the audio object at the same location. Based on the perceived location and/or determined location of the audio object in relation to the user's head pose, the sound data may go through a sound design algorithm to be dynamically altered such that the sound appears to be coming from a place of origin of the virtual object, in one or more embodiments.

In one or more embodiments, the AR system may intentionally use various visual and/or audio triggers to initiate user head-motion. The AR system may select a trigger (e.g., virtual visual cue or virtual sound cue) and render the virtual visual image or sound cue to appear to emanate from the user's periphery (e.g., displace from front or direction that the user is facing). For example, if rendering a light field into an eye, non-image forming optics on the side or periphery may render visual cues or triggers to appear in the user's peripheral vision and causes a user to turn the user's head in desired direction. Additionally or alternatively, the AR system may render a spatialized sound field, with wave front synthesis on sounds, with an audio or aural cue or trigger that appears out of the field of view of the user, again causing the user to turn in desired direction.

Other UI Hardware Components

In one or more embodiments, the AR system may employ pseudo-haptic gloves that provide sensations of pressures and/or vibrations that are tied against the physical object. The tactile effect may, for example, be akin to running a hand through a bubble.

For example, if a vibration is introduced onto a finger, a user may interpret that vibration as a texture. The pseudo-haptic glove may provide tactile sensations that replicate the feel of hard physical objects, soft physical objects, and physical objects that are fuzzy. The pseudo-haptic glove selectively produces the sensation of both pressure and vibration.

It should be appreciated that the glove is not haptic per se. For example, if there is a massless object (e.g., bubble) floating in space, the user can feel the tactile sensation of touching the massless object. The user can change the tactile sensation of touching the virtual object, for example a texture oriented sensation rather than a firmness oriented sensation. For example, if a user passes a hand through a bubble, the user feels some tactile sensation although the user will not feel the sensation of grabbing a physical object. A similar approach to providing tactile sensations may be implemented in other wearable portions or components of the AR system (e.g., head-mounted AR devices). The glove and/or other components may use a variety of different actuators, for example piezoelectric actuators.

Thus, a user may feel as if the user is able to touch massless virtual objects directly. For instance, if a virtual object is "sitting" on a table, a consistent UX element may provide the user with a proprioceptive tactile interaction. For example, if a user grabs or grasps a particular handle close to a door, using a handle as a coordinate frame for the virtual object may be very intuitive. This allows a user to pick up physical things and actually feel a particular physical sensation, even though it is a tactile proxy hand.

Head worn components of individual AR systems may include sensors to detective when earphones or ear buds are positioned proximate, on or in the ears of a user. The AR system may use any of a large variety of sensors, for example capacitive sensors, pressure sensors, electrical resistance sensors, etc. In response to detection of the earphones or ear buds being in place, the AR system may route sound via the earphones or ear buds. In response to a failure to detect of the earphones or ear buds being in place, the AR system may route sound through conventional stand-alone speakers.

In one or more embodiments, the AR system may employ a composite camera. The composite camera may comprise a plurality of chip-level cameras mounted on or carried by a flexible substrate, for instance a flexible printed circuit board substrate. The flexible substrate may be put over an anvil and potted with potting compound, to inexpensively form an essentially single wide angle lens.

For example, tiny cameras may be built with a layer approach, using wafer level technology. For instance, a plurality of VGA pads may be formed on a flexible substrate for communicatively coupling these cameras. The flexible substrate with cameras may be stretched over an anvil, and fixed for instance via an adhesive. This provides an inexpensive set of VGA cameras that have optically nice field of view of approximately 60 degree or 70 degrees. This approach advantageously employs a flat process, and then because of the way imaging algorithms work, just stretches the flexible substrate over an anvil. The resultant structure provides the equivalent of a wide field of view camera from a pixel count image quality perspective, but with overlapping or non-overlapping fields of view. A plurality of two or three element wafer level of cameras can replace a specific wide field of view lens that has five or six elements, while still achieving the same field of view as the wide field of view camera.

Avatars

The AR system may render virtual representations of users or other entities, referred to as avatars, as described in some detail above. The AR system may render an avatar of a user in the user's own virtual spaces, and/or in the virtual spaces of other user's.

In some implementations, the AR system may allow an avatar to operate a virtual machine, for example a virtual robot, to operate in an environment. For example, the AR system may render an avatar to appear to "jump" into a robot, to allow the avatar to physically change an environment, then allow the avatar to jump back out of the robot. This approach allows time multiplexing of a physical asset.

For instance, the AR system may render an avatar of a first user to appear in virtual space of a second user in which there is a virtual robot. The "visiting" avatar of the first user enters into a body of the robot in the second user's virtual space. The first user can manipulate the second user's virtual environment via the virtual robot. If another avatar was previously residing in robot, that other avatar is removed to allow the avatar of the first user to enter or inhabit the robot. The other avatar originally inhabiting the robot and being removed from the robot may become a remote avatar, visiting some other virtual space. The avatar originally inhabiting the robot may reenter the robot once the avatar of the first user is done using the robot.

The AR system may render an avatar presence in a virtual space with no instrumentation, and allow virtual interaction. The passable world model allows a first user to pass a second user a copy of the first user's section of the world (e.g., a level that runs locally). If the second user's individual AR system is performing local rendering, all the first user's individual AR system needs to send is the skeletal animation.

It should be appreciated that the AR system may allow for a continuity or spectrum of avatar rendering.

At its simplest, the AR system can drive inferential avatar rendering in a manner similar to driving a character in multi-player online games. The resulting avatar may be rendered with the appearance of a game character (e.g., animation), walking around in a virtual world. In that implementation, the only data coming from the user associated with the avatar is velocity and direction of travel, and possibly simple movements for instance hand motions, etc.

Next in complexity, an avatar may resemble a physical appearance of the associated user, and may include updating of the avatar based on information collected from the associated user in real-time. For example, an image of a first user's face may have been captured or pre-scanned for use in generating the avatar. The avatar may have a face that appears either as realistic representation (e.g., photographic) or as a recognizable representation (e.g., drawn, cartoonish or caricature) The body of the avatar may, for example, be drawn, cartoonish or caricature, and may even be out of portion with the head of the avatar.

The AR system may employ information collected from the first user to animate the avatar in real-time. For example, a head worn component of the individual AR system may include one or more inward facing cameras and/or microphones or other sensors (e.g., temperature, perspiration, heat rate, blood pressure, breathing rate) to collect real-time information or data from the first user. The information may include images and sound, including vocals with the inflections, etc.

Voice may be passed through to appear to be emanating from the avatar. In some implementations in which the avatar has a realistic face, the facial images may also be passed through. Where the avatar does not have a realistic face, the AR system may discern facial expressions from the images and/or inflections in voice from the sound. The AR system may update facial expressions of the avatar based on the discerned facial expressions and/or inflections in voice. For example, the AR system may determine an emotion state (e.g., happy, sad, angry, content, frustrated, satisfied) of the first user based on the facial expressions and/or inflections. The AR system may select a facial expression to render on the avatar based on the determined emotion state of the first user. For example, the AR system may select from a number of animation or graphical representations of emotion. Thus, the AR system may employ real time texture mapping to render emotional state of a user on an avatar that represents the user.

Next in complexity, the AR system may collect information about portions of a user's body in addition to, or other than, the user's face or voice. For example, the AR system may collect information representative of movement of one or more limbs of the user and/or of the user's entire body. The AR system may collect such information via user worn sensors (e.g., accelerometers, gyros) and/or via a room sensor system which monitors at least a portion of a physical space in which the user is located.

The AR system uses the collected information to render the entire body of the avatar in a way that reflects that actual movement of the user which the avatar represents. The AR system may perform functions such along with real-time texture mapping, applying images (e.g., video) to the avatar.

In an even more complex implementation, the AR system may include one or more light field cameras which capture a light field of the user in physical space. The second user may view a live real three-dimensional image of the first user with sound, which is more realistic then the previously described implementations.

In a most complex implementation, the AR system may include one or more light field cameras which capture a light field of the user in physical space. The AR system may code the captured light field into a model, and send the model to an individual AR system of a second user for rendering into the second user's virtual space.

Inferential Avatar Rendering

As discussed above, an AR system may use head, hand, environment pose, voice inflection, and/or eye gaze to animate or modify a user's virtual self or avatar in a space. The AR system may infer a location of a user's avatar simply based on a position of the user's head and/or hands with respect to the environment. The AR system may statistically process voice inflection (e.g., not content of utterances), and animate or modify an emotional expression of the corresponding avatar to reflect an emotion of the respective user which the avatar represents. For example, if a user has selected an avatar that resembles a pumpkin, in response to detecting patterns in the user's voice that indicate anger, the AR system may render teeth in a mouth cutout of the pumpkin avatar. As a further example, a user may have an avatar that resembles the Pikachu® character. In response to detection of vocal inflections that indicate inquisitiveness, the AR system may render the Pikachu® resembling avatar, for instance with mouth moving and eyes are looking around is same manner as the user's mouth and eyes, etc.

A rendering of a user's respective virtual space or environment is asynchronous. An exchange of a relatively small amount of information allows a first user to experience being in another's user's space, or experience having another user in the first user's space. If the first user has a copy of the second user's space, the first user can appear in the second user's space, with control over their own viewpoint of the second user's space, as well as control over their own interactions within the second user's space. Animating an avatar using a subset of information, without instrumentation, provides for scalability.

Avatar Navigation Objects

The AR system can provide for autonomous navigation of virtual objects through an environment. Where the virtual objects constitute avatars, various emotional states of the avatar may be taken into account autonomously navigating through a space the avatar is inhabiting.

Figures 39, 40:
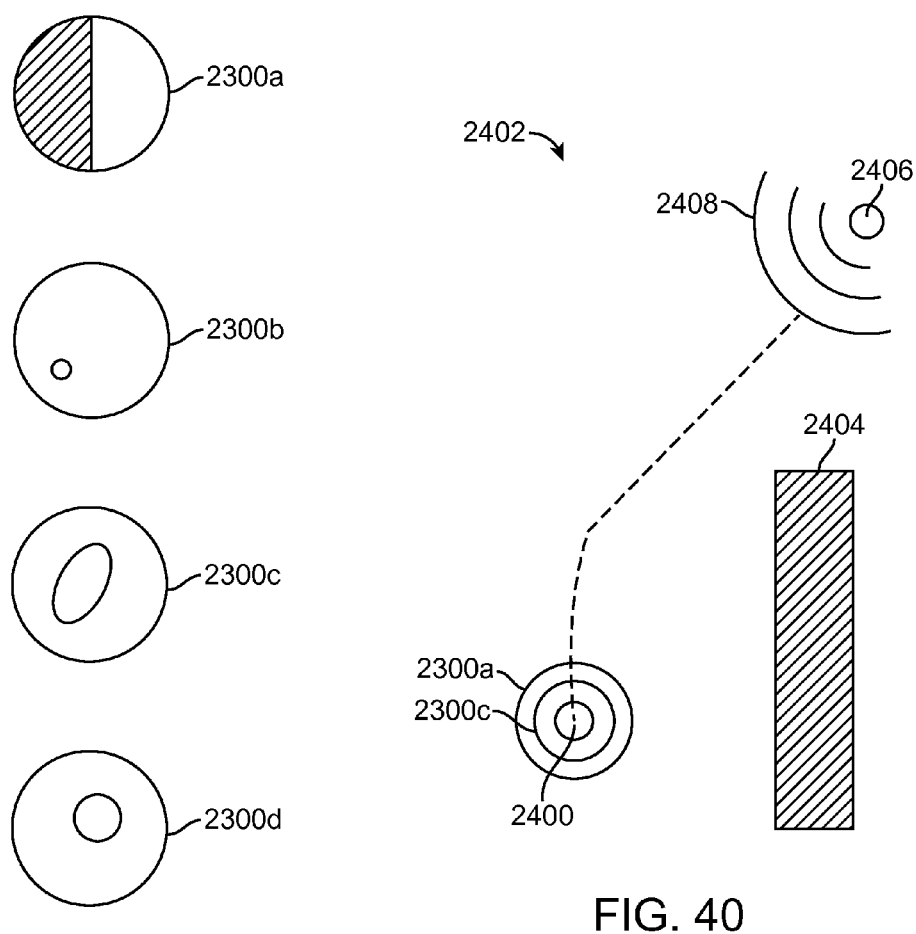
FIG. 39 illustrates a library of autonomous navigation definitions or objects, according to one embodiment.
FIG. 40 illustrates an interaction of various autonomous navigation objects, according to one embodiment.

As illustrated in FIG. 39, the AR system may include a collection or library of autonomous navigation definitions or objects 2300a-2300d (collectively 2300), which sense and are responsive in predefined ways to certain defined conditions which may occur or be sensed in the virtual space or environment. The autonomous navigation definitions or objects are each associated with a condition or stimulus which may occur or be sensed in a virtual space or environment.

An autonomous navigation definition or object 2300a may be responsive to, for example, a presence of structure (e.g., a wall). An autonomous navigation definition or object 2300b may be responsive to, for example, light or a source of light (e.g., luminaire, window). An autonomous navigation definition or object 2300c may be responsive to, for example, sound or a source of sound (e.g., bell, siren, whistle, voice). An autonomous navigation definition or object 2300d may be responsive to, for example, food or water or a source of food or water. Other autonomous navigation definitions or objects (not shown in FIG. 39) may be responsive to other conditions or stimuli, for instance a source of fear (e.g., monster, weapon, fire, cliff), source of food, source of water, treasure, money, gems, precious metals, etc.

The autonomous navigation definitions or objects 2300 are each associated with a defined response. Autonomous navigation definitions or objects respond, for example by causing or tending to cause movement. For example, some autonomous navigation definitions or objects 2300 cause or tend to cause movement away from a source of a condition or stimulus. Also for example, some autonomous navigation objects 2300 cause or tend to cause movement toward a source of a condition or stimulus.

At least some of the autonomous navigation definitions or objects 2300 have one or more adjustable parameters. The adjustable parameters do not change the fundamental conditions or stimulus to which the autonomous navigation definitions or objects 2300 react, but may set a sensitivity level and/or level or strength of response to the conditions or stimuli. The AR system may provide one or more user interface tools for adjusting properties. For example, a user interface tool (e.g., slider bar icons, knob icons) may allow for scaling the properties, inverting the properties (e.g., move towards, move away), etc.

The adjustable parameters may, for example, set a level of sensitivity of the autonomous navigation definition or object 2300 to the conditions or stimulus to which the autonomous navigation definition or object is responsive. For example, a sensitivity parameter may be set to a low level, at which the autonomous navigation definition or object 2300 is not very responsive to an occurrence of a condition or presence of a stimulus, for instance not responding until a source of a condition or stimulus is very close.

Also for example, a sensitivity parameter may be set to a high level, at which the autonomous navigation definition or object 2300 is very responsive to an occurrence of a condition or presence of a stimulus, for instance responding even when a source of a condition or stimulus is not very close. Levels in between the low and high levels may also be employed. In some implementations, the level of sensitivity may be considered as a range of sensitivity. Such may set an outer boundary at which the autonomous navigation definition or object 2300 is sensitive, or may set a gradient in sensitivity, which may be linear, exponential, or even a step function with one or more distinct steps in sensitivity.

The adjustable parameters may, for example, set a level of response of the autonomous navigation definition or object 2300 to the conditions or stimulus to which the autonomous navigation definition or object 2300 is responsive. For example, a parameter may adjust a strength at which the autonomous navigation definition or object 2300 responds to an occurrence of a condition or stimulus. For instance, a parameter may set a strength of a tendency or likelihood to move. For example, a tendency parameter may be set to a low level, at which the autonomous navigation definition or object 2300 is not very responsive an occurrence of a condition or presence of a stimulus.

Also for example, the tendency parameter may be set to a high level, at which the autonomous navigation definition or object 2300 is very responsive an occurrence of a condition or presence of a stimulus, and will strongly cause movement either toward or away from the source of a condition or stimulus. A speed parameter may set a speed at which the autonomous navigation definition or object 2300 moves in response to detection of the condition or stimulus. The speed may be a fixed speed or a variable speed which changes with time (e.g., slowing down 5 seconds after response starts) or distance (e.g., slowing down after moving a fixed distance). A direction parameter may set a direction of movement (e.g., toward, away).

While autonomous navigation definitions or objects 2300 may be responsive to conditions and stimuli in a two-dimensional area, in some implementations the autonomous navigation definitions or objects 2300 are responsive to conditions and stimuli in a three-dimensional volume. Some autonomous navigation definitions or objects 2300 may be isotropic, that is detecting and responding to conditions occurring in all directions relative to the autonomous navigation object 2300. Some autonomous navigation definitions or objects 2300 may be anisotropic, that is detecting and responding to conditions occurring in only limited directions relative to the autonomous navigation definition or object. Isotropic or anisotropic operation may be an adjustable parameter for some autonomous navigation definitions or objects 2300.

The autonomous navigation definitions or objects 2300 may be predefined, and selectable by a user or others. In some implementations, a user may define new autonomous navigation definitions or objects 2300, and optionally incorporate the new autonomous navigation definitions or objects into a collection or library for reuse by the user or for use by others.

As illustrated in FIG. 40, one or more autonomous navigation definitions or objects 2300*a*, 2300*c* are logically associable to a virtual object 2400, for example to an avatar. When logically associated with a virtual object 2400, the autonomous navigation definitions or objects 2300*a*, 2300*c* may be plotted as a body centered coordinate frame about the virtual object 2400. That is the center of the autonomous navigation definition or object 2300*a*, 2300*c* is the center of the body of the virtual object 2400 itself. The autonomous navigation definitions or objects 2300 may be scaled, for example with a logarithmic function or some other function that for instance scales infinity to 1 and proximity to 0.

The autonomous navigation definitions or objects 2300 are each independent from one another. Any number of autonomous navigation definitions or objects 2300 can be associated or applied to a virtual object 2400. For example, thousands of autonomous navigation definitions or objects 2300 may be applied to a single virtual object 2400.

Figure 41:
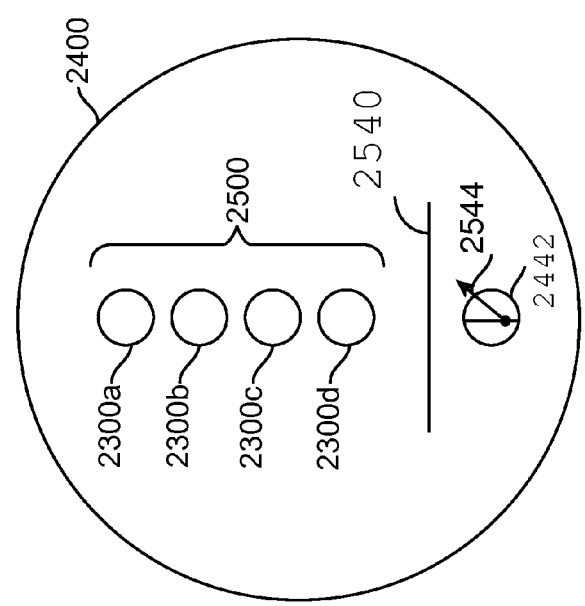
FIG. 41 illustrates a stack of autonomous navigation definitions or objects, according to one embodiment.

FIG. 41 shows a set or "stack" 2500 of autonomous navigation definitions or objects 2300 which are logically associated with a given virtual object 2400, and which can be arranged as rings about the virtual object 2400, for example as illustrated in FIG. 40. Once a set or stack 2500 of autonomous navigation objects 2300*a*-2300*d* has been defined, and composited, as indicated by summing line 2540 (FIG. 41), values of the autonomous navigation definitions or objects 2300 are normalized to be between zero and one.

As noted, some properties of at least some of the autonomous navigation objects 2300 may be adjustable. Those properties may include a level of sensitivity as wells as a strength of response. While the types (e.g., condition or stimulus) of autonomous navigation definitions or objects 2300 available may be fixed, a user can composite 2540 the autonomous navigation definitions or objects 2300 to provide a composite or combined output 2442 (FIG. 41). The composite mechanism may, for example, look for a lowest value, in one or more embodiments. In other cases, the trigger may be a high value, depending on the application.

The composite mechanism could, for example, treat the autonomous navigation definition or object 2300*a* that is responsive to a presence of a structure (e.g., sonar or collision detection) as a filter (e.g., binary outcome, pass/do not pass, ON/OFF), and treat all of other autonomous navigation definition or object 2300*b*-2300*d* as scaling factors. For example, the composite 2442 of one or more autonomous navigation definitions or objects 2300 may perform a peak detection on a value or shape (e.g., what is the maximal distance away from center), and provide an indication of a direction and magnitude of velocity (indicated by vector 2544) that the virtual object 2400 should travel in response to the detected condition(s) or stimuli.

The strength of response or action of an autonomous navigation definition or object may be represented as a potential field. For example, a potential field may define a tendency to attract or repel an avatar. For instance, the AR system may establish a convention in which a positive potential field attracts an avatar, while a negative potential repels an avatar. Alternatively, the convention may be that a positive potential field repels an avatar, while a negative potential attracts an avatar.

As a further alternative, one type of potential field may be available under an established convention, which either repels or alternatively attracts the avatar. Further, the AR system may employ a convention where a potential field may be assigned a magnitude or gradient, the magnitude or gradient corresponding to a strength or attraction or repulsion. The gradient may be a linear or nonlinear function, and may even include singularities. The potential field may be established coincidentally with the virtual object or avatar.

The potential field may tend to cause an avatar to avoid a source of the condition or stimulus (e.g., sound, light) for example to steer around the source of the condition or stimulus.

As illustrated in FIG. 40, in one example there may be a first virtual object 2400 which is moving in a virtual space or environment 2402. The virtual space or environment 2402 may include a wall 2404, which may be either a virtual or a physical object. The virtual space or environment 2402 may include a source 2406 of a sound 2408. In one or more embodiments, the AR system may use artificial intelligence to steer the first virtual object 2400 toward a target, for example the source 2406 of the sound 2408 in the virtual space or environment 2402 which includes the wall 2404, while avoiding collisions with the wall 2404.

For instance, an autonomous navigation object 2300a that is responsive to a presence of structures may be logically associated with the virtual object 2400. Also for instance, an autonomous navigation object 2300c that is responsive to sound 2408 may be logically associated with the virtual object 2400. The autonomous navigation objects 2300a, 2300c may be defined to constitute one or more rings located about a body of the virtual object 2400. For example, the autonomous navigation object 2300 may have a property that defines allowable movement.

For example, the autonomous navigation object 2300a may, in the presence of structure, limit movement that would result in a collision with the structure. For instance, in the presence of a flat wall 2404, the autonomous navigation object 2300a may limit the first virtual object 2400 to movement in a lateral direction (e.g., cannot move into the wall), while allowing the first virtual object 2400 to move in any other directions without limitation. Also for example, the autonomous navigation object 2300c may, in the presence of sound 2408, cause the associated first virtual object 2400 to move generally towards a source 2406 of the sound 2408.

The above example may be modified with the addition of a source of light to the virtual space or environment 2402. An autonomous navigation definition or object 2300b (FIG. 39) that is responsive to light may be associated with the first virtual object 2400. Detection of light by the light responsive autonomous navigation definition or object 2300b may cause the first virtual object 2400 to tend to move toward the source of light, or conversely tend to move away from the source of light. In this case, the first virtual object 2400 will be responsive to the composite of three conditions, structure, sound, and light.

As described above, a set of autonomous navigation definitions or objects may be represented arranged as rings about a virtual object (e.g., avatar) and composited together. These can be represented as a state in a state machine, and provide the virtual object to which the autonomous navigation definitions or objects are associated with travel or movement information (e.g., direction, orientation, speed, and/or distance of travel or movement). This provides a time-based method of instructing a virtual object on where to travel, completely behaviorally. In some implementations, an artificial intelligence algorithm may be applied to tune a state to perfection, based just on empirical input data.

The AR system may provide for persistent emotion vectors (PEVs) to define state transitions. PEVs are capable of representing various emotions, and may have particular values at a particular state in time. In one or more embodiments, PEVs may be globally used.

A transition from state to state may be controlled by a set or stack up of the PEVs. Notably, the state machine may not need to be a complete state machine, but rather may cover only a portion of all possible states. A user may set up the states for the particular state transitions that the user is interested in.

Figure 42A:
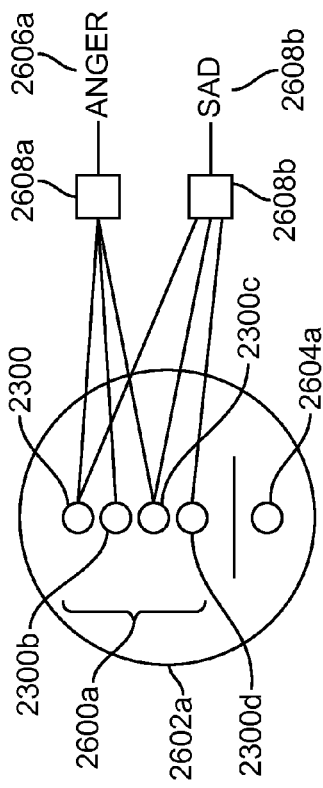
FIGS. 42A-42B illustrate using the autonomous navigation definitions to identify emotional states, according to one embodiment.

As illustrated in FIG. 42A, a set 2600a of autonomous navigation definitions or objects 2300a-2300d associated with a given virtual object (e.g., an avatar) 2602a are composited to sum to a single ring 2604a. The set 2600a may be assigned or logically associated with one or more emotional states, for example anger 2606a, sad 2606b, happy, frightened, satisfied, hungry, tired, cold, hot, pleased, disappointed, etc. (collectively, 2606, only two emotional states called out in FIG. 42A).

The AR system provides for user configurable summing blocks 2608a, 2608b (only two shown collectively 2608), into which the autonomous navigation definitions or objects 2300a-2300b feed. The summing block 2608 drives respective emotion vectors. A user may configure the summing blocks 2608 to cause particular actions to occur. These are inherently time-based, and may apply global weightings based on a current state of a virtual object 2602a, such as an avatar.

Figure 42B:
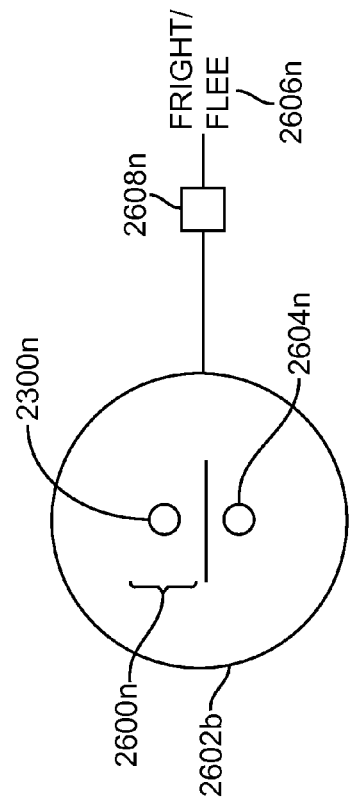

As illustrated in FIG. 42B, a user or some other may, for example, establish a frightened or flee emotion vector. For example, a frightened or flee autonomous navigation definition or object 2300n may be logically associated with a virtual object (e.g., avatar) 2602b. The frightened or flee autonomous navigation definition or object 2300n may be the only autonomous navigation definition or object 2300 in a set 2600n, and may composite 2604n to an identity function via summing block 2608n.

A frightened or flee emotion vector tends to cause the virtual object (e.g., avatar) 2602b to flee when presented with some defined condition or stimulus, such as fright 2606n. The frightened or flee emotion vector may typically have a relatively short time constant, and very low threshold. The state transition to a flee state is controlled by a state of the global. Consequently, state transitions to a flee state when the frightened or flee emotion vector goes low, either alone or in combination with other emotion vectors.

Figure 43:
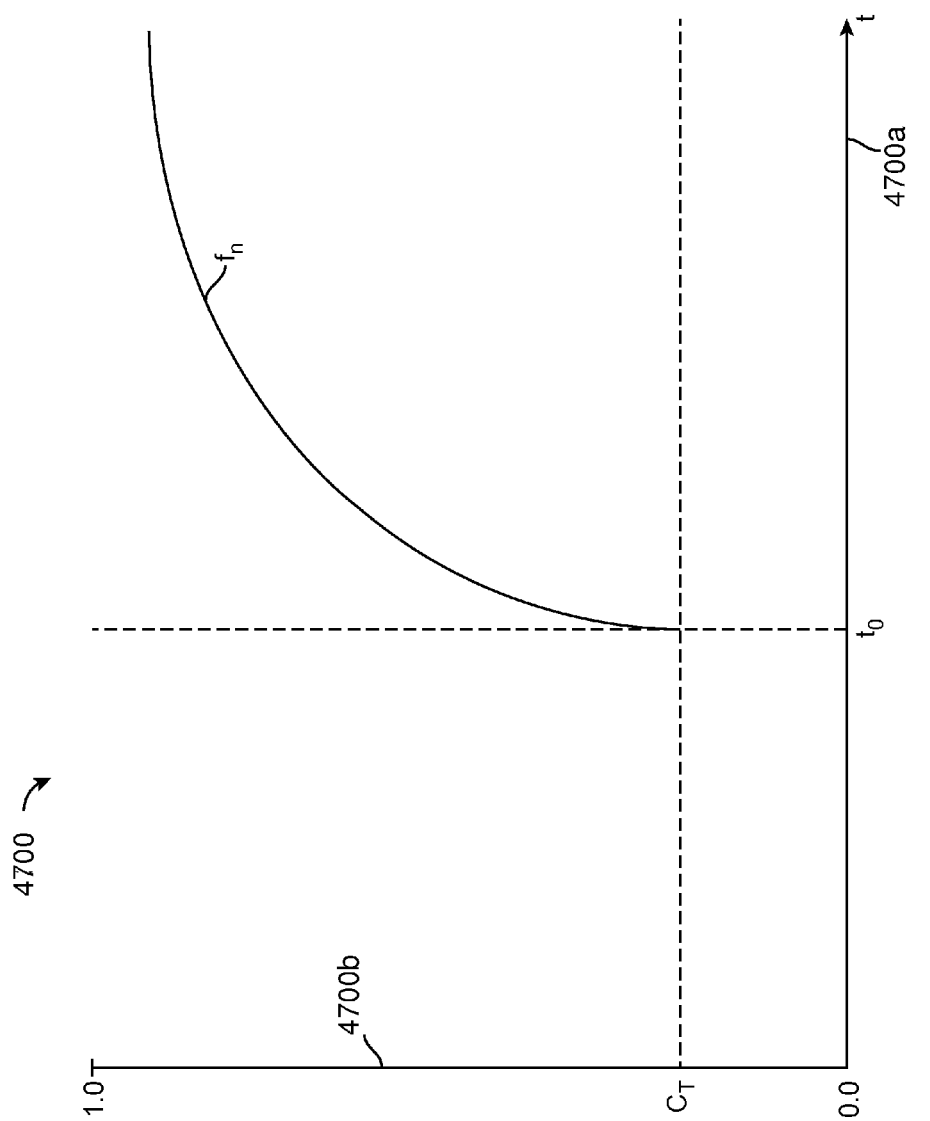
FIG. 43 illustrates a correlation threshold graph to be used to define an autonomous navigation definition or object, according to one embodiment.

The AR system may employ feedback, for instance using a correlation or a statistical mechanism. For example, a correlation threshold graph 4700 may be defined for any particular autonomous navigation definition or object as illustrated in FIG. 43. The correlation threshold graph 4700 may, for example, have been time plotted along a horizontal axis 4700a and a scale (e.g., zero to one) plotted along a vertical axis 4700b. To control a relation of an autonomous navigation definition or object on the vertical axis, a user can specify a threshold in time t0 and a threshold sensed condition or stimulus level CT. A function fn defines the respective response once the threshold has been meet.

Thus, the AR system allows two or more autonomous navigation definitions or objects 2300 to be summed together. The AR system may also allow a user to adjust a trigger threshold. For example, in response to a particular combination of autonomous navigation definitions or objects 2300 exceeding a certain time threshold, the value(s) of those autonomous navigation definitions or objects 2300 may be applied to a ramping mechanism to a particular emotion vector.

The approach described herein provides a very complex artificial intelligence (AI) property by performing deterministic acts with completely deterministic globally visible mechanisms for transitioning from one state to another. These actions are implicitly map-able to a behavior that a user cares about. Constant insight through monitoring of these global values of an overall state of the system is required, which allows the insertion of other states or changes to the current state. As a further example, an autonomous navigation definition or object may be responsive to a distance to a neighbor. The autonomous navigation definition or object may define a gradient around a neighbor, for example with a steep gradient on a front portion and a shallow gradient on a back portion. This creates an automatic behavior for the associated virtual object. For example, as the virtual object moves, it may for instance tend to move toward the shallow gradient rather than the steep gradient, if defined as such.

Alternatively, the virtual object may, for instance, tend to move toward the steep gradient rather than the shallow gradient, if defined as such. The gradients may be defined to cause the virtual object to tend to move around behind the neighbor. This might, for example, be used in a gaming environment where the neighbor is an enemy and the autonomous navigation object functions as an enemy sensor. This may even take into account the direction that the enemy is facing. For example, the value may be high if the avatar is in front. As the avatar moves, it senses a smaller gradient which attracts the avatar to come up behind enemy (e.g., flanking run behind and punch behavior).

Thus, the autonomous navigation definitions or objects 2300 are configured to sense states in the artificial environment, e.g., presence of water, presence of food, slope of ground, proximity of enemy, light, sound, texture. The autonomous navigation definitions or objects 2300 and PEVs allow users to compose definitions that cause virtual objects to tend toward a behavior the user desires. This may allow users to incrementally and atomically or modularly specify an infinite level of complexity by adding states, optimizing an individual state, and defining transitions to new states.

In one or more embodiments, the AR system may associate a navigation object with a virtual object. The navigation object may be responsive to one or more predetermined conditions (e.g., a movement, a command, a structure, an emotion, a distance, etc.). Based on the change in the navigation object, at least one parameter of the virtual object may be changed as well. For example, the virtual object may move faster, or move toward another object, or exhibit a facial expression, etc.

The AR system may, in at least some implementations, advantageously perform optical flow analysis in hardware by finding features via an image processing unit (IPU), then finding the features frame-by-frame with a general purpose set theoretic processor (GPSTP). These components enable the AR system to perform some of complex computations described throughout this application. Further details on these components will be provided below, but it should be appreciated that any other similar processing components may be similarly used, or used additionally.

A GPSTP is a search engine that efficiently finds defined objects. GPSTPs perform a set theoretic search. By way of explanation, a Venn diagram search the combinatorics can be searched in order n, rather than factorial order. The GPSTPs efficiently performs comparisons using set theory to find defined objects. For example, a GPSTP is an efficient structure to find a person who meets a very specific criteria, as illustrated in the example following criteria: male who had a 1987 Cadillac, purchased a Starbucks® coffee on July 31st, and who climbed Mount Everest in 1983, and who has a blue shirt.

An IPU is a piece of imaging processing hardware that can take an image in pixels and convert it into features. A feature may be thought of as a pixel coordinate with meta information.

In executing optical flow algorithms and imaging, the AR system identifies an object in a frame and then determines where that object appears in at least one subsequent frame. The IPU efficiently generates features, and reduces the data from pixels to a set of features. For example, the IPU may take a frame with mega pixels of a million points size, and produce a much smaller set of features (e.g., 200 features). These set of features may be provided to GPSTP for processing. The GPSTP may store the features to be found. As discussed above, a feature is a 2D point in an image with associated meta information or data. Features can have names or labels. The GPSTP has the n−1 features that were found in the most previous ring.

If a match is found, the correspondence may be saved in 2D. This requires only a small amount of computing for a general purpose processor to calculate a bundle adjust to figure out what the relative absolute pose was from the last frame to the current frame. It provides a hardware closed loop that is very fast and very efficient.

In a mobile computation scenario, the two pieces of hardware (IPU and GPSTP) may efficiently perform what would normally require a large amount of conventional imaging processing.

In some implementations, the AR system may employ a meta process that provides timing and quality targets for every atomic module in localization, pose, and mapping processes. By providing each atomic module a timing and quality target, those modules can internally or autonomously self-regulate their algorithm to optimality. This advantageously avoids the need for hard-real time operation. The meta-controller may then pull in statistics from the atomic modules, statistically identifying the class of place in which the system is operating. Overall system tuning configurations for various places (e.g., planes, roads, hospitals, living rooms, etc.) may be saved.

The AR system may employ a tracking module. Any piece of computer processing can take different amounts of time. If every module is atomic and can receive and use timing and quality data, the modules can determine or at least estimate how long they take to run a process. The module may have some metric on the quality of the respective process. The modules may take the determined or estimated timing of various modules into account, automatically implementing tradeoffs where possible. For example, the module may decide to determine that taking more time to achieve higher quality is advisable. The Meta-Controller could seed a quality time target to every module in a very modular system. This may allow each module to self-tune itself to hit timing targets. This allows operation of a very complicated processing system that needs to run in real time, without a schedule. It forms a feedback loop.

This approach avoids the need for a hard real-time operating system. The Meta-Controller sends the time target messages to the modules. For example, if a user is playing a game, the Meta-Controller may decide to tell the modules to use low quality localization targets because the Meta-Controller would like to free up computing power for some other task (e.g., on character innovation). The Meta-Controller may be statistically defined and can provide targets that balance in different configurations.

This approach may also save on system tuning. For example, a global set of modifiable algorithmic parameters may allow for tuning. For instance, operations may be tuned based on location (e.g., on a plane, driving a car, in a hospital, in a living room). The approach allows for bundling of all these parameters. For example, feature tracking can have low quality targets, so only requires a relatively short time, and remainder of the time budget can be used for other processing.

Classical "features from accelerated segment test" (FAST) feature extractors (as discussed in some detail above) may be configured into a massively parallel byte-matching system General Purpose Set Theoretic Processor (GPSTP). As noted above the GPSTP is a processor that does comparisons only. The resulting feature extractor has outputs and capabilities similar to FAST, but is implemented completely through brute-force search and comparison rather than mathematics. The feature extractor would be located near the camera, to immediately process frames into Feature Data (x, y, z, basic descriptor information), in one or more embodiments. Massively parallel comparisons would be performed on serially streamed data via the GPSTPs.

The approach would essentially make an image sequential, and have GPSTP find every type of FAST feature possible. The types of features are enumerated and GPSTP finds the features because there is only a limited size, for example 8 bits per pixel. The GPSTP rolls through and find every combination via a brute force search. Any image can be serialized, and any feature of interest may be transformed. A transform may be performed on the image beforehand, which makes the bit patterns invariant to rotation or scaling, etc. GPSTP takes some group of pixels and applies one or more convolution operations.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other devices that implement virtual or AR or hybrid systems and/or which employ user interfaces, not necessarily the example AR systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

Many of the methods described herein can be performed with variations. For example, many of the methods may include additional acts, omit some acts, and/or perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An eye tracking device to be used in a head-worn virtual or augmented reality device, comprising:
    a virtual content generation subsystem configured to render virtual contents to a user;
    a plurality of light sources comprising multiple groups of light sources configured to illuminate one eye of the user at least with a pseudorandom pattern, wherein
        the pseudorandom pattern that comprises a patterned code generated at least by pseudo-randomly varying at least one parameter of one or more groups of the multiple groups of light sources while leaving the at least one parameter of one or more remaining groups of the multiple groups unchanged in a plurality of time slices;
    an eye tracking device positioned in relation to the one eye of the user and configured to detect one or more characteristics pertaining to an interaction between the light from the one or more groups of the multiple groups of the plurality of light sources and the one eye based in part or in whole upon the pseudorandom pattern; and
    a processor operatively coupled to the eye tracking device to:
        determine an eye model representing the one eye of the user with two circular geometric shapes;
        determine a plurality of eye pointing vectors with the eye model based at least in part upon the one or more characteristics pertaining to the interaction; and
        determine a movement or a pose of the one eye based at least in part on the plurality of eye pointing vectors and apply the movement or the pose of the one eye as a calculated movement or calculated pose to both eyes.

2. The eye-tracking device of claim 1, wherein the one or more characteristics pertain to light reflected back from the one eye, and the one or more characteristics pertaining to the interaction are determined with at least the plurality of vector distances, rather than ray traces.

3. The eye-tracking device of claim 1, wherein the one or more characteristics pertain to one or more reflections of objects from a structure of the user's eyes.

4. The eye-tracking device of claim 1, wherein the at least one parameter includes a length of emission.

5. The eye-tracking device of claim 4, wherein the eye tracking device is configured to detect first light emitted from the one or more groups of the multiple groups and reflected from the at least one eye from second light emitted from one or more ambient light sources and reflected from the at least one eye.

6. The eye-tracking device of claim 4, wherein the at least one parameter corresponds to a length of emission of at least one light source of the plurality of light sources.

7. The eye-tracking device of claim 1, wherein the plurality of light sources are configured to emit the light in a predetermined pattern.

8. The eye-tracking device of claim 1, wherein the eye tracking device comprises a photodiode.

9. The eye-tracking device of claim 1, wherein the processor is configured to determine the movement or the pose based at least in part on a known distance of the at least one eye from the eye tracking device and the plurality of light sources.

10. The eye-tracking device of claim 1, wherein the processor is further configured to determine one or more time of flight signals based on the light emitted by the plurality of light sources and signals from the at least one eye collected by the eye tracking device.

11. A machine implemented method for tracking movements or poses of eyes with a virtual or augmented reality device, comprising:
rendering virtual contents to a user with the virtual or augmented reality device;
emitting light with a plurality of light sources comprising multiple groups of light sources according to a pseudorandom pattern that comprises a patterned code generated at least by varying at least one parameter of one or more groups of the multiple groups of light sources while leaving the at least one emitted light parameter of one or more remaining groups of the multiple groups unchanged according to a plurality of time slices;
detecting one or more characteristics pertaining to an interaction between the light emitted from the plurality of light sources and the one eye of the user in response to the virtual contents based in part or in whole upon the pseudorandom pattern; and
determining, at a microprocessor, a movement or a pose of the one eye of the user based at least in part upon the one or more characteristics, wherein determining the movement or the pose comprises:
determining an eye model representing the one eye of the user with two circular geometric shapes;
determining a plurality of eye pointing vectors with the eye model based at least in part upon the one or more characteristics pertaining to the interaction; and
determining a movement or a pose of the one eye based at least in part on the plurality of eye pointing vectors and apply the movement or the pose of the one eye as a calculated movement or calculated pose to both eyes.

12. The machine implemented method of claim 11, further comprising:
illuminating the one eye of the user with the light emitted by at least one light source of the plurality of light sources; and
tracking the movement or the pose of the one eye of the user by using at least pseudorandom noise.

13. The machine implemented method of claim 11, further comprising:
receiving light signals from the one eye with an eye tracking device; and
identifying one or more Purkinje images from a structure of the one eye of the user.

14. The machine implemented method of claim 13, further comprising:
imposing a pattern on the light signals from the one eye of the user at least by varying one or more parameters of the light emitted by at least one light source of the plurality of light sources according to the pseudorandom pattern, wherein
the at least one parameter of the light comprises on-off states of the multiple groups of one or more light sources according to one or more time slices of the plurality of time slices;
the pseudorandom pattern includes switching on and switching off the plurality of light sources one at a time according to the one or more time slices.

15. The machine implemented method of claim 13, further comprising:
generating the patterned code according to the plurality of time slices; and
generating one or more time of flight signals at least by correlating the light signals received by the eye tracking device from the one eye of the user.

16. The machine implemented method of claim 11, further comprising:
identifying first known geometric characteristics of the plurality of light sources;
determining first distances between the plurality of light sources and the at least one eye;
identifying one or more second known geometric characteristics of the eye tracking device;
determining one or more second distances between the eye tracking device and the one eye; and
identifying one or more third known geometric characteristics of the one eye of the user.

17. The machine implemented method of claim 16, identifying the one or more third known geometric characteristics of the at least one eye further comprising:
representing the one eye of the user as two overlapping geometric shapes;
determining a center of rotation of the one eye by using the two overlapping geometric shapes and a third known geometric characteristic of a cornea of the one or more third known geometric characteristics; and
determining a vector distance based in part or in whole upon a correlation between the light signals from the one eye and the light emitted by the plurality of light sources.

18. The machine implemented method of claim 16, further comprising:
determining a sum of vectors with the one or more third known geometric characteristics of the one eye based in part or in whole the first distances and the second distances;
determining an eye pointing vector for the at least one eye of the user without using cameras; and
detecting the one or more characteristics pertaining to the interaction of the light, detecting the one or more characteristics comprising at least one of:
detecting an extent of backscattered light detected by the eye tracking device comprising at least one photodiodes; or
detecting a direction of the backscattered light.

19. The machine implemented method of claim 11, further comprising:
measuring one or more interaction parameters of the interaction at the eye tracking device; and
determining the movement or the pose of the one eye at least by extrapolating one or more movement or pose characteristics pertaining to the movement or the pose of the one eye.

* * * * *